US011346577B2

(12) United States Patent
Chun et al.

(10) Patent No.: US 11,346,577 B2
(45) Date of Patent: *May 31, 2022

(54) AIR CONDITIONER

(71) Applicant: Samsung Electronics Co., Ltd., Suwon-si (KR)

(72) Inventors: Sung Hyun Chun, Suwon-si (KR); Jin Gyun Kim, Seongnam-si (KR); Seong Deok Cheon, Suwon-si (KR); Sung Bum Kang, Suwon-si (KR); Jun Seok Kwon, Anyang-si (KR); Sung Jae Kim, Seongnam-si (KR); Jong Whal Kim, Suwon-si (KR); Ji Hong Kim, Suwon-si (KR); Seung Won Oh, Seongnam-si (KR); Sang Ki Yoon, Suwon-si (KR); Yeon Seob Yun, Suwon-si (KR); Won Hee Lee, Yongin-si (KR); Chang Sik Lee, Suwon-si (KR); Hyun Joo Jeon, Hwaseong-si (KR); Jae Rim Jung, Asan-si (KR); Chang Woo Jung, Suwon-si (KR); Weon Seok Choi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/390,745

(22) Filed: Jul. 30, 2021

(65) Prior Publication Data

US 2021/0356165 A1    Nov. 18, 2021

Related U.S. Application Data

(63) Continuation of application No. 17/302,360, filed on Apr. 30, 2021, which is a continuation of application
(Continued)

(30) Foreign Application Priority Data

Jul. 17, 2015 (KR) .................. 10-2015-0102003
Feb. 15, 2016 (KR) .................. 10-2016-0017023

(51) Int. Cl.
*F24F 13/00* (2006.01)
*F24F 13/10* (2006.01)
(Continued)

(52) U.S. Cl.
CPC .............. *F24F 13/10* (2013.01); *F24F 1/005* (2019.02); *F24F 1/0014* (2013.01);
(Continued)

(58) Field of Classification Search
CPC ...... F24F 11/0001; F24F 1/0011; F24F 13/10; F24F 1/0014; F24F 1/0033; F24F 13/20; F24F 13/12; F24F 2001/004; F24F 11/30
(Continued)

(56) References Cited

U.S. PATENT DOCUMENTS 4,055,113 A * 10/1977 Monroe .................. F24F 7/025
                                                    454/348
5,003,867 A *  4/1991 Sodec .................... F24F 3/044
                                                    454/236
(Continued)

FOREIGN PATENT DOCUMENTS

CN    101080334 A    11/2007
CN    101153740 A     4/2008
(Continued)

OTHER PUBLICATIONS

International Search Report and Written Opinion dated Oct. 13, 2016 in connection with International Application Mo. PCT/KR2016/007566, 10 pages.
(Continued)

*Primary Examiner* — Nivek K Shirsat
*Assistant Examiner* — Ko-Wei Lin

(57) ABSTRACT

An air conditioner of present invention comprises a housing having an outer panel forming the exterior and an opening formed on the outer panel, a heat exchanger configured to
(Continued)

exchange heat with air flowing into the housing, and a door unit configured to open or close the opening by moving forward or backward from the opening through which the heat exchanged air is discharged. Wherein the door unit comprises a door blade configured to open or close the opening, a door operating part configured to move the door blade forward or backward, and a controller configured to control the air discharged from the opening to be moved forward from the opening in a straight line or to be discharged radially from the opening by controlling a distance between the door blade and the opening.

11 Claims, 70 Drawing Sheets

Related U.S. Application Data

No. 15/745,698, filed as application No. PCT/KR2016/007566 on Jul. 12, 2016, now Pat. No. 11,022,338.

(51) Int. Cl.

| | | |
|---|---|---|
| F24F 13/24 | (2006.01) | |
| F24F 11/00 | (2018.01) | |
| F24F 1/005 | (2019.01) | |
| F24F 1/0014 | (2019.01) | |
| F24F 13/06 | (2006.01) | |
| F24F 11/72 | (2018.01) | |

(52) U.S. Cl.
CPC .......... *F24F 11/0001* (2013.01); *F24F 11/72* (2018.01); *F24F 13/06* (2013.01); *F24F 13/24* (2013.01); *F24F 2221/54* (2013.01)

(58) Field of Classification Search
USPC .................................. 454/347, 358, 341, 339
See application file for complete search history.

(56) References Cited

U.S. PATENT DOCUMENTS

| | | | | |
|---|---|---|---|---|
| 6,032,926 | A * | 3/2000 | Fuchs ....................... | A61J 1/10 251/149.1 |
| 7,794,314 | B2 * | 9/2010 | Sekiya ............... | B60H 1/00857 454/334 |
| 8,511,371 | B2 * | 8/2013 | Onda .................... | B60H 1/0005 165/202 |
| 2009/0111373 | A1 * | 4/2009 | Hollender ................ | F24F 11/56 454/333 |
| 2011/0275306 | A1 * | 11/2011 | Kim ....................... | F24F 13/062 454/339 |
| 2012/0003917 | A1 | 1/2012 | Jeong | |
| 2014/0053591 | A1 * | 2/2014 | Shin ....................... | F24F 13/222 62/285 |
| 2014/0096941 | A1 | 4/2014 | Yun et al. | |
| 2014/0099875 | A1 | 4/2014 | Kim et al. | |
| 2015/0075201 | A1 | 3/2015 | Park et al. | |
| 2015/0192323 | A1 | 7/2015 | Lee et al. | |
| 2016/0305677 | A1 * | 10/2016 | Hirsch .................... | F24F 13/10 |
| 2017/0176026 | A1 | 6/2017 | Lee et al. | |
| 2017/0227251 | A1 * | 8/2017 | Salomonsson .......... | F24F 13/12 |

FOREIGN PATENT DOCUMENTS

| | | | |
|---|---|---|---|
| CN | 101808839 | A | 8/2010 |
| CN | 201666646 | U | 12/2010 |
| CN | 102265095 | A | 11/2011 |
| CN | 103388895 | A | 11/2013 |
| CN | 104089389 | A | 10/2014 |
| CN | 204115178 | U | 1/2015 |
| CN | 104456899 | A | 3/2015 |
| CN | 104697055 | A | 6/2015 |
| JP | 2001280687 | A | 10/2001 |
| JP | 2012093043 | A | 5/2012 |
| JP | 2014025629 | A | 2/2014 |
| KR | 1998-0021325 | U | 7/1998 |
| KR | 20-0346769 | Y1 | 4/2004 |
| KR | 10-2005-0118948 | A | 12/2005 |
| KR | 10-2006-0128172 | A | 12/2006 |
| KR | 10-2008-0072432 | A | 8/2008 |
| KR | 10-2009-0043227 | A | 5/2009 |
| KR | 10-2010-0081845 | A | 7/2010 |
| KR | 10-2012-0020261 | A | 3/2012 |
| KR | 10-1132646 | B1 | 4/2012 |
| KR | 10-1158114 | B1 | 6/2012 |
| KR | 10-1203540 | B1 | 11/2012 |
| KR | 10-2013-0054038 | A | 5/2013 |
| KR | 10-2014-0012437 | A | 2/2014 |
| KR | 10-2014-0019106 | A | 2/2014 |
| KR | 10-2014-0037985 | A | 3/2014 |
| KR | 1020140037985 | * | 3/2014 |
| KR | 10-2014-0092952 | A | 7/2014 |
| KR | 10-2014-0092956 | A | 7/2014 |
| KR | 10-2015-0031832 | A | 3/2015 |
| KR | 10-1507367 | B1 | 4/2015 |
| KR | 10-1624743 | B1 | 5/2016 |
| KR | 10-2099649 | B1 | 4/2020 |

OTHER PUBLICATIONS

Detailed Grounds of Rejection dated Jul. 13, 2019 in connection with Korean Application No. 10-2018-0057455, 11 pages.
Notice of Patent Allowance dated Oct. 19, 2018 in connection with Korean Patent Application No. 10-2018-0057455, 4 pages.
The First Office Action dated Sep. 4, 2019 in connection with Chinese Application No. 201680039624.1, 15 pages.
Non-Final Office Action dated May 26, 2020 in connection with U.S. Appl. No. 15/993,475, 10 pages.
The Second Office Action dated Jun. 10, 2020 in connection with Chinese Application No. 201680039624.1, 19 pages.
The First Office Action dated Jul. 24, 2020 in connection with Chinese Application No. 201910588452.9, 18 pages.
Korean Intellectual Property Office, "Notice of Preliminary Rejection", dated Sep. 17, 2021, in connection with Korean Patent Application No. KR 20210089744, 17 pages.
Korean Intellectual Property Office, "Notice of Preliminary Rejection", dated Sep. 17, 2021, in connection with Korean Patent Application No. KR 20210089778, 14 pages.
Korean Intellectual Property Office, "Notice of Preliminary Rejection", dated Sep. 17, 2021, in connection with Korean Patent Application No. KR20210089865, 14 pages.
Notice of Allowance dated Jan. 7, 2022 in connection with Korean Patent Application No. 10-2021-0089744, 4 pages.
Notice of Allowance dated Jan. 28, 2022 in connection with Korean Patent Application No. 10-2021-0089778, 4 pages.
Notice of Allowance dated Jan. 7, 2022 in connection with Korean Patent Application No. 10-2021-0089865, 4 pages.

* cited by examiner

AIR CONDITIONER

CROSS-REFERENCE TO RELATED APPLICATIONS

This application is a continuation of application Ser. No. 17/302,360, filed Apr. 30, 2021, which is a continuation of application Ser. No. 15/745,698, now U.S. Pat. No. 11,022,338, which is the 371 National Stage of International Application No. PCT/KR2016/007566, filed Jul. 12, 2016, which claims priority to Korean Patent Application No. 10-2015-0102003, filed Jul. 17, 2015 and Korean Patent Application No. 10-2016-0017023, filed Feb. 15, 2016, the disclosures of which are fully incorporated herein by reference into the present disclosure as if fully set forth herein.

BACKGROUND

1. Field

The present disclosure relates to air conditioners, and more particularly, to an air conditioner employing different air discharging methods.

2. Description of Related Art

In general, an air conditioner is a device for controlling temperature, humidity, airflows, airflow distribution, etc., to be right for human activities and simultaneously, eliminating dust or something in the air by using refrigeration cycles. The refrigeration cycle is comprised of key elements, such as a compressor, a condenser, an evaporator, a blower fan, etc.

The air conditioners may be classified into split air conditioners with indoor and outdoor units separately installed, and packaged air conditioners with indoor and outdoor units installed together in a single cabinet. The indoor unit of the split air conditioner includes a heat exchanger for exchanging heat of the air sucked into the panel, and a blower fan for sucking the room air into the panel and blowing the air back into the room.

The indoor units of conventional air conditioners are manufactured such that the heat exchanger is minimized in size and the air velocity and air volume are maximized by increasing revolutions per minute (rpm) of the blower fan. This reduces discharge temperature, and discharges the air into the room through a narrow and long fluid path.

When the user is directly exposed to the discharged air, he/she might feel cold and unpleasant, and on the contrary, when he/she is not exposed to the discharged air, he/she might feel hot and unpleasant.

Furthermore, increasing the rpm of the blower fan to achieve a high wind velocity may lead to a problem of increasing noise. As for an air conditioner using radiation for air conditioning instead of the blower fan, it requires a large panel to have equal capabilities to those of the blower fan based air conditioner. This may slow down the cooling speed and increase installation costs.

SUMMARY

The present disclosure provides an air conditioner employing different air discharging methods.

The present disclosure also provides an air conditioner for cooling/heating the room at a minimum wind velocity at which the user may feel pleasant.

The present disclosure also provides an air conditioner capable of cooling through convection at a minimum wind velocity and cooling using a cold air region formed in a neighboring area.

An air conditioner of present invention comprises a housing having an outer panel forming the exterior and an opening formed on the outer panel, a heat exchanger configured to exchange heat with air flowing into the housing, and a door unit configured to open or close the opening by moving forward or backward from the opening through which the heat exchanged air is discharged, wherein the door unit comprises a door blade configured to open or close the opening, a door operating part configured to move the door blade forward or backward, and a controller configured to control the air discharged from the opening to be moved forward from the opening in a straight line or to be discharged radially from the opening by controlling a distance between the door blade and the opening.

The door unit may be configured for the discharged air to move forward in a straight line from the opening when the door blade is a first distance away from the opening.

The door unit may be configured for the discharged air to be radially discharged from the opening when the door blade is a second distance away from the opening.

The air conditioner may further include a first discharger formed with the opening and a second discharger for discharging air through the outer panel, wherein the heat exchanged air may be selectively discharged to one of the first discharger and the second discharger.

The second discharger may be formed on the outer panel and include a plurality of discharging holes formed to penetrate the inside and outside of the outer panel.

The door operating part may include an outer housing having a gear part formed on the bottom surface and having at least one first guide diagonally formed at an angle to the side surface, an inner housing arranged inside the outer housing and having a first coupling portion formed to be inserted to the first guide and moved along the first guide, a power transfer part configured to deliver rotational force to the gear part, and a housing cover having a second guide therein to guide the first coupling portion to be moved in a parallel direction to a moving direction of the door blade, and coupled to the inner housing and the door blade.

The outer housing may be configured to be relatively rotated outside the inner housing that is fixed.

The door operating part may be configured to move the housing cover and the door blade forward or backward as the first coupling portion is moved forward or backward along the first guide and the second guide when the inner housing is rotated.

The door blade may include a first blade and a second blade in the form of a ring enclosing the outside of the first blade, wherein the first blade and the second blade may form a plurality of discharging fluid paths by sequentially moving forward or backward from the opening.

The door blade may include a third blade in the form of a ring enclosing the outside of the second blade, wherein the first blade, the second blade, and the third blade may form a plurality of discharging fluid paths by sequentially moving forward or backward from the opening.

The inside of the housing forming the opening may include a curved portion formed to be curved toward the outside of the housing.

An air conditioner according to another aspect of the present invention comprises a housing having an outer panel forming the exterior and an opening formed on the outer panel, a heat exchanger configured to exchange heat with air flowing into the housing, and a door unit configured to open or close the opening by moving forward or backward from the opening through which the heat exchanged air is discharged, wherein the door unit comprises a door blade configured to open or close the opening, an outer housing having a gear part formed on the bottom surface and having at least one first guide diagonally formed at an angle to the side surface, an inner housing arranged inside the outer housing and having a first coupling portion formed to be inserted to the first guide and moved along the first guide, a power transfer part configured to deliver rotational force to the gear part, and a housing cover having a second guide therein to guide the first coupling portion to be moved in a parallel direction to a moving direction of the door blade, and coupled to the inner housing and the door blade.

An air conditioner according to still another aspect of the present invention comprises a housing having an outer panel forming the exterior and an opening formed on the outer panel, a heat exchanger configured to exchange heat with air flowing into the housing, a first discharger formed with the opening, a second discharger configured to discharge air through the outer panel and discharge air at a different wind velocity from that of air discharged from the first discharger, and a door unit configured to open or close the opening through which heat exchanged air is discharged.

The door unit may include a door blade comprising a flexible material, and a door operating part configured to slide the door blade on the opening in the radial direction of the opening.

The door blade may be configured to move to an inner side of the housing when the opening is opened.

The door unit may further include a guide for guiding the sliding movement of the door blade.

The door unit may include a door blade having the form of a disc and comprising an elastic material, and a door operating part configured to change the diameter of the door blade.

The door blade may have a rear surface connected to the door driver, the door blade may configured to open the opening as the diameter of the door blade decreases when the door driver moves backward and pulls the rear surface of the door blade backward and close the opening as the diameter of the door blade increases when the door driver moves forward and pushes the rear surface of the door blade forward.

The door operating part may further include a controller to control an area of the opening through which the exchanged air is discharged by controlling the forward or backward moving distance.

The heat exchanged air may be discharged through the first discharger when the first discharger is open and discharged through the second discharger when the first discharger is close.

The air conditioner according to embodiments of the present disclosure may discharge heat exchanged air at different wind velocities.

The air conditioner may employ different methods for blowing heat exchanged air depending on the surroundings of the user.

Furthermore, the air conditioner may perform air conditioning in the room not to expose the user directly to the heat exchanged air, thereby increasing user satisfaction.

DETAILED DESCRIPTION

Figure 1:
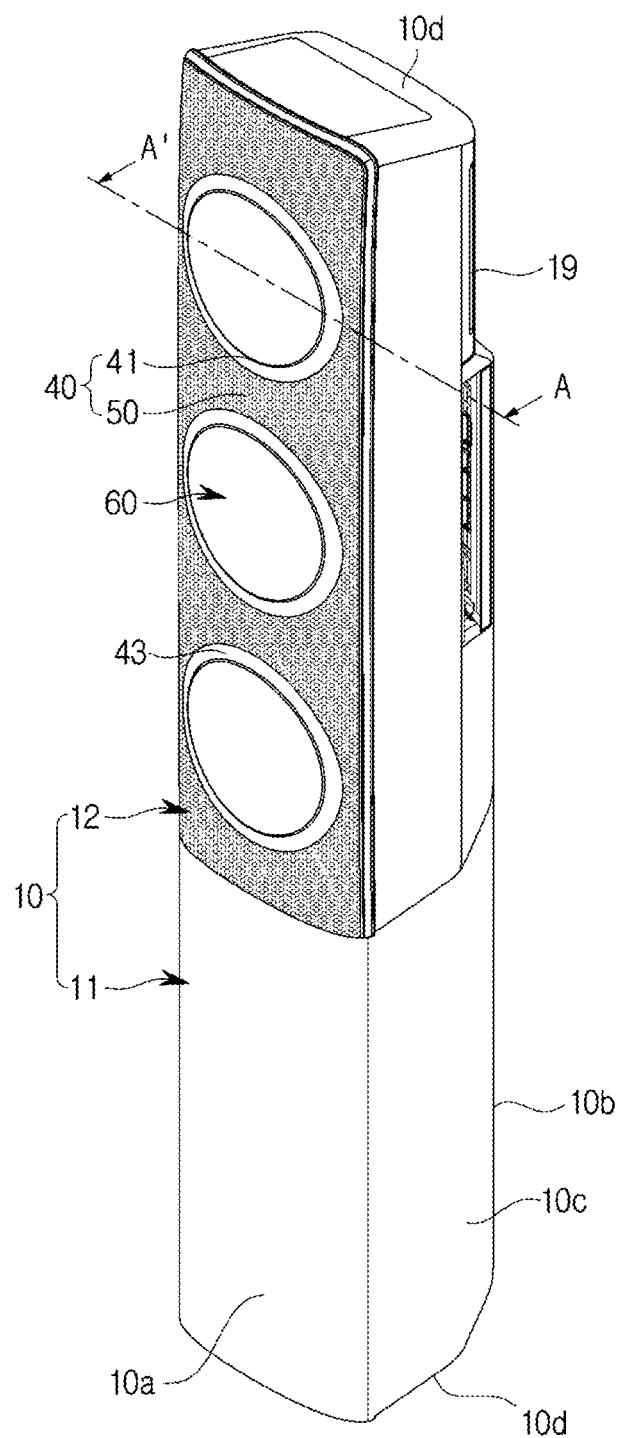
FIG. 1 is a perspective view of an air conditioner, according to an embodiment of the present disclosure.

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

Reference will now be made in detail to embodiments, examples of which are illustrated in the accompanying drawings, wherein like reference numerals refer to the like elements throughout.

A refrigeration cycle of an Air conditioner (AC) is comprised of a compressor, a condenser, an expansion valve, and an evaporator. The refrigeration cycle circulates in a series of processes of compression, condensing, expansion, and evaporation, enabling heat exchange between high temperature air and low temperature refrigerants and then supplying the cooled air into the room.

The compressor compresses a gas refrigerant into a high temperature and high pressure state and discharges the compressed gas refrigerant, and the discharged gas refrigerant flows into the condenser. The condenser condenses the compressed gas refrigerant into a liquid state, releasing heat to the surroundings. The expansion valve expands the high temperature and high pressure liquid refrigerant condensed by the condenser to low pressure liquid refrigerant. The evaporator evaporates the refrigerant expanded by the expansion valve. The evaporator achieves a cooling effect using latent heat of vaporization of the refrigerant to exchange heat with an object to be cooled, and has low temperature and low pressure gas refrigerant return to the compressor. Through this refrigeration cycle, the temperature of indoor air may be controlled.

An outdoor unit of an air conditioner refers to a part comprised of the compressor and an outdoor heat exchanger of the refrigeration cycle. The expansion valve may be placed in one of the indoor or outdoor units, and the indoor heat exchanger is placed in the indoor unit of the air conditioner.

In the present disclosure, an air conditioner for cooling the room is provided, where the outdoor heat exchanger serves as the condenser while the indoor heat exchanger serves as the evaporator. Hereinafter, for convenience of explanation, an indoor unit including the indoor heat exchanger is called an air conditioner, and the indoor heat exchanger is called a heat exchanger.

FIG. 1 is a perspective view of an air conditioner, according to an embodiment of the present disclosure.

An indoor unit of an air conditioner 1 may include a housing 10 having at least one opening 17 and forming the exterior of the indoor unit, a heat exchanger 20 for exchanging heat with the air flowing into the housing 10, a blower 30 for circulating air into or out of the housing 10, and an air discharger 40 for discharging the air blown from the blower 30 out of the housing 10.

The housing 10 may include a front panel 10a with the at least one opening 17 formed thereon, a back panel 10b arranged in the back of the front panel 10a, side panels 10c arranged between the front and back panels 10a and 10b, and top/bottom panels 10d arranged on the top/bottom of the side panels 10c. The at least one opening 17 may have a circular shape, and at least two or more openings 17 may be arranged on the front panel 10a at certain intervals in the vertical direction. The back panel 10b may have an inlet 19 formed to suck the outside air into the housing 10.

The inlet 19 formed on the back panel 10b arranged in the back of the heat exchanger 20 may guide the air outside the housing 10 to flow into the housing 10. The air flowing into the housing 10 through the inlet 19 absorbs or loses heat while passing the heat exchanger 20. The air that has exchanged heat while passing the heat exchanger 20 is discharged by the blower 30 out of the housing 10 through an outlet.

The blower 30 may include a blower fan 32 and a blower grill 34.

The blower grill 34 may be arranged in the direction in which the blower fan 32 discharges air. In the embodiment, the blower fan 32 may be a mixed flow fan without being limited thereto, and may be any kind of fan that has the outside air flow into the housing 10 and discharges the air out of the housing 10. For example, the blower fan 32 may be a cross fan, a turbo fan, or a sirocco fan. There is no limitation on the number of the blower fans 32, and in the embodiment of the present disclosure, there may be at least one blower fan 32 corresponding to the at least one opening. The blower fan 32 may be arranged in front of the inlet 19, and the heat exchanger 20 may be arranged between the blower fan 32 and the inlet 19. A first discharger 41 may be arranged in front of the blower fan 32.

The blower 30 may have a fan driver 33 arranged in the center of the blower fan 32 for driving the blower fan 32. The fan driver 33 may include a motor.

The blower grill 34 may be arranged in front of the blower fan 32 for guiding airflow. Furthermore, the blower grill 34 may be arranged between the blower fan 32 and the air discharger 40 for minimizing the influence of the outside condition on the blower fan 32.

The blower grill 34 may include a plurality of wings 35. The plurality of wings 35 may control the direction or the volume of the air blown from the blower fan 32 to the air discharger 40 by controlling the number, shape, and/or angle of disposition of the wings 35.

As will be described later, a door operating part 66 may be arranged in the center of the blower grill 34. The door operating part 66 and the fan driver 33 may be aligned in the back and forth direction. With the arrangement, the plurality of wings 35 of the blower grill 34 may be arranged in front of the fan wings of the blower fan 32.

The blower 30 may include a duct 36. The duct 36 may be formed to have a circular shape that encloses the blower fan 32 to guide airflow of the air flowing into the blower fan 32. In other words, the air sucked in through the inlet 19 and having passed the heat exchanger 20 may be guided to flow into the blower fan 32.

The heat exchanger 20 is arranged between the blower fan 32 and the inlet 19 for absorbing heat from or transferring heat to the air flowing in through the inlet 19. The heat exchanger 20 may include a tube 21, and headers 22 combined on the upper and bottom sides of the tube 21. However, the type of the heat exchanger 20 is not limited thereto.

There may be at least one heat exchanger 20 arranged inside the housing 10 to correspond to the number of the openings.

The air discharger 40 is arranged in the housing 10 for discharging the air that has exchanged heat inside the housing 10 out of the housing 10. The air discharger 40 may include a first discharger 41 and a second discharger 50, which will be described later.

Figure 2:
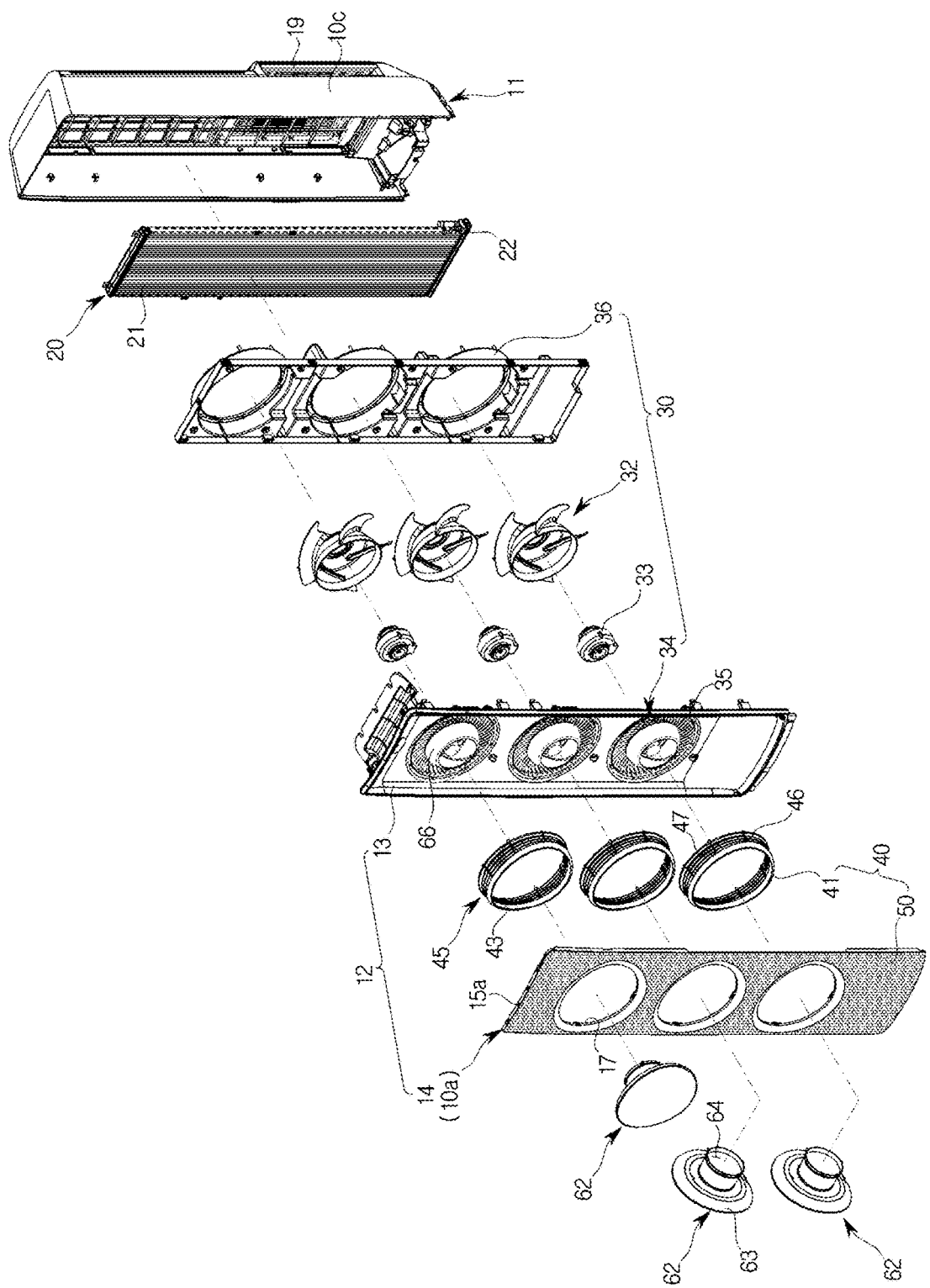
FIGS. 2 and 3 are exploded views of an air conditioner, according to an embodiment of the present disclosure.
Figure 3:
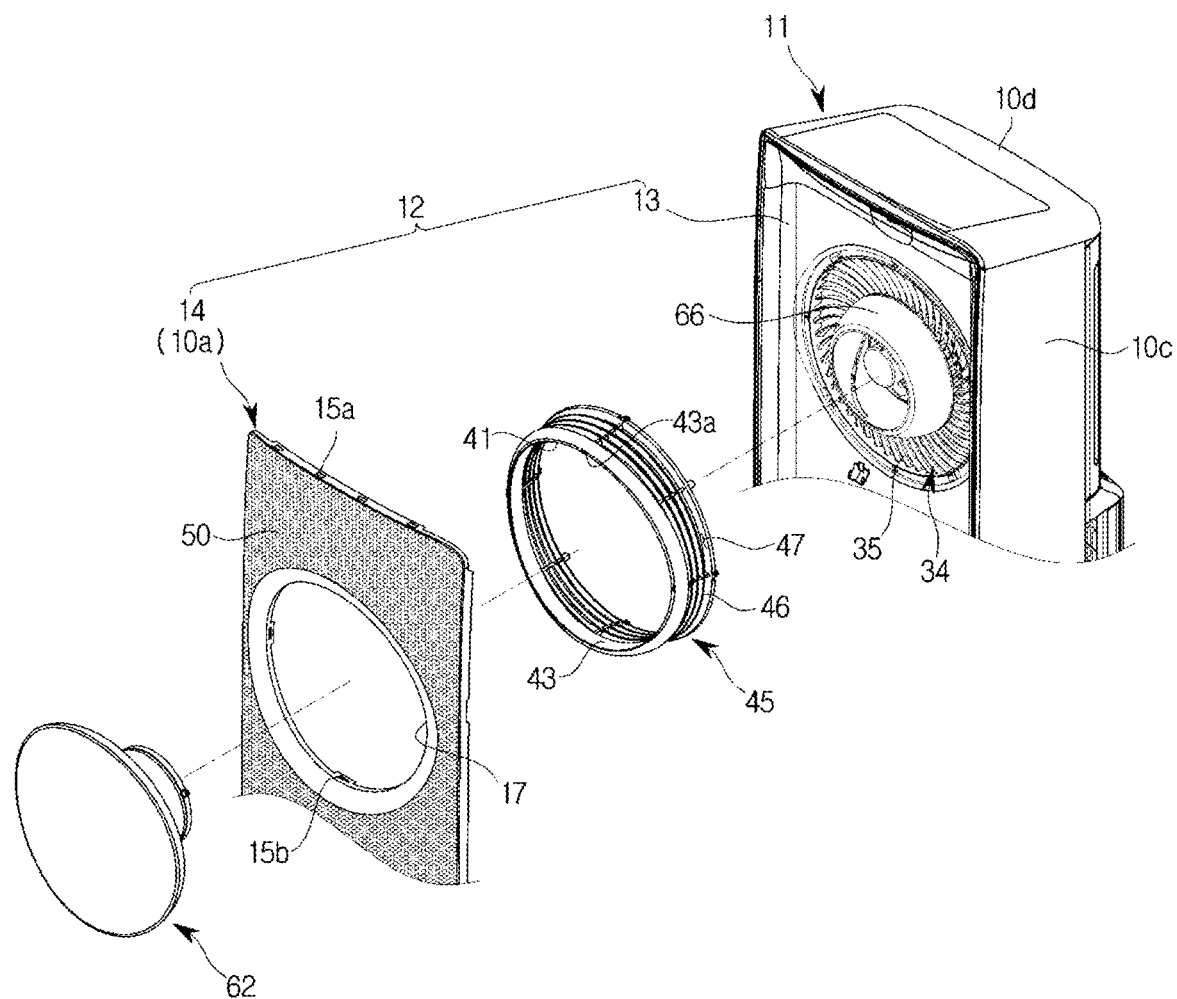
Figure 4:
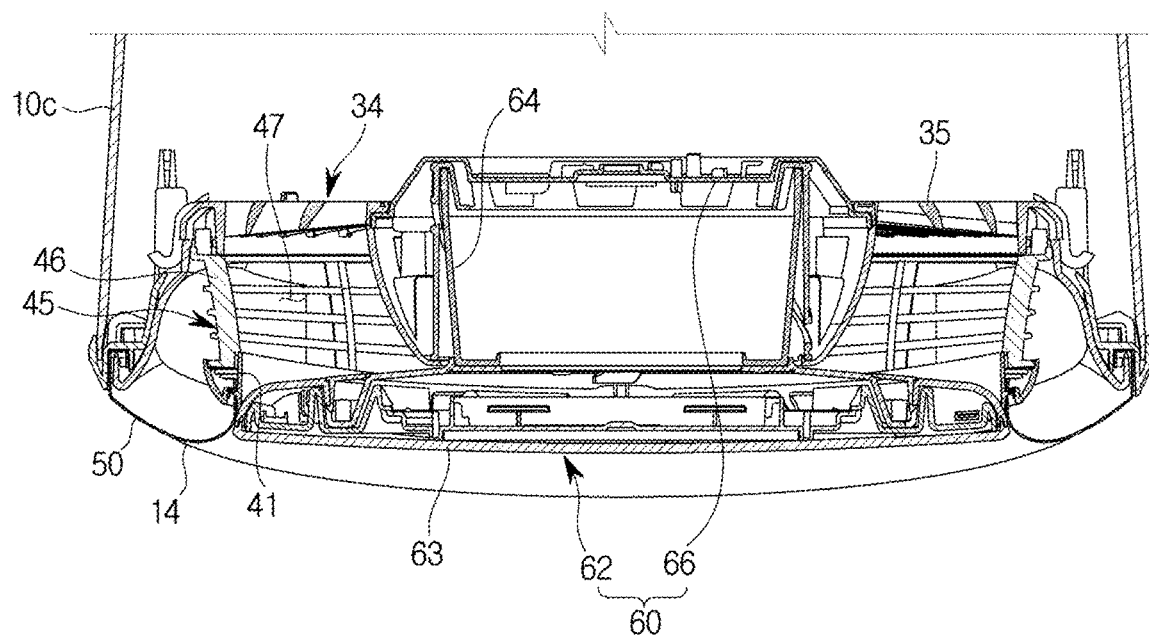
FIG. 4 is a cross-sectional view of A-A' of FIG. 1.

FIGS. 2 and 3 are exploded views of an air conditioner, according to an embodiment of the present disclosure, and FIG. 4 is a cross-sectional view of A-A' of FIG. 1.

The air conditioner 1 may be configured to operate in different operation modes. The operation modes may include a first mode for discharging the heat exchanged air to the opening 17 formed on the housing 10, and a second mode for discharging the heat exchanged air to a discharging plate 14 formed on the housing 10. In addition, there may be a third mode for discharging the heat exchanged air to both the opening 17 and the discharging plate 14. The discharging plate 14 will be described later.

In the first, second, and third modes, the heat exchanged air may be discharged through the first discharger 41, the second discharger 50, and both the first and second dischargers 41 and 50, respectively. In other words, the air that has exchanged heat by the heat exchanger 20 may be discharged by the blower fan 32 out of the air conditioner 1 through the first and second dischargers 41 and 50.

In the first mode, the heat exchanged air is discharged to the first discharger 41, in which case the heat exchanged air is not entirely discharged to the first discharger 41 but partly discharged to the second discharger 50. That is, in the first mode, the majority of the heat exchanged air is discharged to the first discharger 41. Even in the second mode, as in the first mode, the majority of the heat exchanged air is discharged to the second discharger 50.

The air that has passed the blower 30 may be discharged out of the housing 10 through the air discharger 40.

Again, the air discharger 40 may include the first discharger 41 and the second discharger 50. The heat exchanged air may be discharged through at least one of the first and second dischargers 41 and 50. Furthermore, the heat exchanged air may be selectively discharged through at least one of the first and second dischargers 41 and 50.

The first discharger 41 may discharge air through an opening formed on the housing 10. While the air conditioner 1 is operating in the first mode, the heat exchanged air may be discharged out of the housing 10 through the first discharger 41. The first discharger 41 is formed to discharge the heat exchanged air directly to the outside. The first discharger 41 may be formed to be exposed outside the housing 10.

The first discharger 41 may be arranged in the blowing direction of the blower fan 32 for discharging the heat exchanged air directly to the outside. In other words, the first discharger 41 is arranged in front of the blower fan 32 of the blower 30 such that the air blown from the blower 30 is discharged directly to the first discharger 41.

The air blown from the blower fan 32 may flow through a first discharging fluid path 41a (see FIG. 9) formed between the blower fan 32 and the first discharger 41. The first discharging fluid path 41a may be formed by a discharge guide 45.

The first discharger 41 may be formed by a guide opening 43. The guide opening 43 may be formed to be connected to the opening 17 and may form the first discharger 41 along the inner circumference of the guide opening 43. The guide opening 43 may be formed to be exposed outside through the opening 17 of the housing 10, and formed to enable a door unit 60, which will be described below, to be safely placed in the guide opening 43. The guide opening 43 may be arranged in the opening 17 of the housing 10 and may form the first discharger 41 along the inner circumference of the guide opening 43.

The first discharger 41 may be formed to be open or close by the door unit 60.

The door unit 60 opens or closes the first discharger 41, and is formed to discharge the heat exchanged air out of the housing 10 selectively through the first discharger 41. The door unit 60 may control the heat exchanged air to flow to at least one of the first and second dischargers 41 and 50 by opening or closing the first discharger 41.

The door unit 60 is formed to be movable between a door open position 60a (see FIGS. 8 and 9) to open the first discharger 41 and a door close position 60b (see FIGS. 10 and 11) to close the first discharger 41. The door unit 60 may be formed to be movable between the door open position 60a and the door close position 60b back and forth.

Specifically, the door unit 60 may include a door blade 62, and a door operating part 66 for operating the door blade 62.

The door blade 62 may be shaped like a circle corresponding to the shape of the first discharger 41. When the door unit 60 is in the door open position 60a, the door blade 62 is arranged to be at some distance from the guide opening 43, and when the door unit 60 is in the door close position 60b, the door blade 62 is arranged to contact the guide opening 43 to close the first discharger 41.

The door blade 62 may include a blade body 63 having a circular form to correspond to the first discharger 41, and a blade coupling portion 64 formed to extend from the blade body 63 to be combined with the door operating part 66.

The blade body 63 may be shaped like almost a round plate. Furthermore, the blade body 63 may be formed such that one side of the blade body 63 faces the outside of the housing 10 and the other side of the blade body 63 faces the blower 30.

A display is arranged on one side of the blade body 63 for displaying operation states of the AC 1 or allowing the user to manipulate the AC 1.

The door operating part 66 may be formed for the door blade 62 to be movable. The door operating part 66 may include a motor (not shown). The door operating part 66 may be combined with the blade coupling portion 64 of the door blade 62 to move the door blade 62.

The aforementioned blower grill 34 may be arranged along the circumference of the door operating part 66. The air blown from the blower fan 32 arranged on the back of the blower grill 34 may pass the blower grill 34 and be discharged ahead.

The second discharger 50 may be arranged to discharge air through an outer panel. While the AC 1 is operating in the second mode, the heat exchanged air may be discharged out of the housing 10 through the second discharger 50. This arrangement enables the heat exchanged air to be discharged to the outside while the wind velocity of the heat exchanged air is reduced. The second discharger 50 may be formed on the discharging plate 14, which will be described below, and may include a plurality of discharging holes bored through the inner and outer sides of the discharging plate 14. The opening 17 of the housing 10 may be arranged on the discharging plate 14 as shown in FIGS. 2 and 4, without being limited thereto. For example, it is also possible for the opening 17 and the discharging plate 14 to be arranged on the different sides of the housing 10.

In the case that the heat exchanged air is discharged out of the housing 10 through the second discharger 50, the air blown by the blower fan 32 may flow through the second discharging fluid path 50a formed between the blower fan 32 and the second discharger 50. The second discharging fluid path 50a may be formed by the discharge guide 45 and a discharging panel 12, which will be described below.

The external panel may include an exterior panel 11 forming the exterior, and the discharging panel 12 formed to discharge the heat exchanged air. The discharging panel 12 may be part of the external panel, or may be part of the discharger.

The discharging panel 12 may be arranged to form the second discharging fluid path 50a. The heat exchanged air may be discharged out of the AC 1 through the second discharging fluid path 50a formed by the discharging panel 12 and through the discharging plate 14 as will be described below, at a low velocity.

In the embodiment of the present disclosure, the discharging panel 12 is arranged on the front of the AC 1 as shown in FIGS. 1, 2, and 3, without being limited thereto. For example, the discharging panel 12 may be arranged on at least one of the front, the right side, the left side, the rear side, and the top of the AC 1.

The discharging panel 12 may include a fluid path shaping frame 13 and the discharging plate 14.

The fluid path shaping frame 13 may be formed to partition the inside of the housing 10 from the second discharging fluid path 50a. The fluid path shaping frame 13 may prevent the heat exchanged air from flowing back into the housing 10. In the embodiment of the present disclosure, the fluid path shaping frame 13 may be formed to extend from the blower grill 34 to be connected to the exterior panel 11.

The second discharger 50 may be formed on the discharging plate 14. The discharging plate 14 and the second discharger 50 may be collectively called a plate discharger.

The shape of the second discharger 50 has no limitation, but in the embodiment of the present disclosure, may have the form of a plurality of discharging holes. The second discharger 50 may be formed to bore through the front and back faces of the discharging plate 14. The discharging plate 14 may be arranged on an outer side compared to the fluid path shaping frame 13, forming the second discharging fluid path 50a with the fluid path shaping frame 13.

The second discharger 50 may include a discharging area formed on at least a portion of the discharging plate 14. In the discharging area, a plurality of discharging holes may be formed such that they are uniformly distributed or concentrated in at least a portion of the discharging area. In the embodiment of the present disclosure, the discharging area has a plurality of uniformly distributed holes.

The discharging area may be formed at least a portion of the discharging plate 14. It is, however, not limited thereto, but may be formed all over the discharging plate 14.

In the aforementioned third mode, the heat exchanged air is divided to the first and second dischargers 41 and 50 and discharged. An amount of division for each discharger may depend on settings, or may be adjusted by the controller.

The air discharger 40 may include the first discharging fluid path 41a for guiding the heat exchanged air to the first discharger 41, and the second discharging fluid path 50a for guiding the heat exchanged air to the second discharger 50. The first and second discharging fluid paths 41a and 50a may be referred to as a discharging fluid path and a radiation discharging fluid path, respectively.

The air blown by the blower fan 32 may flow through at least one of the first and second discharging fluid paths 41a and 50a.

In the first mode, the air blown by the blower fan 32 may flow through the first discharging fluid path 41a formed between the blower fan 32 and the first discharger 41. In the second mode, the air blown by the blower fan 32 may flow through the second discharging fluid path 50a formed between the blower fan 32 and the second discharger 50.

The air discharger 40 may include a discharge guide 45. The air blown by the blower fan 32 may be controlled by the discharge guide 45. The discharge guide 45 may be arranged in front of the blower 30 for enabling the air flowing from the blower 30 to flow through at least one of the first and second discharging fluid paths 41a and 50a.

The discharge guide 45 may include a guide body 46 and a guide groove 47.

The guide body 46 may be formed to form the first discharging fluid path on the inside. The guide body 46 may be shaped like a cylinder with a cavity. Specifically, the guide body 46 may have the form of a pipe with one side facing the blower 30 and the other side facing the first discharger 41.

The guide groove 47 may be formed for the second discharging fluid path 50a to pass through. The guide groove 47 may be formed on the guide body 46. There is no limitation on the shape of the guide groove 47, and the guide groove 47 may have any shape if only it is formed on the guide body 46 for enabling the air to flow to the outer direction of the guide body 46. In the embodiment of the present disclosure, the guide groove 47 may be formed to have a plurality of halls along the circumference of the guide body 46.

In the first mode, the door unit 60 opens the first discharger 41. In this case, the air blown from the blower 30 passes the first discharging fluid path 41a formed inside of the guide body 46 and is discharged to the first discharger 41.

In the second mode, the door unit 60 closes the first discharger 41. In this case, one side of the guide body 46 is closed by the door unit 60, forcing the air blown from the blower 30 to pass the guide groove 47 formed on the guide body 46 and is discharged to the second discharger 50.

Figure 5:
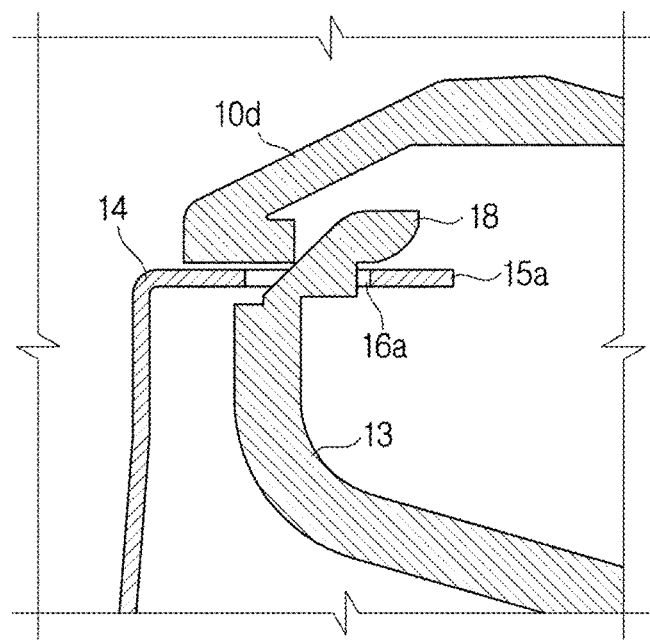
FIG. 5 shows combination of a discharging plate and a housing, according to an embodiment of the present disclosure.
Figure 6:
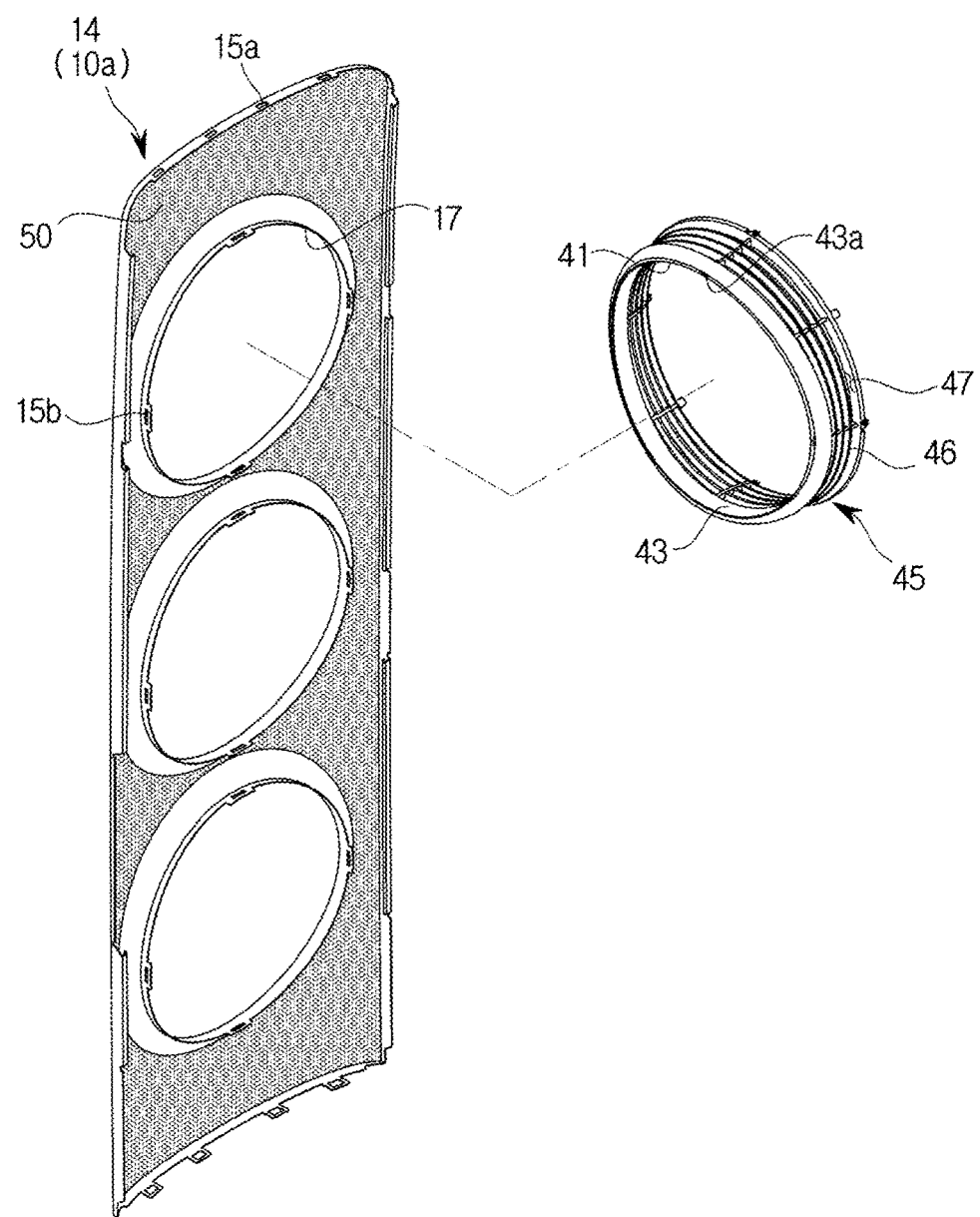
FIGS. 6 and 7 show combination of a discharging plate and a guide opening, according to an embodiment of the present disclosure.
Figure 7:
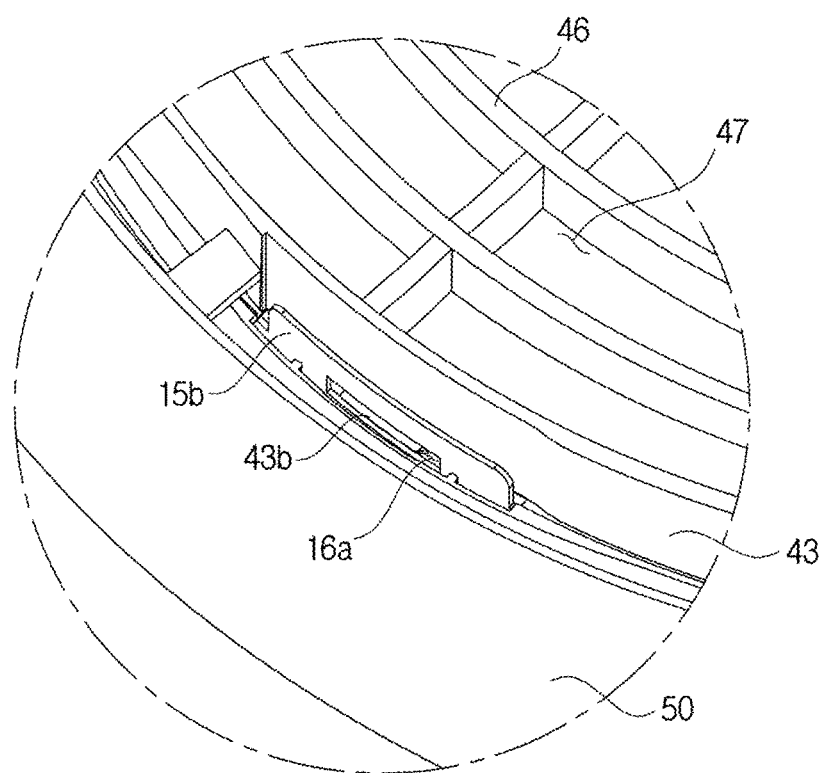

FIG. 5 shows combination of a discharging plate and a housing, according to an embodiment of the present disclosure, and FIGS. 6 and 7 show combination of a discharging plate and a guide opening, according to an embodiment of the present disclosure.

The discharging plate 14 may include plate coupling portions 15a, 15b. The plate coupling portions 15a, 15b may be formed to combine the discharging plate 14 with the housing 10 or the guide opening 43.

The plate coupling portion 15a may be formed along the contour of the discharging plate 14 for combination with the housing 10. The plate coupling portion 15b may be formed along the contour of the opening 17 of the discharging plate 14 for combination with the guide opening 43.

The plate coupling portions 15a, 15b may be formed to protrude from the discharging plate 14. The plate coupling portions 15a, 15b may include plate rabbet grooves 16a, shaped like holes, to catch projections 18, 43b, which will be described later.

The plate coupling portions 15a, 15b may include the first plate coupling portion 15a to combine the discharging plate 14 with the housing 10, and the second plate coupling portion 15b to combine the discharging plate 14 with the guide opening 43.

At least one first plate coupling portion 15a may be arranged along the contour of the discharging plate 14. The first plate coupling portion 15a is combined with the housing 10 to combine the housing 10 and the discharging plate 14.

A first projection 18 may be arranged on the housing 10 at a position corresponding to the first plate coupling portion 15a. In the embodiment of the present disclosure, the first projection 18 is arranged at a position corresponding to the first plate coupling portion 15a on the outer edge of the fluid path shaping frame 13. However, where to arrange the first projection 18 is not limited thereto, if only the first projection 18 is arranged to correspond to the first plate coupling portion 15a such that the housing 10 and the discharging plate 14 are combined.

As shown in FIG. 5, in a case of having the discharging plate 14 closely contact the housing 10, the first plate rabbet groove 16a of the first plate coupling portion 15a is formed to catch the first projection 18. This enables the discharging plate 14 to be attached onto the housing 10.

There are no limitations on the number of the first plate coupling portions 15a and the number of the first projections 18.

At least one second plate coupling portion 15b may be arranged along the contour of the opening 17, as shown in FIG. 6. The second plate coupling portion 15b is combined with the guide opening 43 to combine the guide opening 43 and the discharging plate 14.

A guide insertion groove 43a may be formed in the guide opening 43 for the second plate coupling portion 15b to be inserted thereto. When the discharging plate 14 and the guide opening 43 have close contact with each other, the second plate coupling portion 15b may be inserted through the guide insertion groove 43a, passing through the guide opening 43. The guide insertion groove 43a may be arranged along the circumference of the guide opening 43 to correspond to the second plate coupling portion 15b arranged on the outer edge of the opening.

The second plate coupling portion 15b may be inserted into the guide insertion groove 43a such that the second projection 43b is caught in the second plate rabbet groove, thereby combining the discharging plate 14 and the guide opening 43. As such, combining the discharging plate 14 and the guide opening 43 may connect the opening 17 and the first discharger 41.

There are no limitation on the number of the second plate coupling portions 15b, second projections 43b, and guide insertion grooves 43a, but in the embodiment of the present disclosure, the second plate coupling portions 15b, second projections 43b, and guide insertion grooves 43a all have four each.

Operation of the AC in accordance with an embodiment of the present disclosure will now be described.

FIGS. 8, 9, 10, and 11 illustrate operation of an air conditioner, according to an embodiment of the present disclosure.

The air flowing into the housing 10 from outside exchanges heat with the heat exchanger 20. The air that has been air-conditioned by the heat exchanger 20 is discharged by the blower 30 out of the housing 10.

The AC 1 discharges the air that has passed the heat exchanger 20 through at least one of the first and second dischargers 41 and 50. For example, the AC 1 may discharge the air through the first discharger 41 to perform intensive air conditioning in the first mode, or may discharge the air through the second discharger 50 to slow down air conditioning all over the room in the second mode.

The first discharger 41 may be open or close by operation of the door unit 60. When the first discharger 41 is opened, the heat exchanged air is discharged through the first discharger 41, and when the first discharger 41 is closed, the heat exchanged air is discharged through the second discharger 50.

Operation of the AC 1 in the first mode will now be described in more detail.

Figure 8:
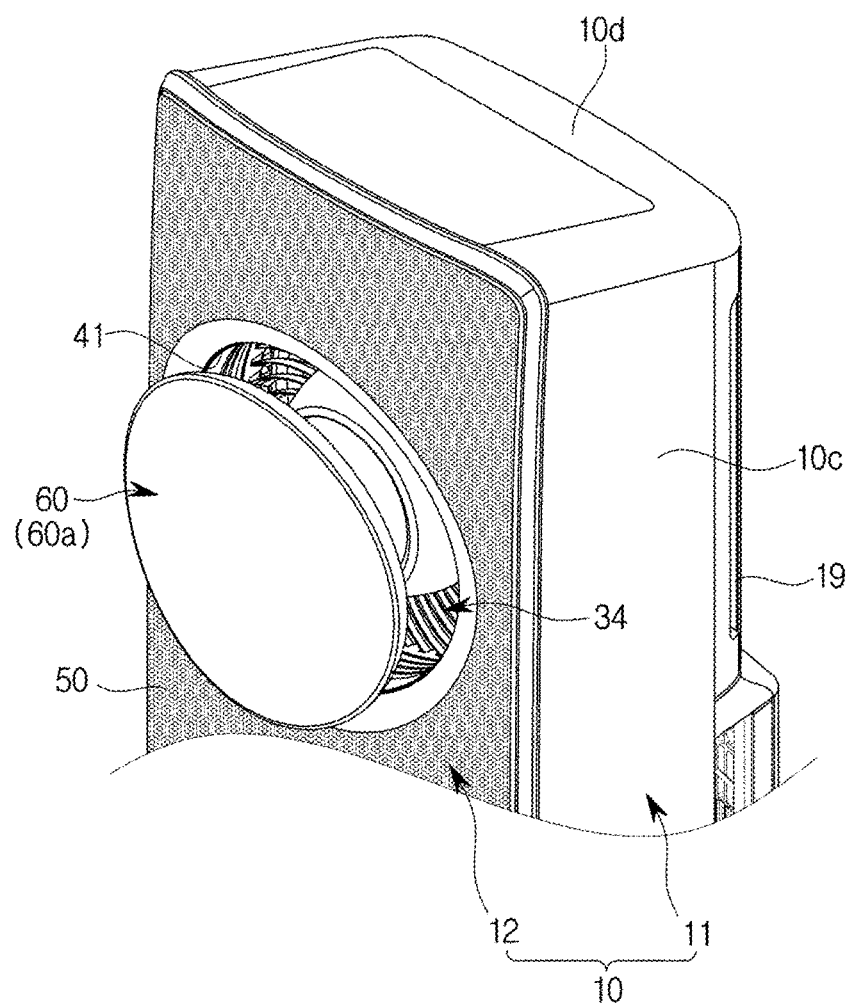
FIGS. 8, 9, 10, and 11 illustrate operation of an air conditioner, according to an embodiment of the present disclosure.
Figure 9:
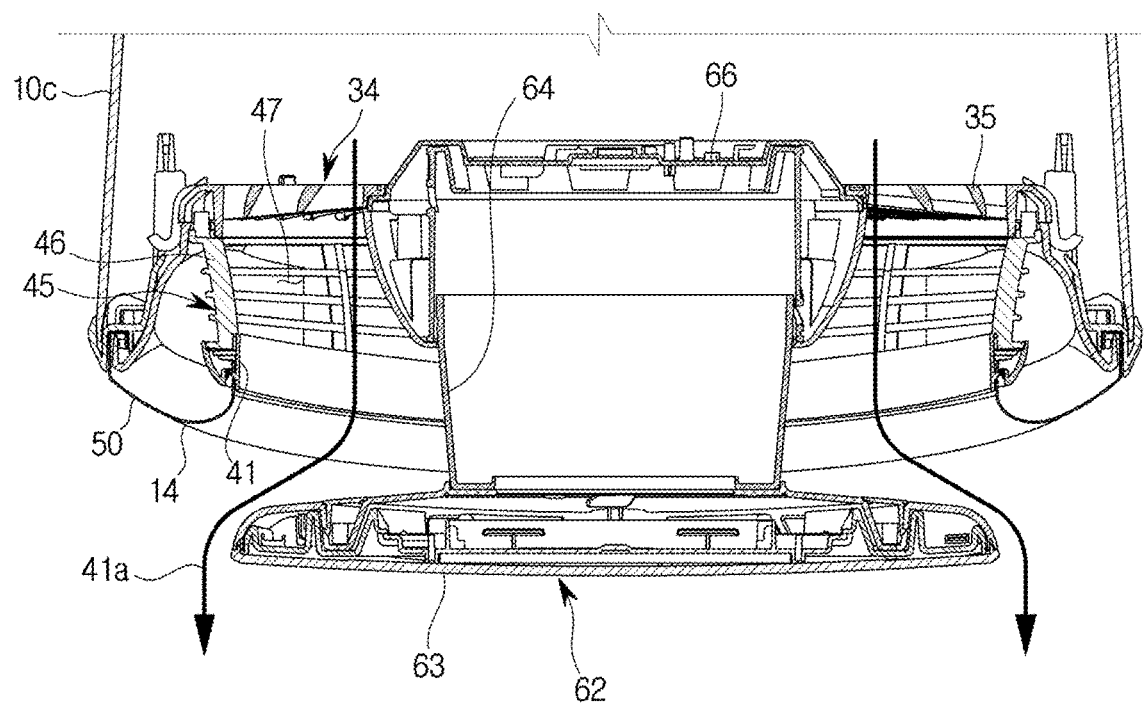

FIGS. 8 and 9 illustrate an air conditioner operating in the first mode.

In the first mode, the heat exchanged air is discharged through the first discharger 41. In the first mode, when the door unit 60 is in the door open position 60a, the door blade 62 is at some distance from the guide opening 43, enabling the first discharger 41 to be opened.

In this case, the air flowing from the blower 30 flows through the first discharging fluid path 41a formed by the guide body 46 to the first discharger 41.

In this case where the air is discharged out of the housing 10 through the first discharger 41, the wind velocity of the blower 30 remains constant.

Operation of the AC 1 in the second mode will now be described in more detail.

Figure 10:
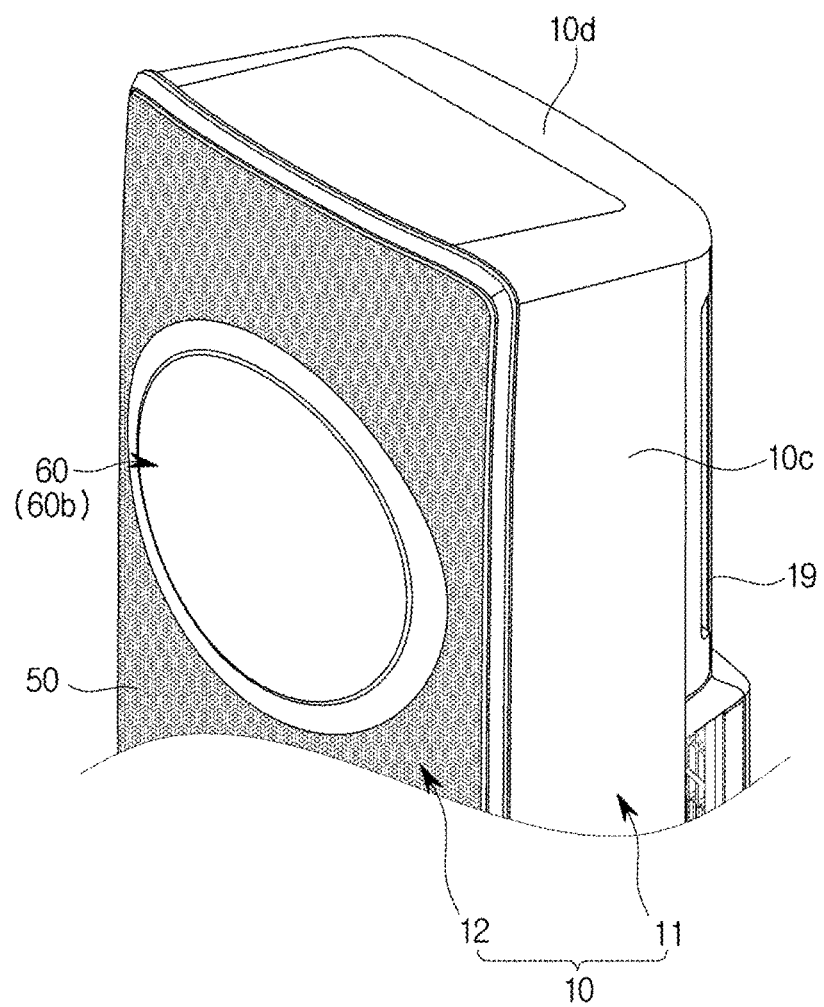
Figure 11:
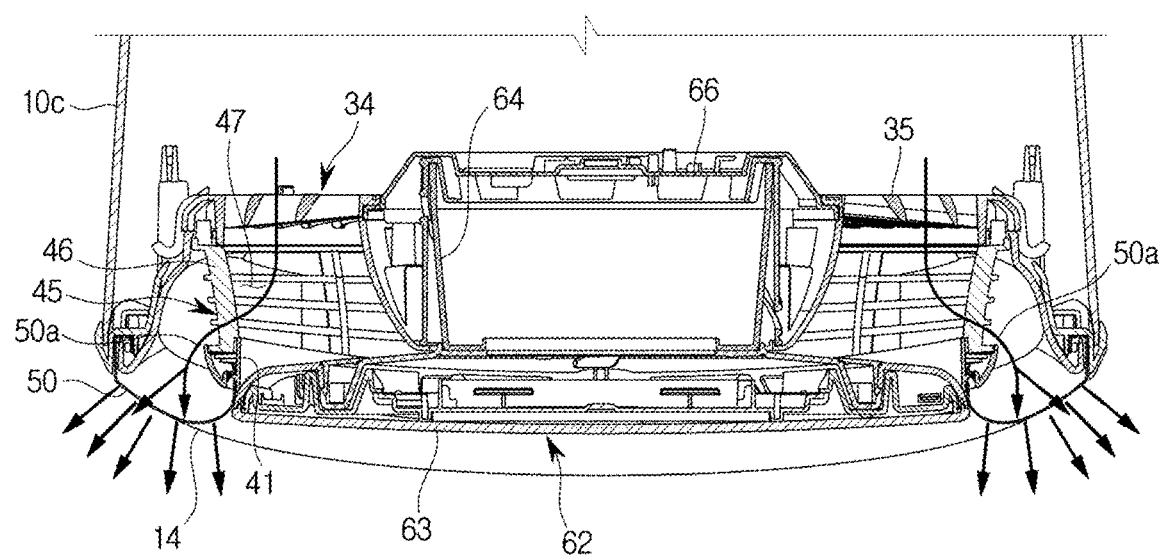

FIGS. 10 and 11 illustrate an air conditioner operating in the second mode.

In the second mode, the heat exchanged air is discharged through the second discharger 50. In the second mode, when the door unit 60 is in the door close position 60b, the door blade 62 comes into contact with the guide opening 43 to close the first discharger 41.

In this case, the air flowing from the blower 30 passes the guide groove 47 formed on the guide body 46 because the first discharger 41 is blocked by the door blade 62. Thus, the air flowing from the blower 30 flows through the second discharging fluid path 50a to the second discharger 50.

In this case where the air is discharged out of the housing 10 through the second discharger 50, the air slows down while passing the plurality of discharging holes of the discharging plate 14 and is discharged to the outside at a low velocity.

With this structure, the AC 1 may cool or heat the room at a wind velocity that makes the user feel pleasant.

The first and second dischargers 41 and 50 may also be called a high-rate discharger and a low-rate discharger, respectively.

Operation of the AC 1 in the third mode will now be described in more detail.

In the third mode, the heat exchanged air is discharged out of the housing 10 by being divided into the first and second dischargers 41 and 50. An amount of division for each discharger may depend on settings or may be adjusted by the controller. Alternatively, it may be adjusted depending on the surrounding conditions sensed by some temperature sensor.

An air conditioner in accordance with another embodiment of the present disclosure will now be described.

Arrangements overlapping with what are described above will be omitted herein.

Figure 12:
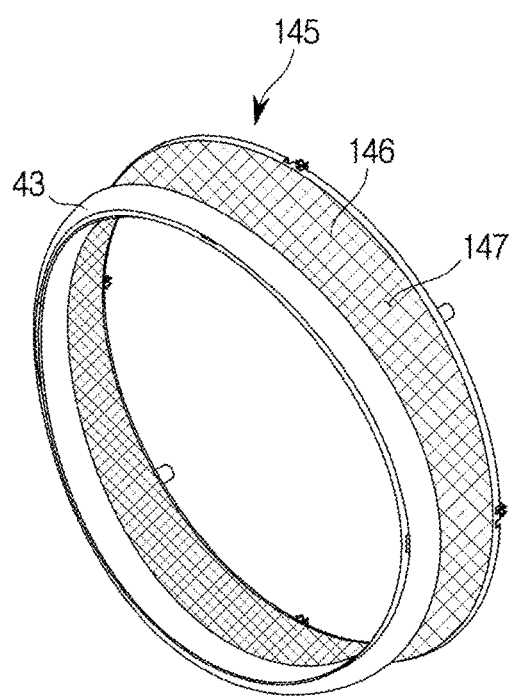
FIG. 12 is a perspective view of a discharge guide, according to another embodiment of the present disclosure.

FIG. 12 is a perspective view of a discharge guide, according to another embodiment of the present disclosure.

The discharge guide 145 may be arranged in front of the blower 30 for enabling the air flowing from the blower 30 to flow through at least one of the first and second discharging fluid paths 41a and 50a.

The discharge guide 145 may be formed of at least one of mesh and porous materials.

The discharge guide 145 may include a guide body 146 and a guide groove 147.

The guide body 146 may be formed to form the first discharging fluid path on the inside. The guide body 146 may be shaped like a cylinder with a cavity. Specifically, the guide body 146 may have the form of a pipe with one side facing the blower 30 and the other side facing the first discharger 41.

The guide groove 147 may be formed for the second discharging fluid path 50a to pass through. The guide groove 147 may be formed on the guide body 146. There is no limitation on the shape of the guide groove 147, and the guide groove 47 may have any shape if only it is formed on the guide body 146 for enabling the air to flow to the outer direction of the guide body 146. In the present embodiment, since the discharge guide 145 is formed of a mesh or porous material, the guide groove 147 may be a porous portion formed in the guide body 146.

An AC in accordance with still another embodiment of the present disclosure will now be described.

Arrangements overlapping with what are described above will be omitted herein.

FIGS. 13, 14, 15, and 16 show a discharge guide, according to another embodiment of the present disclosure.

A discharge guide 245 may include a first guide 246 and a second guide 248.

The first guide 246 may include a guide body 246a and a guide groove 246b.

The guide body 246a may have a cylindrical form with a cavity. Specifically, it may have the form of a pipe with one side facing the blower 30 and the other side facing the first discharger 41.

The guide groove 246b may be formed on the guide body 246a. There are no limitations on the shape of the guide groove 246b as long as the guide groove 246b is formed on the guide body 246a to help air circulation. In the embodiment, the guide groove 246b may be formed to have a plurality of holes along the circumference of the guide body 246a.

The second guide 247 may be formed to slide against the first guide 246. Specifically, the second guide 247 may be formed to be able to slide back and forth against the first guide 246. The second guide 247 may be shaped like a cylinder with a cavity.

Figure 13:
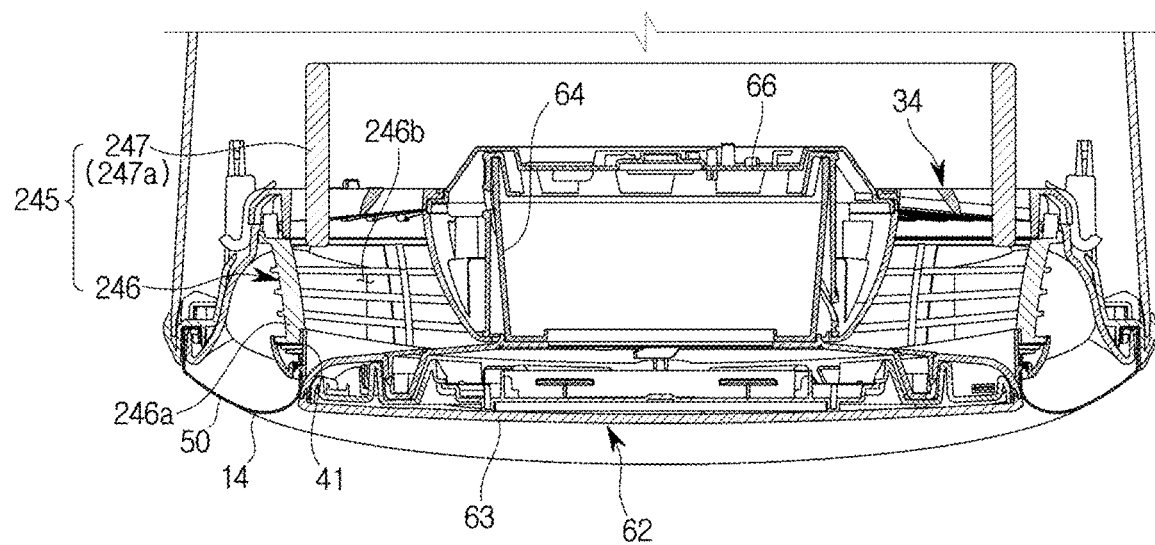
FIGS. 13, 14, 15, and 16 show a discharge guide, according to another embodiment of the present disclosure.
Figure 14:
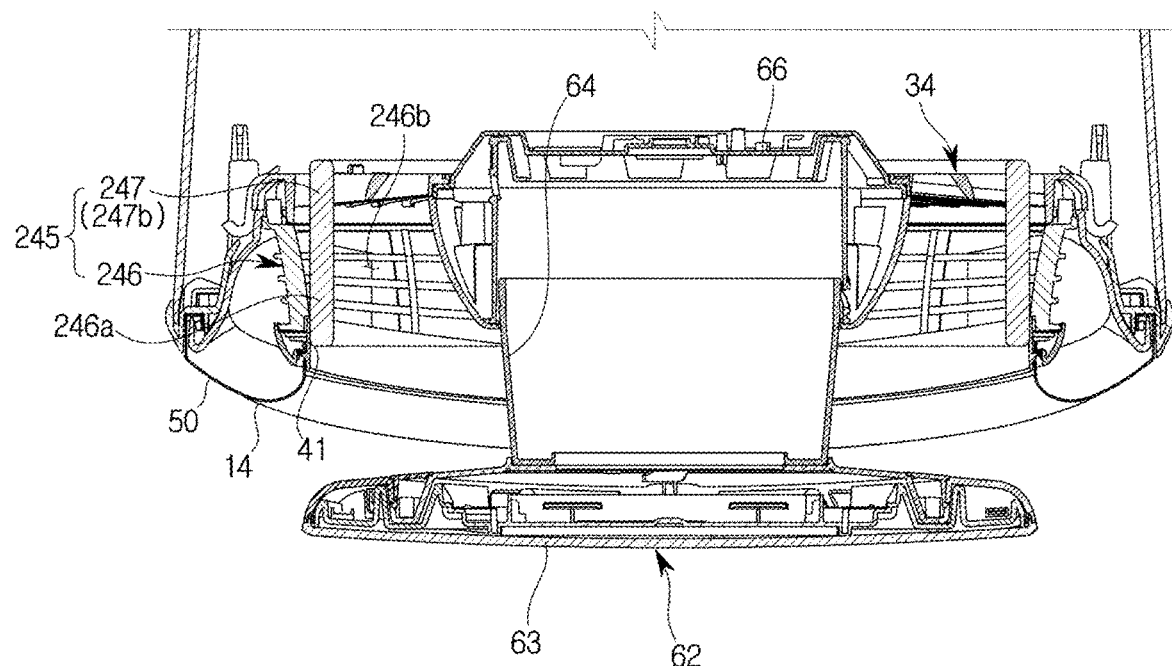
Figure 15:
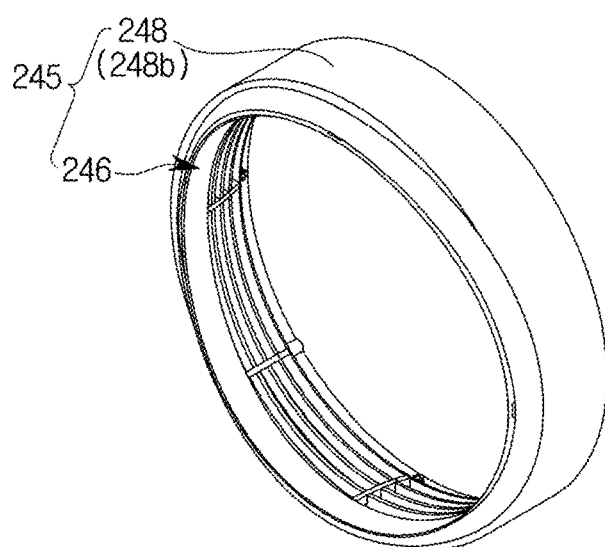
Figure 16:
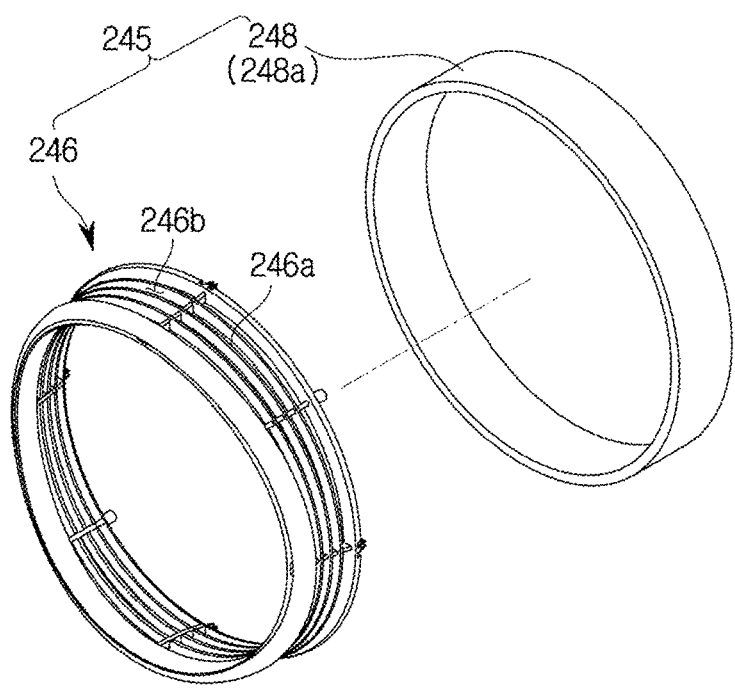

The second guide 247 is configured to selectively open or close the guide groove 246b of the first guide 246. In other words, the second guide 247 may be configured to be movable between an open position 247a and a close position 247b of the first guide 246. Specifically, when the second guide 247 is in the open position 247a, it is placed such a distance from the first guide 246 that the guide groove 246b of the first guide 246 is open. When the second guide 247 is in the close position 247b, it is placed so close to the first guide 246 that the guide groove 246b of the first guide 246 is closed. It is seen that the second guide 247 has a corresponding shape to the first guide 246b as shown in FIGS. 13 and 14 and is configured to slide between the open position 247a and the close position 247b to be in close contact with the inner circumferential face of the first guide 246. However, it is not limited thereto, but a second guide 248 may also be configured to slide between an open position 248a and a close position 248b to be in close contact with the outer circumferential face of the first guide 246 as shown in FIGS. 15 and 16.

The aforementioned discharge guide and operating modes of the air conditioner will now be described.

If the air conditioner 1 is in the first mode, the door unit 60 is located in the door open position 60a. At this time, the second guide 247 is located in the close position 247b.

If the second guide 247, 248 is in the close position 247b, 248b, the guide groove 246b of the first guide 246 is closed. This allows the heat exchanged air inside the air conditioner 1 to be discharged only to the first discharger 41 through the first discharging fluid path 41a formed inside the discharge guide 45. At this time, the second discharging fluid path 50a is closed by the second guide 247, 248, so the heat exchanged air is not discharged to the second discharger 50.

If the air conditioner 1 is in the second mode, the door unit 60 is located in the door close position 60b. At this time, the second guide 247, 248 is located in the open position 247a, 248a.

If the second guide 247, 248 is in the open position 247a, 248a, the guide groove 246b of the first guide 246 is open. This allows the heat exchanged air inside the air conditioner 1 to be discharged only to the second discharger 50 through the second discharging fluid path 50a formed to pass the guide groove 246b of the discharge guide 245. At this time, the first discharging fluid path 41a is closed by the door unit 60, so the heat exchanged air is not discharged to the first discharger 41.

An air conditioner in accordance with still another embodiment of the present disclosure will now be described.

Arrangements overlapping with what are described above will be omitted herein.

Figure 17:
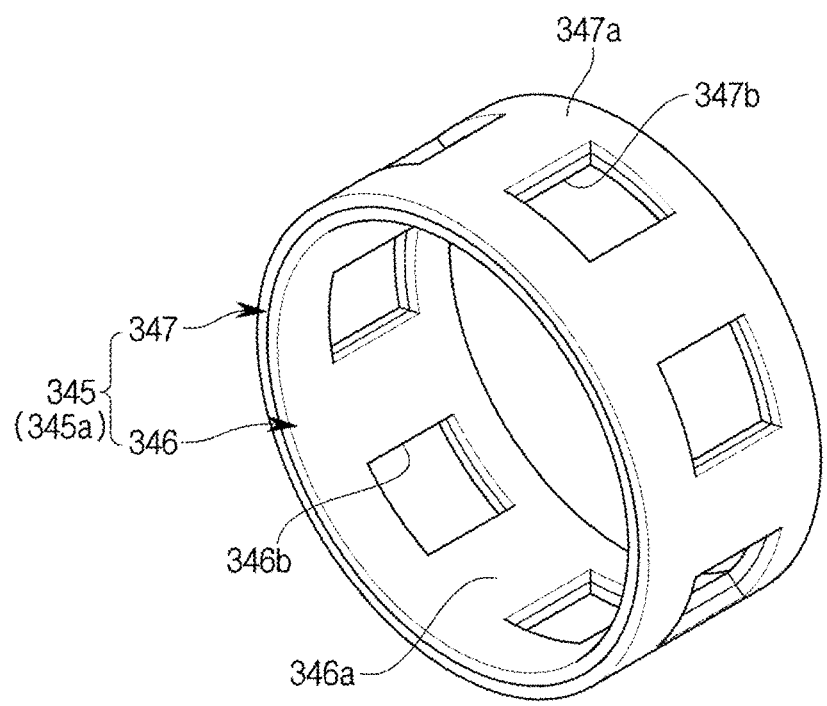
FIGS. 17 and 18 show a discharge guide, according to another embodiment of the present disclosure.
Figure 18:
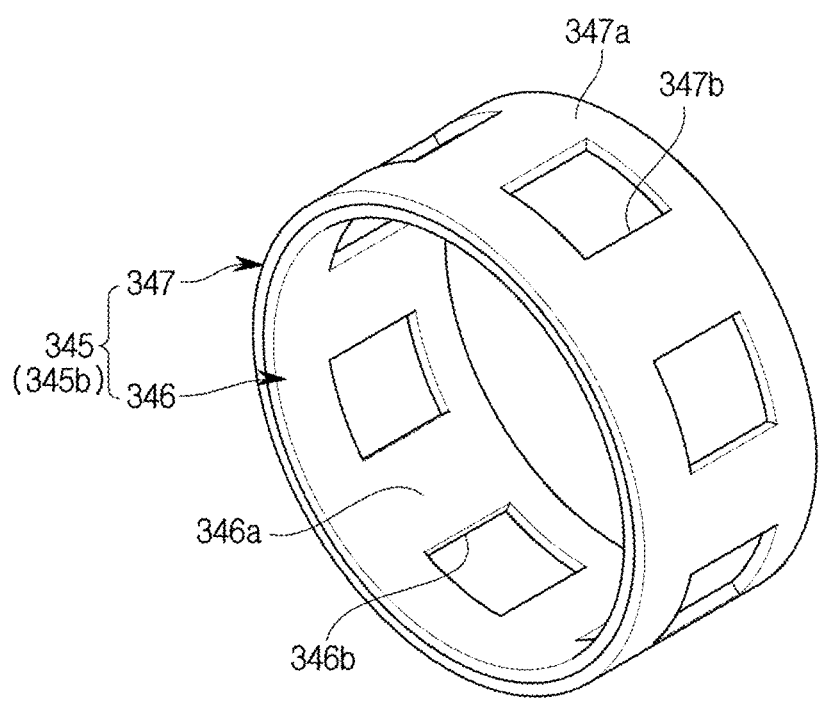

FIGS. 17 and 18 show a discharge guide, according to another embodiment of the present disclosure.

A discharge guide 345 may include a first guide 346 and a second guide 347.

The first guide 346 may include a first guide body 346a and a first guide groove 346b.

The first guide body 346a may have a cylindrical form with a cavity. Specifically, it may have the form of a pipe with one side facing the blower 30 and the other side facing the first discharger 41.

The first guide groove 346b may be formed on the first guide body 346a. There are no limitations on the shape of the first guide groove 346b as long as the first guide groove 346b is formed on the first guide body 346a to help air circulation. In the embodiment, the first guide groove 346b may be formed to have a plurality of holes along the circumference of the first guide body 346a.

The second guide 347 is configured to selectively open or close the first guide groove 346b of the first guide 346. The second guide 347 may be formed to slide against the first guide 346 in the circumferential direction. Specifically, the second guide 347 may be formed to be able to slide against the first guide 346 in the circumferential direction. The second guide 347 may be shaped like a cylinder with a cavity. The second guide 347 may be formed to be in close contact with the outer circumferential face of the first guide 346. It is not, however, limited thereto, but may closely contact the inner circumferential face of the first guide.

The second guide 347 may include a second guide body 347a and a second guide groove 347b. The second guide body 347a corresponds to the first guide body 346a, and the second guide groove 347b corresponds to the first guide body 346a.

The discharge guide 345 is configured to be movable between an open position 345a and a close position 345b. Specifically, when the discharge guide 345 is in the open position 345a, the first guide groove 346b of the first guide 346 and the second guide groove 347b of the second guide 347 are aligned. This allows air to flow past the first and second guide grooves 346b, 347b.

If the discharge guide 345 is in the close position 345b, the first guide groove 346b of the first guide 346 and the second guide body 347a of the second guide 347 are aligned. Conversely, the second guide groove 347b of the second guide 347 may be aligned with the first guide body 346a of the first guide 346. With this arrangement, the first and second guide grooves 346b, 347b are closed by the second guide body 347a and the first guide body 346a, respectively. This prevents the moving air from flowing past the first and second guide grooves 346b, 347b.

The discharge guide 345 may be configured to move between the close position 345b and the open position 345a, and the first guide 346 may be configured to slide against the second guide 347 in the circumferential direction. Conversely, it is also possible for the second guide 347 to slide against the first guide 346 in the circumferential direction.

The aforementioned discharge guide and operating modes of the air conditioner will now be described.

If the air conditioner 1 is in the first mode, the door unit 60 is located in the door open position 60a. At this time, the discharge guide 345 is located in the close position 345b.

When the discharge guide 345 is in the close position 345b, the first and second guide grooves 346b, 347b are closed. This allows the heat exchanged air inside the air conditioner 1 to be discharged only to the first discharger 41 through the first discharging fluid path 41a formed inside the discharge guide 345. At this time, the second discharging fluid path 50a does not discharge the heat exchanged air to the second discharger 50 because the first and second guide grooves 346b, 347b are closed.

If the air conditioner 1 is in the second mode, the door unit 60 is located in the door close position 60b. At this time, the discharge guide 345 is located in the open position 345a.

When the discharge guide 345 is in the open position 345a, the first and second guide grooves 346b, 347b are open. This allows the heat exchanged air inside the air conditioner 1 to be discharged only to the second discharger 50 through the second discharging fluid path 50a formed to pass the first and second guide grooves 346b, 347b of the discharge guide 345. At this time, the first discharging fluid path 41a is closed by the door unit 60, so the heat exchanged air is not discharged to the first discharger 41.

An air conditioner in accordance with still another embodiment of the present disclosure will now be described. Arrangements overlapping with what are described above will be omitted herein.

Figure 19:
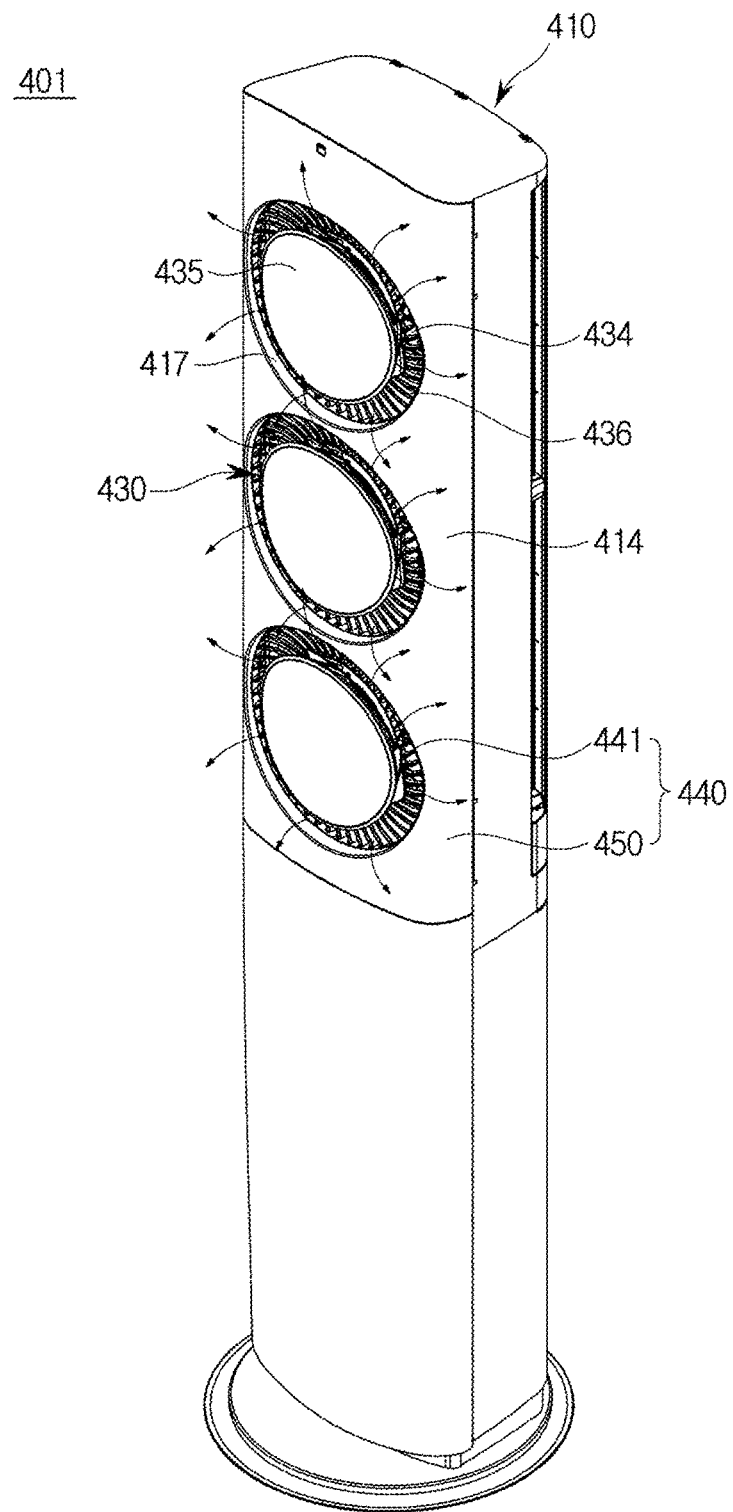
FIGS. 19 and 20 show an air conditioner, according to another embodiment of the present disclosure.
Figure 20:
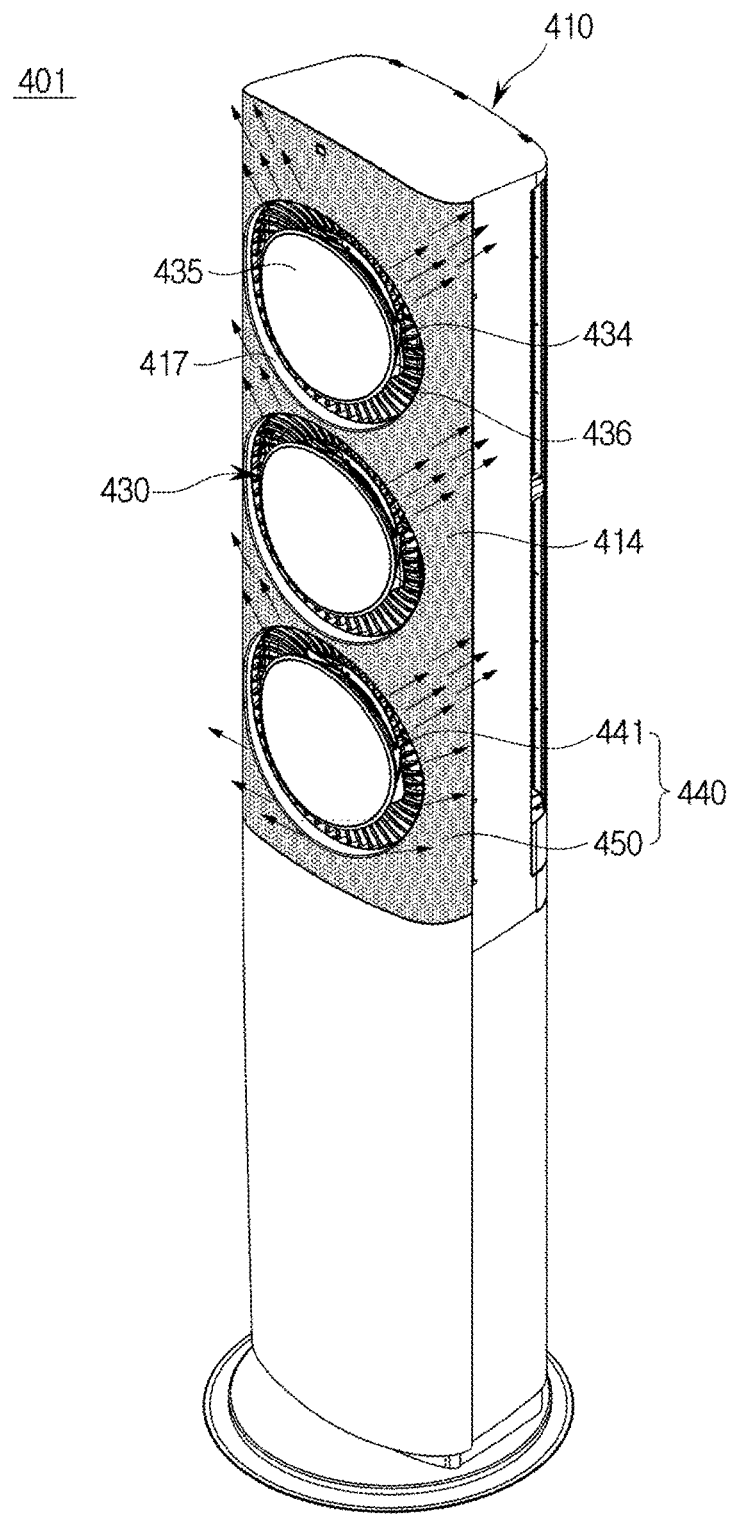

FIGS. 19 and 20 show an air conditioner, according to another embodiment of the present disclosure.

An indoor unit of an air conditioner 401 may include a housing 410 having at least one opening 417 and forming the exterior, a heat exchanger (not shown) for exchanging heat with the air flowing into the housing 410, a blower 430 for circulating air into or out of the housing 410, and an air discharger 440 for discharging the air blown from the blower 430 out of the housing 410.

The blower 430 may include a blower fan (not shown) and a blower grill 434.

The blower grill 434 may be arranged in a discharging direction of the blower fan. In the embodiment, the blower fan may be a mixed flow fan without being limited thereto, and may be any kind of fan that has the outside air flow into the housing 410 and discharges the air out of the housing 410. For example, the blower fan may be a cross fan, a turbo fan, or a sirocco fan. There is no limitation on the number of the blower fans, and in the embodiment of the present disclosure, there may be at least one blower fan corresponding to the at least one opening 417.

The blower 430 may have a fan driver arranged in the center of the blower fan for driving the blower fan. The fan driver may include a motor.

The blower grill 434 may be arranged in front of the blower fan inside the housing 410 for guiding airflow. Furthermore, the blower grill 434 may be arranged between the blower fan and the discharger for minimizing the influence of the outside condition on the blower fan.

The blower grill 434 may include a plurality of wings 436 and a circular disc plate 435. The blower grill 434 may be formed to radially extend from the circular disc plate 435. The plurality of wings 436 may control the direction or the volume of the air blown from the blower fan to the air discharger 440 by controlling the number, shape, and/or angle of disposition of the wings 436.

The air discharger 440 may include a first discharger 441 and a second discharger 450.

The first discharger 441 is formed in between the plurality of wings 436 of the blower grill 434 for discharging the air inside the housing 410 to the outside, and the second discharger 450 is configured to discharge the air inside the housing 410 to the outside through a discharging plate 414 of the housing 410.

The housing 410 may include the discharging plate 414 where the second discharger 450 is formed, and the second discharger 450 includes a plurality of holes formed in the discharging plate 414. Although the discharging plate 414 is formed on the front of the housing 410, there are no limitations on where to place the discharging plate 414. For example, it may be formed on the side or on the top.

The second discharger 450 may be provided in the form of a plurality of discharging holes in the discharging plate 414 for uniformly and slowly discharging the air blown by the blower 430 through the second discharger 450.

The air conditioner 401 may operate in different operation modes.

The different operation modes may include a first mode in which heat exchanged air is discharged through the first discharger 441, a second mode in which heat exchanged air is discharged through the second discharger 450, and a third mode in which purified air is discharged through the first and second dischargers 441 and 450.

An air conditioner in accordance with still another embodiment of the present disclosure will now be described.

Arrangements overlapping with what are described above will be omitted herein.

Figure 21:
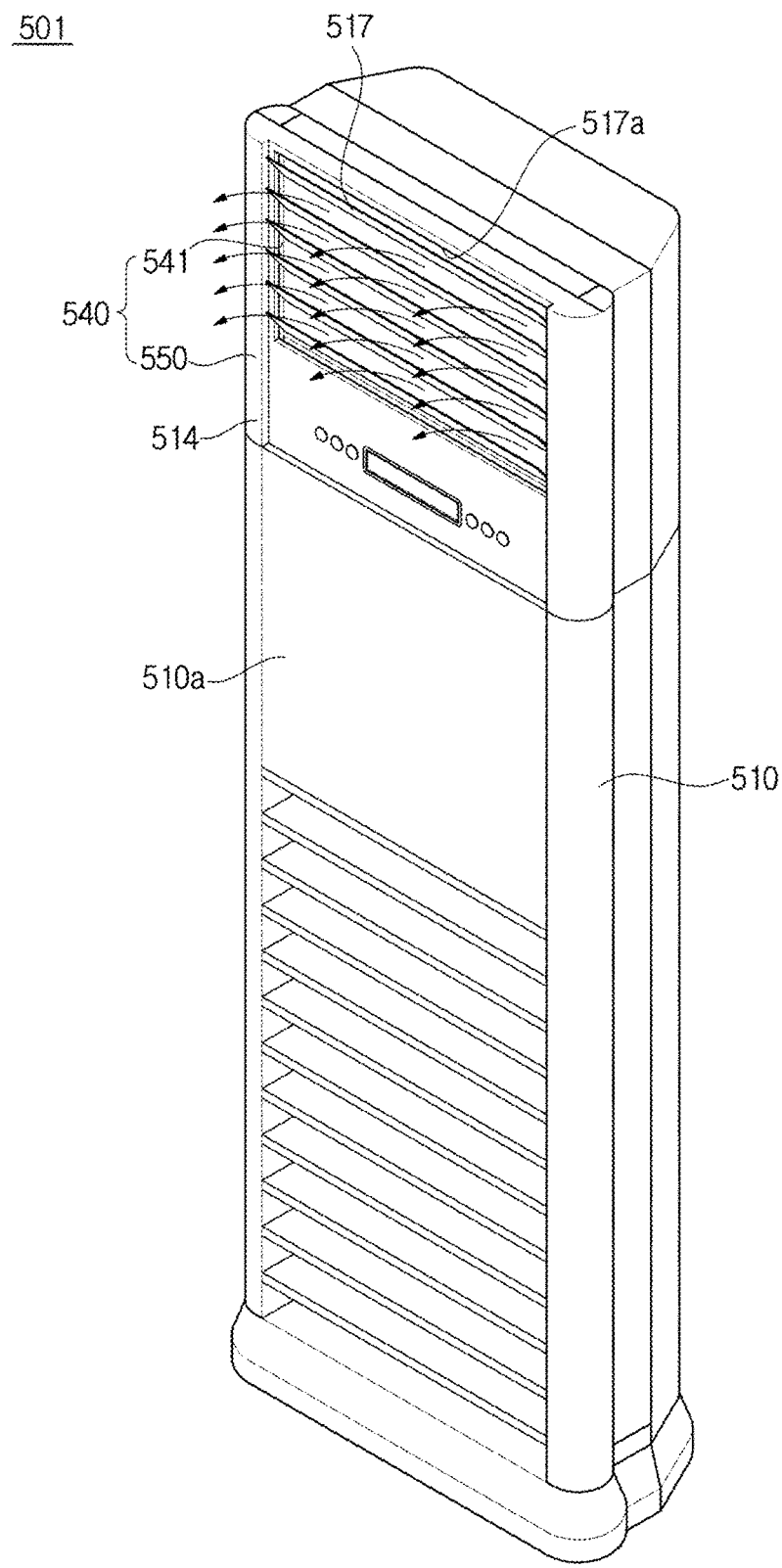
FIGS. 21 and 22 show an air conditioner, according to another embodiment of the present disclosure.
Figure 22:
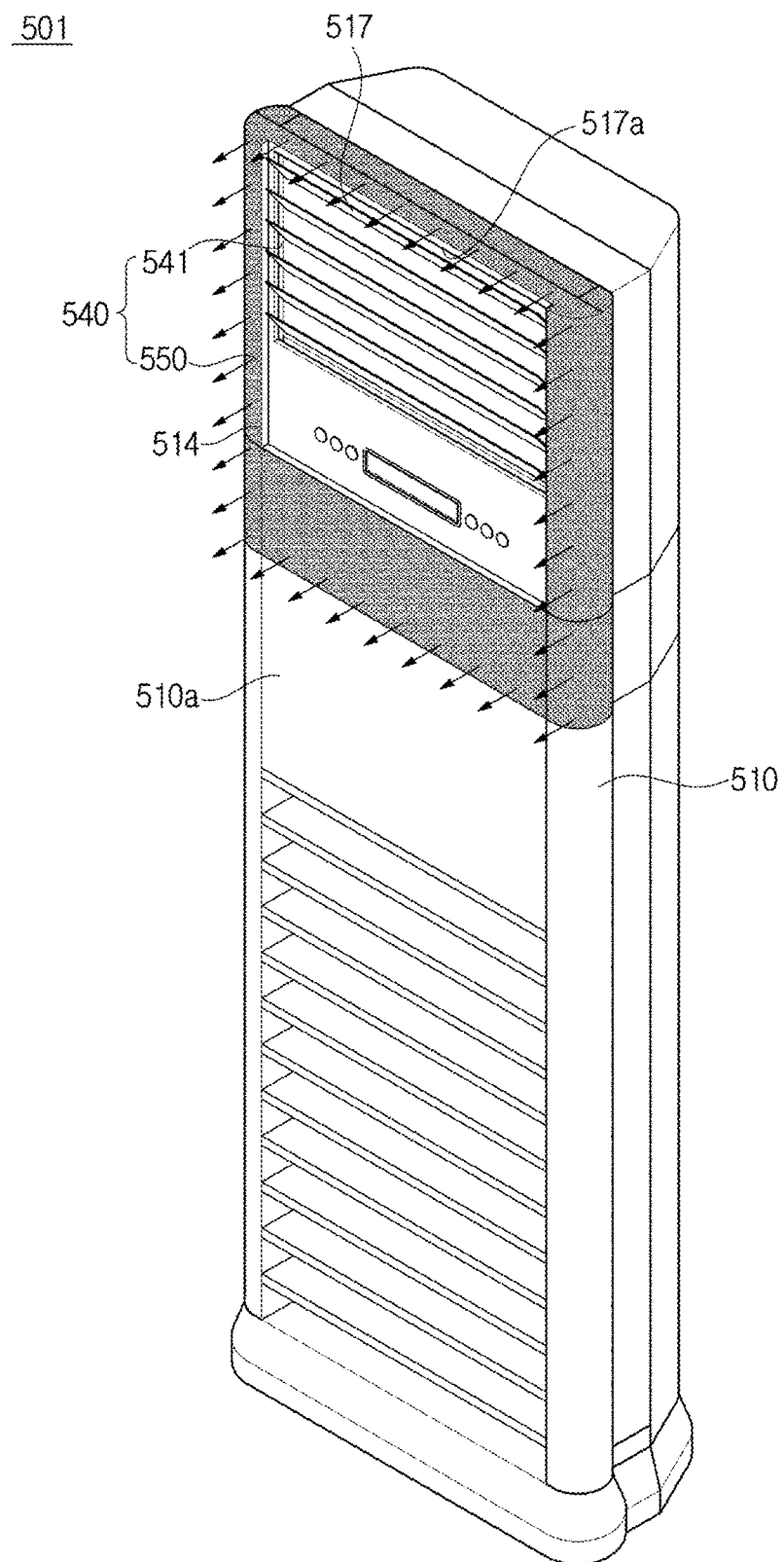

FIGS. 21 and 22 show an air conditioner, according to another embodiment of the present disclosure.

An air conditioner 501 may include a housing 510 having at least one opening 517 and forming the exterior, a heat exchanger (not shown) for exchanging heat with the air flowing into the housing 510, a blower fan (not shown) for circulating air into or out of the housing 510, and an air discharger 540 for discharging the air blown from the blower (not shown) out of the housing 510.

The air discharger 540 may include a first discharger 541 and a second discharger 550.

The first discharger 541 may be formed in an opening 517. The opening 517 may have blades 517a for controlling the direction of air discharged through the first discharger 541. Specifically, the opening 517 may be provided on a front panel 510a. With the opening 517 having the blades 517a, the direction of air discharged through the first discharger 541 may be controlled by operation of the blades 517a. The second discharger 550 is configured to discharge air inside the housing 510 to the outside through a discharging plate 514 of the housing 510.

The housing 510 may include the discharging plate 514 where the second discharger 550 is formed, and the second discharger 550 includes a plurality of holes formed in the discharging plate 514. Although the discharging plate 514 is formed on the front of the housing 510, there are no limitations on where to place the discharging plate 514. For example, it may be formed on the side or on the top.

The second discharger 550 may be provided in the form of a plurality of discharging holes in the discharging plate 514 for uniformly and slowly discharging the air blown by the blower (not shown) through the second discharger 550.

The air conditioner 501 may operate in different operation modes.

The different operation modes may include a first mode in which heat exchanged air is discharged through the first discharger 541, a second mode in which heat exchanged air is discharged through the second discharger 550, and a third mode in which purified air is discharged through the first and second dischargers 541 and 550.

An air conditioner in accordance with still another embodiment of the present disclosure will now be described.

Configurations overlapping with what are described above will be omitted herein.

Figure 23:
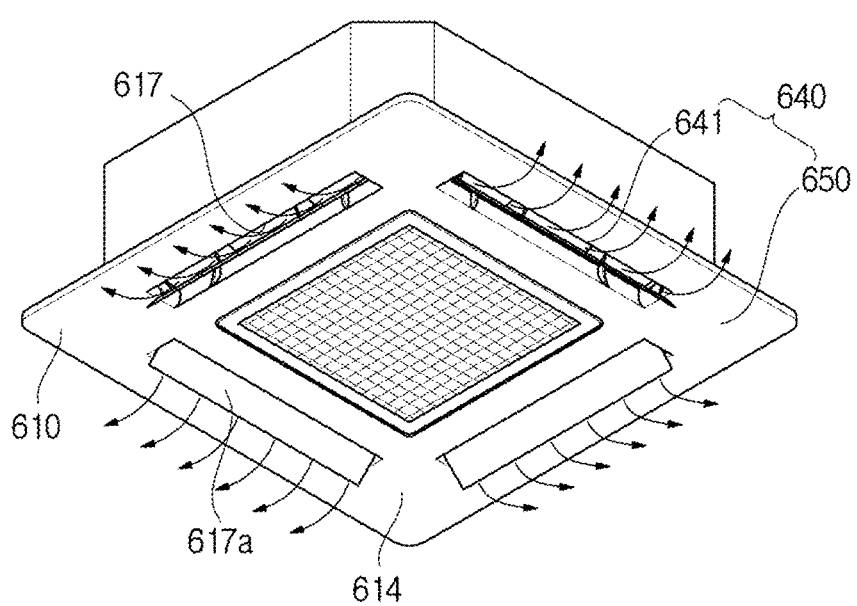
FIGS. 23 and 24 show an air conditioner, according to another embodiment of the present disclosure.
Figure 24:
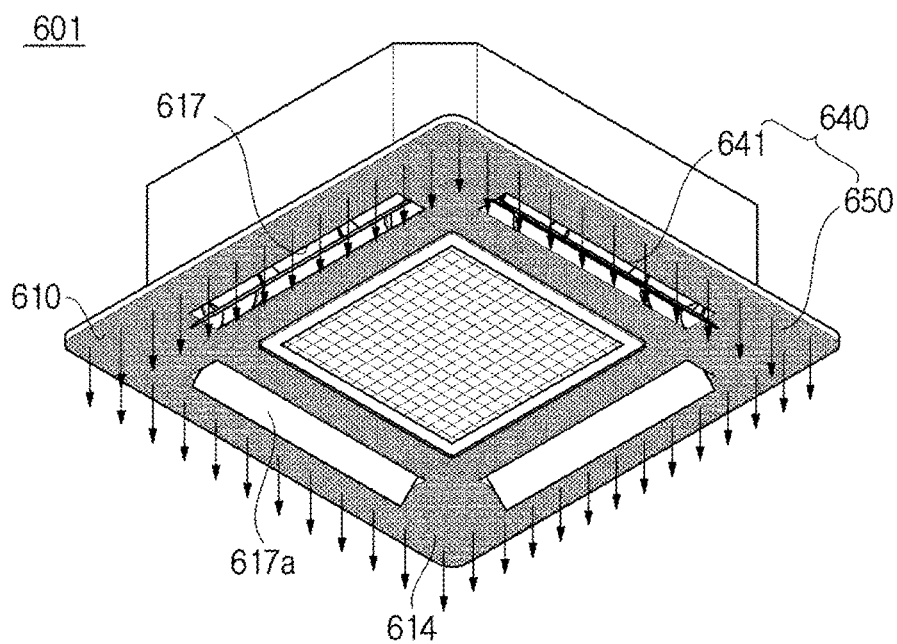

FIGS. 23 and 24 show an air conditioner, according to another embodiment of the present disclosure.

An air conditioner 601 is configured to enter into the ceiling.

The air conditioner 601 may include a housing 610 having at least one opening 617 and forming the exterior, a heat exchanger (not shown) for exchanging heat with the air flowing into the housing 610, a blower (not shown) for circulating air into or out of the housing 610, and an air discharger 640 for discharging the air blown from the blower out of the housing 610. The housing 610 may be provided to be combined with the ceiling. The blower may include a blower fan.

The air discharger 640 may include a first discharger 641 and a second discharger 650.

The first discharger 641 may be formed in an opening 617. The opening 617 may have blades 617a for controlling the direction of air discharged through the first discharger 641. The second discharger 650 is configured to discharge air inside the housing 610 to the outside through a discharging panel 614 of the housing 610.

The housing 610 may include the discharging panel 614 where the second discharger 650 is formed, and the second discharger 650 includes a plurality of holes formed in the discharging panel 614. The housing 610 is placed on the ceiling with the bottom face exposed to the indoor space, so the discharging panel 614 may be provided on the bottom face of the housing 610.

The second discharger 650 may be provided in the form of a plurality of discharging holes in the discharging panel 614 for uniformly and slowly discharging the air blown by the blower through the second discharger 650.

The air conditioner 601 may operate in different operation modes.

The different operation modes may include a first mode in which heat exchanged air is discharged through the first discharger 641, a second mode in which heat exchanged air is discharged through the second discharger 650, and a third mode in which purified air is discharged through the first and second dischargers 641 and 650.

An air conditioner in accordance with still another embodiment of the present disclosure will now be described.

Configurations overlapping with what are described above will be omitted herein.

Figure 25:
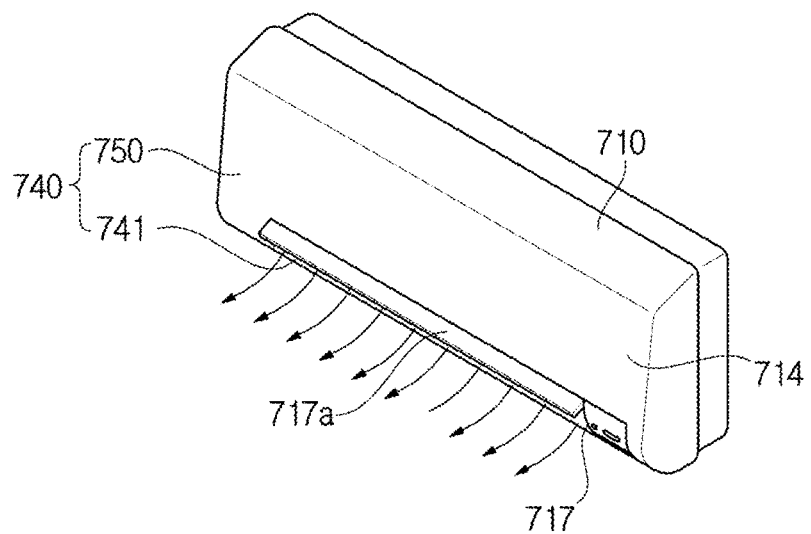
FIGS. 25 and 26 show an air conditioner, according to another embodiment of the present disclosure.
Figure 26:
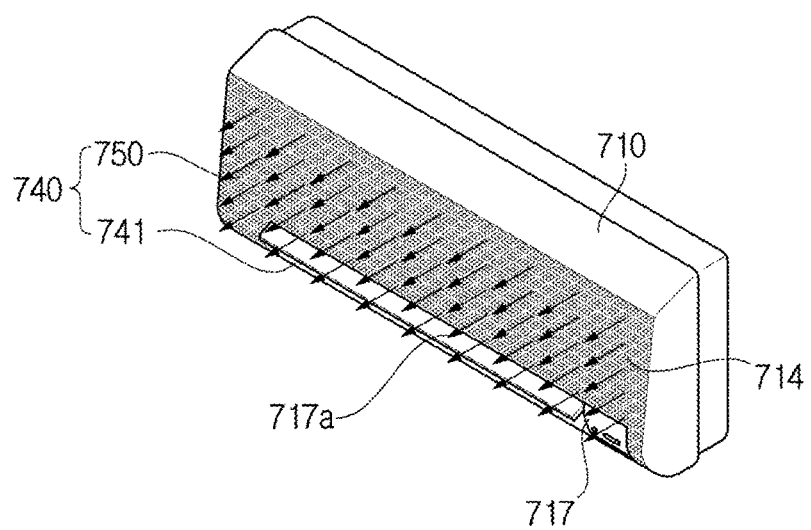

FIGS. 25 and 26 show an air conditioner, according to another embodiment of the present disclosure.

An air conditioner 701 is arranged to be fixed to the wall.

The air conditioner 701 may include a housing 710 having at least one opening 717 and forming the exterior, a heat exchanger (not shown) for exchanging heat with the air flowing into the housing 710, a blower (not shown) for circulating air into or out of the housing 710, and an air discharger 740 for discharging the air blown from the blower out of the housing 710. The housing 710 may be fixed to an indoor wall. The blower may include a blower fan.

The air discharger 740 may include a first discharger 741 and a second discharger 750.

The first discharger 741 may be formed in an opening 717. The opening 717 may have blades 717a for controlling the direction of air discharged through the first discharger 741. The second discharger 750 is configured to discharge air inside the housing 710 to the outside through a discharging panel of the housing 710.

The housing 710 may include the discharging plate 714 where the second discharger 750 is formed, and the second discharger 750 includes a plurality of holes formed in the discharging plate 714. Although the discharging plate 714 is formed on the front of the housing 710, there are no limitations on where to place the discharging plate 714. For example, it may be formed on the side or on the top.

The second discharger 750 may be provided in the form of a plurality of discharging holes in the discharging plate 714 for uniformly and slowly discharging the air blown by the blower through the second discharger 750.

The air conditioner 701 may operate in different operation modes.

The different operation modes may include a first mode in which heat exchanged air is discharged through the first discharger 741, a second mode in which heat exchanged air is discharged through the second discharger 750, and a third mode in which purified air is discharged through the first and second dischargers 741 and 750.

An air conditioner in accordance with still another embodiment of the present disclosure will now be described.

Configurations overlapping with what are described above will be omitted herein.

Figure 27:
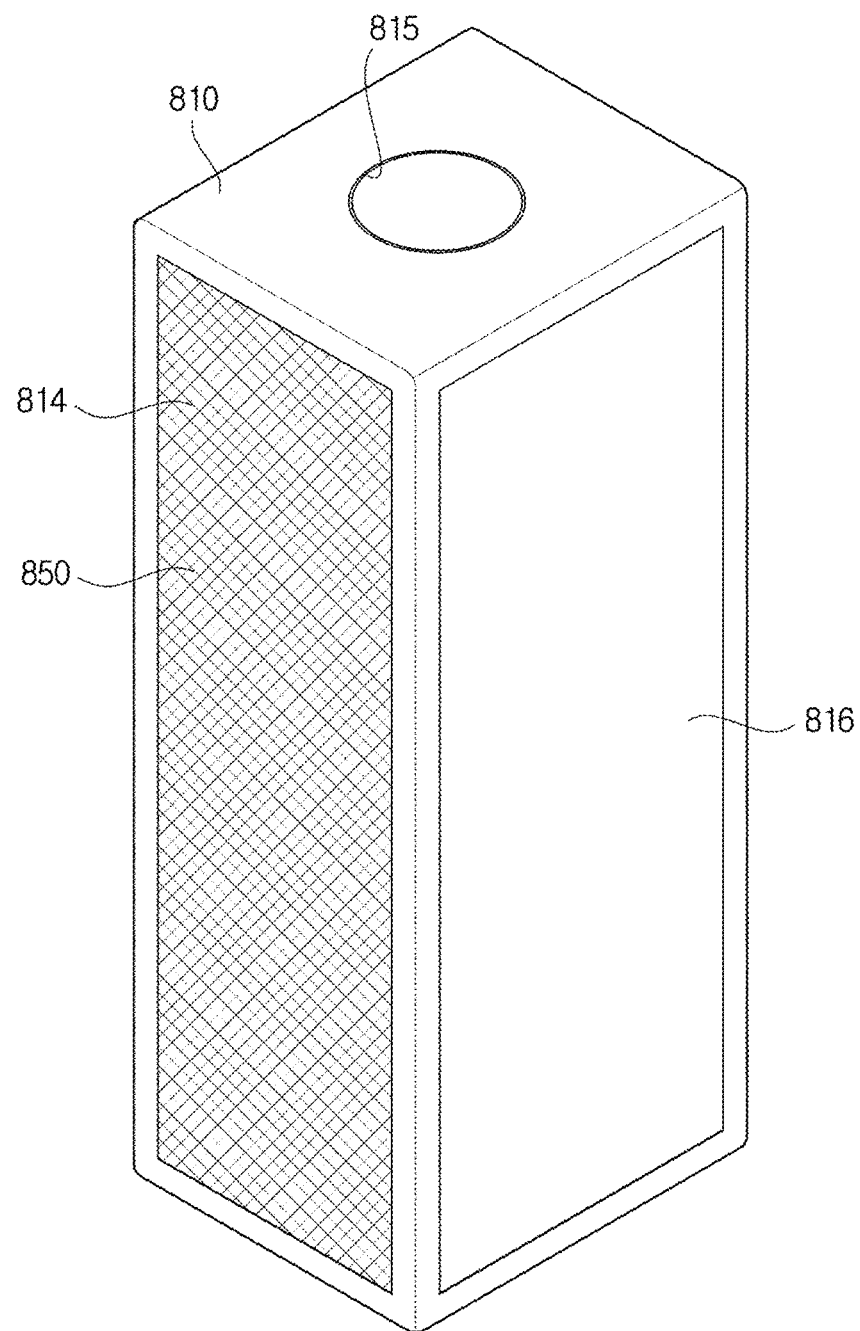
FIGS. 27 and 28 show an air conditioner, according to another embodiment of the present disclosure.
Figure 28:
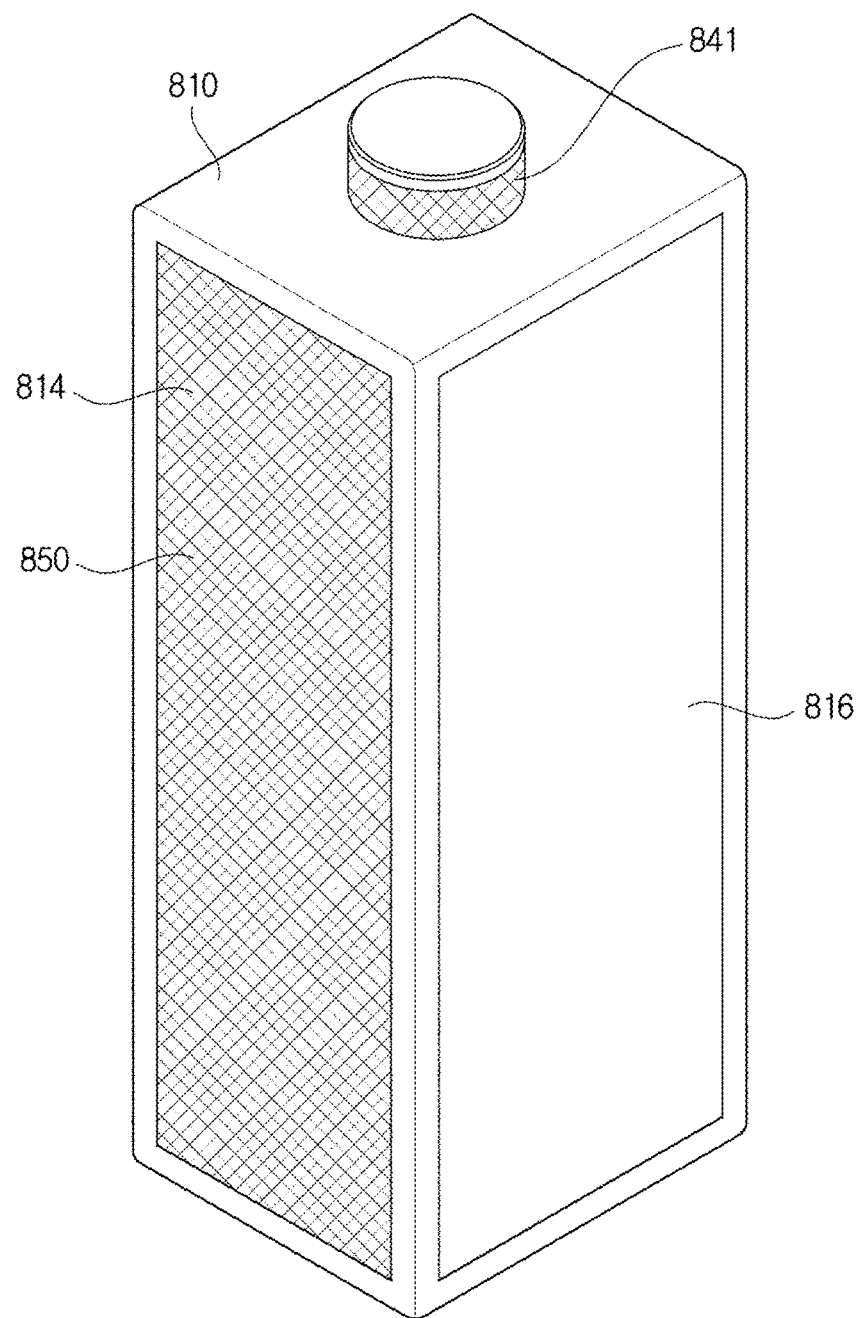

FIGS. 27 and 28 show an air conditioner, according to another embodiment of the present disclosure.

As a type of air conditioner, an air purifier 801 will be described.

The air purifier 801 may include a housing 810 forming the exterior, a sucking part 816 arranged on one side of the housing 810 for sucking in outside air of the housing 810, and an air discharger for discharging the air flowing in through the sucking part 816 to the outside of the housing 810.

Furthermore, the air purifier 801 may include a dust collector filter placed inside the housing 810 for adsorbing and filtering out foreign materials such as dust, odor particles, etc., contained in the air, and a blower (not shown) for performing blowing operation to discharge the indoor air sucked in through the sucking part 816 and purified by the dust collector filter through the air discharger.

The air discharger may include a first discharger 841 and a second discharger 850.

The first discharger 841 is configured to discharge the air purified by the dust collector filter at a high wind velocity, and the second discharger 850 is configured to discharge the air purified by the dust collector filter through a discharge panel of the housing 810 at a low wind velocity.

The first discharger 841 is provided in the form of an opening on the housing 810 for directly discharging the air blown by the blower (not shown).

The housing 810 may include the discharging plate 814 where the second discharger 850 is formed, and the second discharger 850 includes a plurality of holes formed in the discharging plate 814.

The second discharger 850 may be provided in the form of a plurality of discharging holes in the discharging plate 814 for uniformly and slowly discharging the air blown by the blower through the plurality of discharging holes.

The air purifier 801 may operate in different operation modes.

The different operation modes may include a first mode in which the purified air is discharged through the first discharger 841, a second mode in which the purified air is discharged through the second discharger 850, and a third mode in which the purified air is discharged through the first and second dischargers 841 and 850.

Driving the door unit 60 and controlling discharged air flows according to the driving of the door unit 60 will now be described in accordance with an embodiment of the present disclosure. Configurations overlapping with what are described above will be omitted herein.

Figure 29:
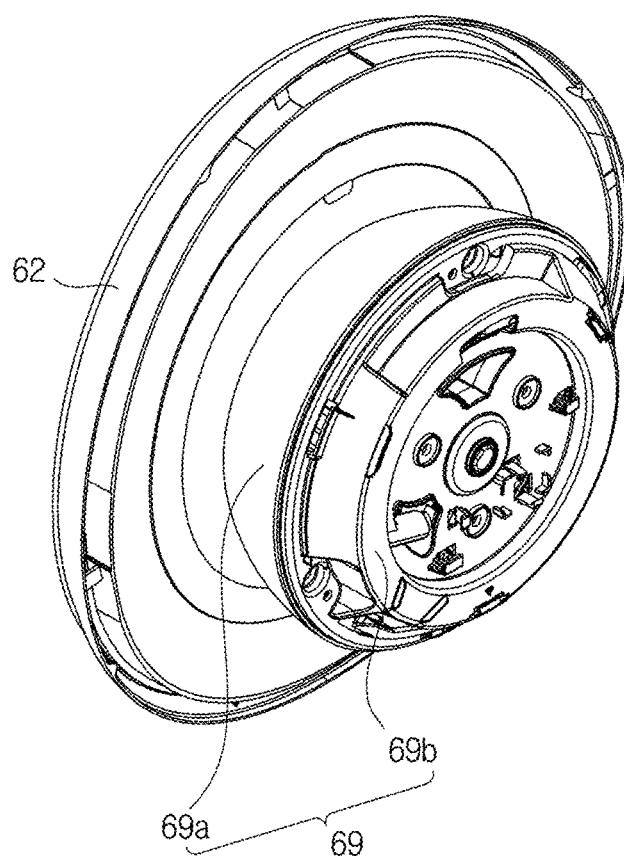
FIG. 29 is a rear perspective view of a door unit, according to an embodiment of the present disclosure.
Figure 30:
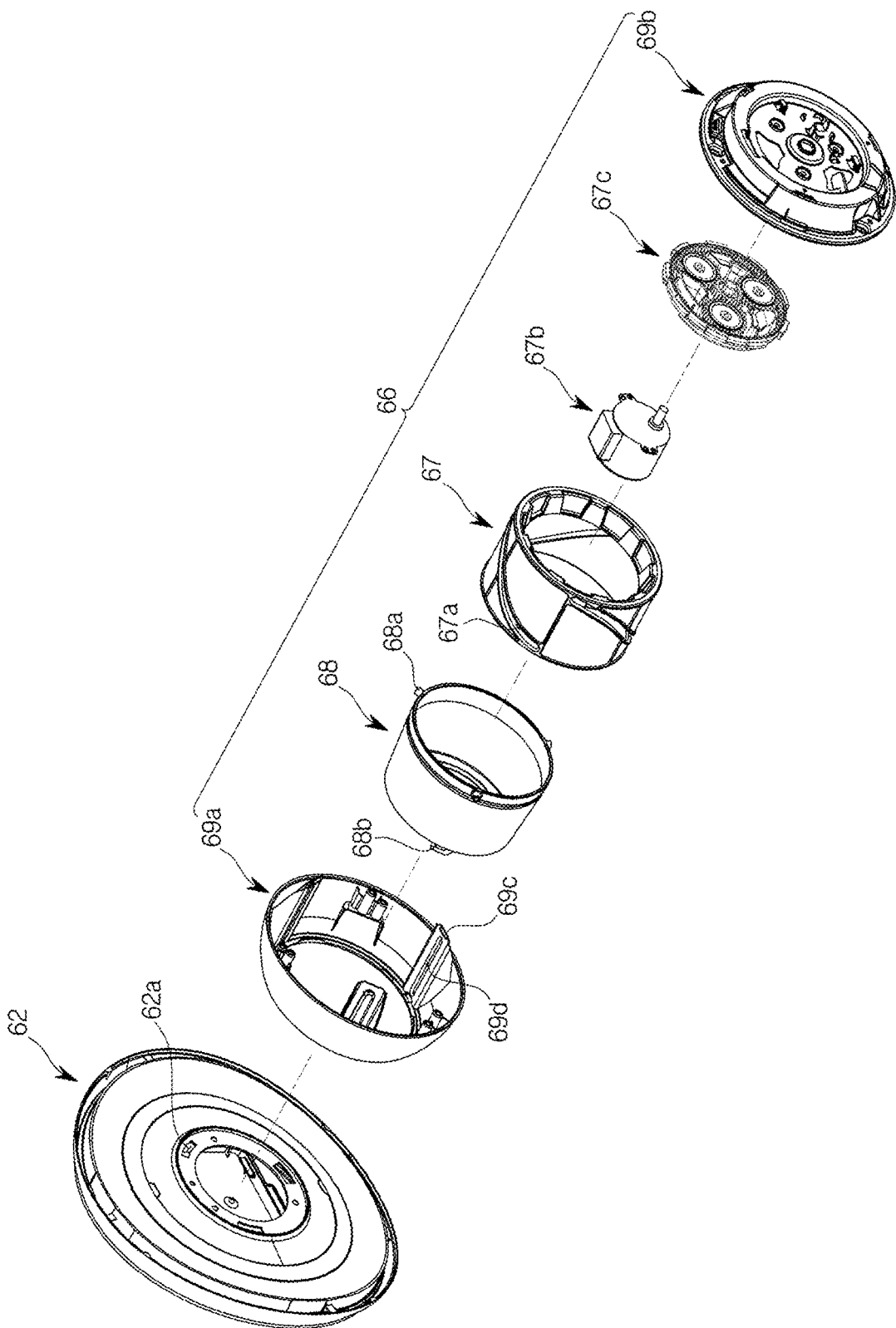
FIG. 30 is an exploded perspective view illustrating a structure of the door unit of FIG. 29
Figure 31:
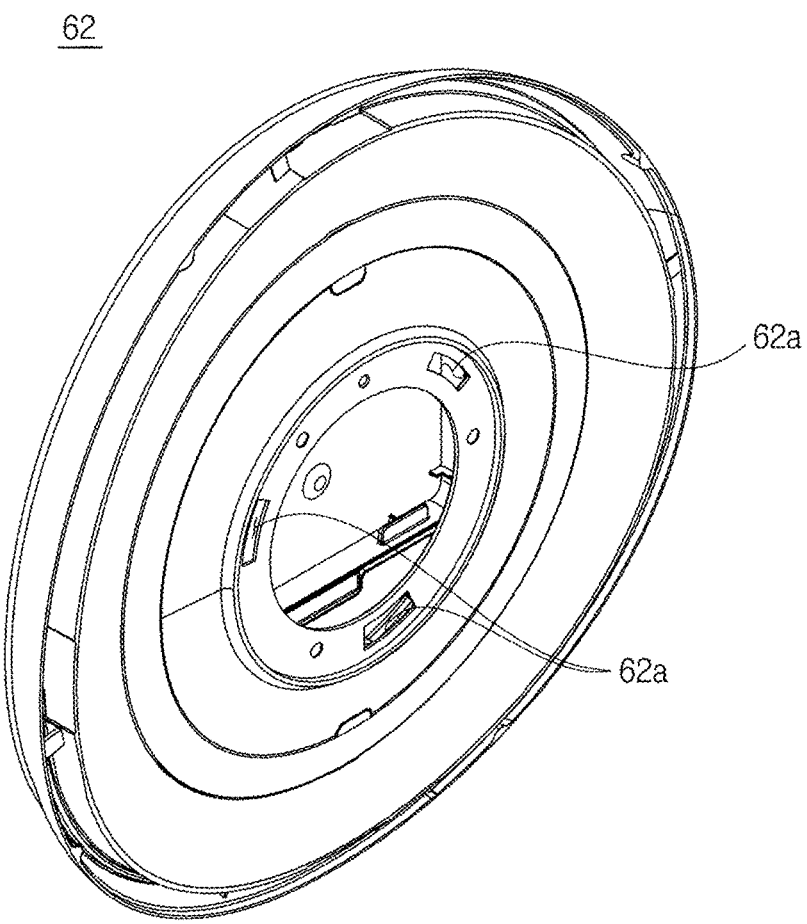
FIG. 31 shows a door blade of the door unit of FIG. 29
Figure 32:
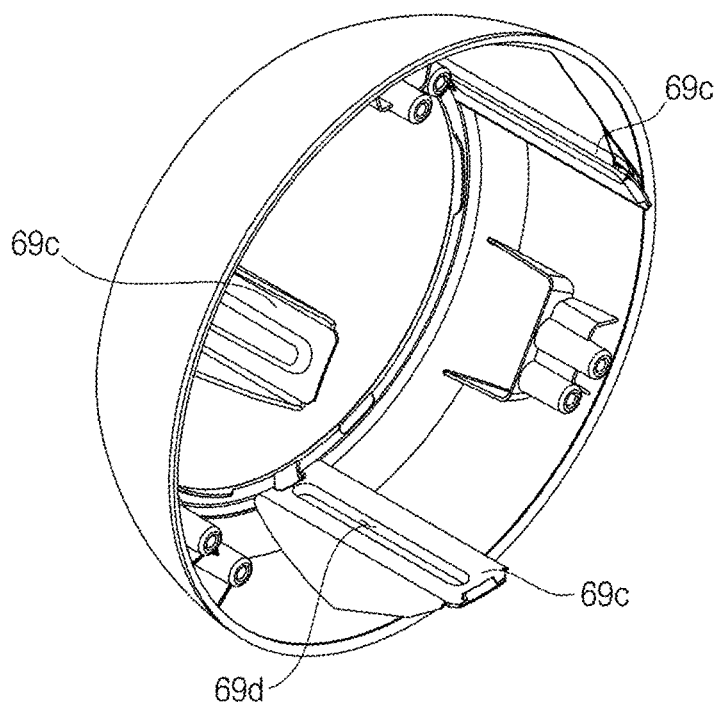
FIG. 32 shows a first housing cover of the door unit of FIG. 29
Figure 33:
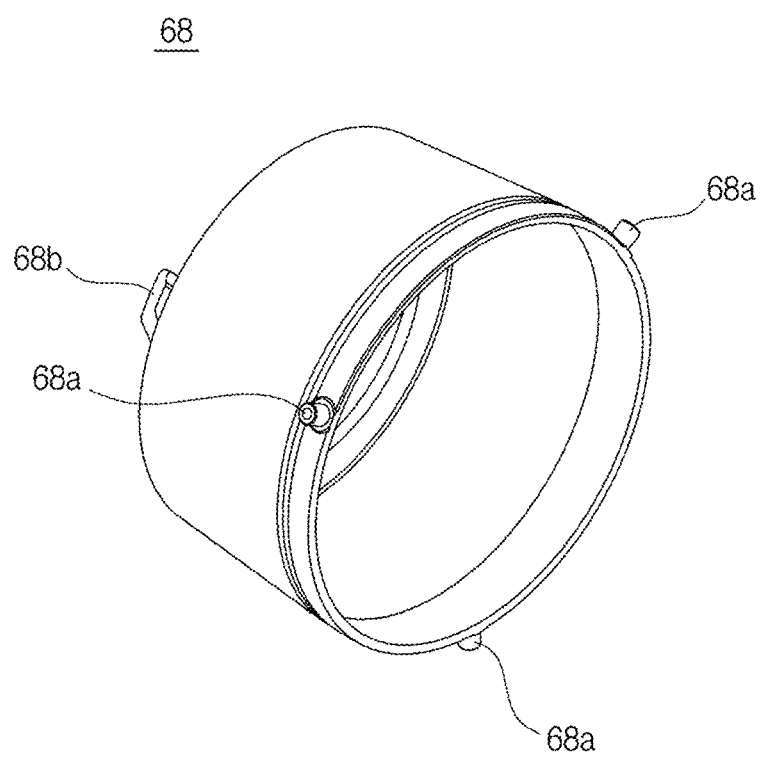
FIG. 33 shows an inner housing of the door unit of FIG. 29
Figure 34:
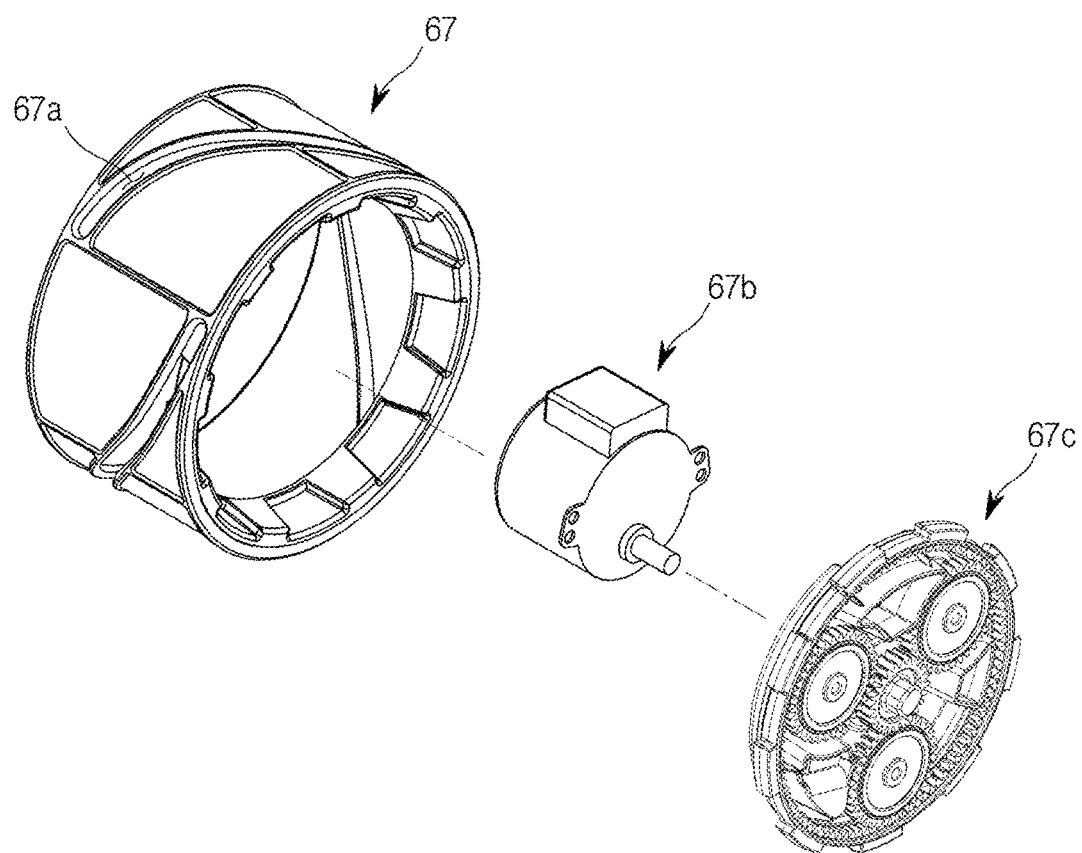
FIG. 34 shows structures of an outer housing and a power transfer part of the door unit off FIG. 29.
Figure 35:
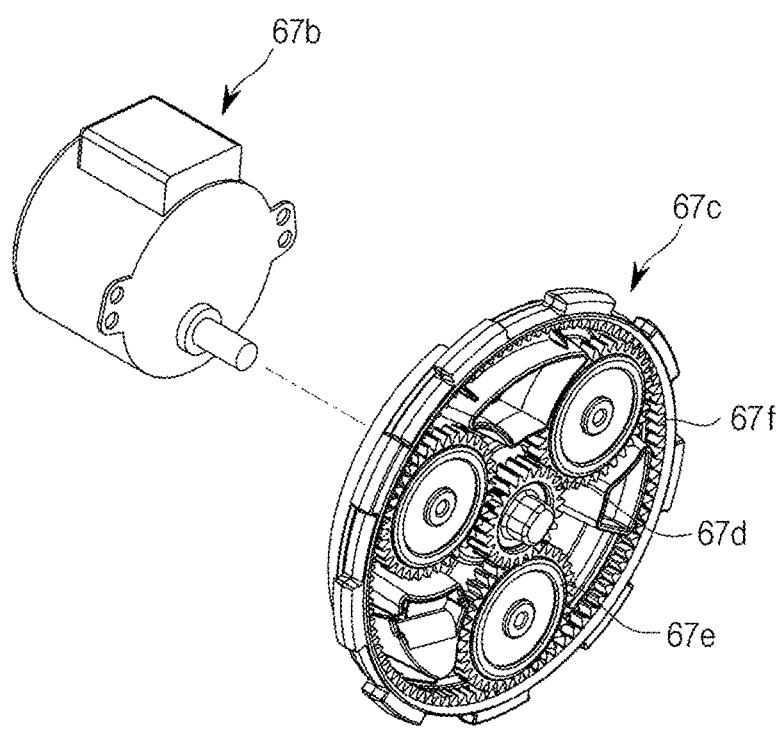
FIG. 35 shows a coupling relationship between a gear part and the power transfer part to be coupled with the outer housing of the door unit of FIG. 29.

FIG. 29 is a rear perspective view of a door unit, according to an embodiment of the present disclosure, FIG. 30 is an exploded perspective view illustrating a structure of the door unit of FIG. 29, FIG. 31 shows a door blade of the door unit of FIG. 29, FIG. 32 shows a first housing cover of the door unit of FIG. 29, FIG. 33 shows an inner housing of the door unit of FIG. 29, FIG. 34 shows structures of an outer housing and a power transfer part of the door unit of f FIG. 29, FIG. 35 shows a coupling relationship between a gear part and the power transfer part to be coupled with the outer housing of the door unit of FIG. 29, and FIGS. 36 to 38 show a flow path in an air conditioner, through which the heat exchanged air is discharged by driving of the door unit of FIG. 29.

Referring to FIGS. 29 to 38, the door unit 60 in accordance with an embodiment of the present disclosure may include the door blade 62 for opening or closing the opening 17 (see FIG. 3) and the door operating part 66 for moving the door blade 62 forward or backward.

The door operating part 66 may include an outer housing 67, an inner housing 68, a power transfer part 67b, and a housing cover 69.

The outer housing 67 may have at least one first guide 67a diagonally formed thereon at an angle against the side. The first guide 67a may guide the direction of movement of a first coupling portion 68a of the inner housing 68, as will be described later, after the first coupling portion 68a is inserted to the first guide 67a.

A gear part 67c may be formed on one side of the outer housing 67. The gear part 67c may be connected to the power transfer part 67b for rotating the outer housing 67 with rotational force produced from the power transfer part 67b. The gear part 67c may include a first gear 67d coupled to the power transfer part 67b, a second gear 67e formed inside the outer housing 67, and a third gear 67f engaged with the first and second gears 67d and 67e. The power transfer part 67b may be coupled to the gear part 67c inside the outer housing 67.

The inner housing 68 may be arranged inside the outer housing 67. The inner housing 68 may have the first coupling portion 68a formed thereon to be combined with the first guide 67a. The first coupling portion 68a may be formed at a position to be inserted to the first guide 67a.

The inner housing 68 may have a second coupling portion 68b formed thereon to be combined with a combining hole 62a formed on the bottom of the door blade 62. The second coupling portion 68b may be formed on the opposite side to the door blade 62. The second coupling portion 68b may be provided at a position to be inserted to the combining hole 62a.

The housing cover 69 may include a first housing cover 69a and a second housing cover 69b.

The first housing cover 69a may be combined with the inner housing 68 and the door blade 62. The first housing cover 69a may have a second guide 69c, 69d formed therein. The second guide 69c, 69d may guide the first coupling portion 68a to move in the parallel direction to the moving direction of the door blade 62. The second guide 69c, 69d may be formed for the first coupling portion 68a to move along the second guide groove 69d.

The door operating part 66 may move the door blade 62 forward or backward using the rotational force produced from the power transfer part 67b.

The rotational force produced from the power transfer part 67b rotates the outer housing 67 through the gear part 67c, enabling the inner housing 68 and the first housing cover 69a to be moved forward or backward from the air conditioner with the first coupling portion 68a combined with the first guide 67a of the outer housing 67 and the second guide 69c, 69d. This may enable the door operating part 66 to open or close the opening 17 (see FIG. 3) by moving the door blade 62 forward or backward.

Figure 36:
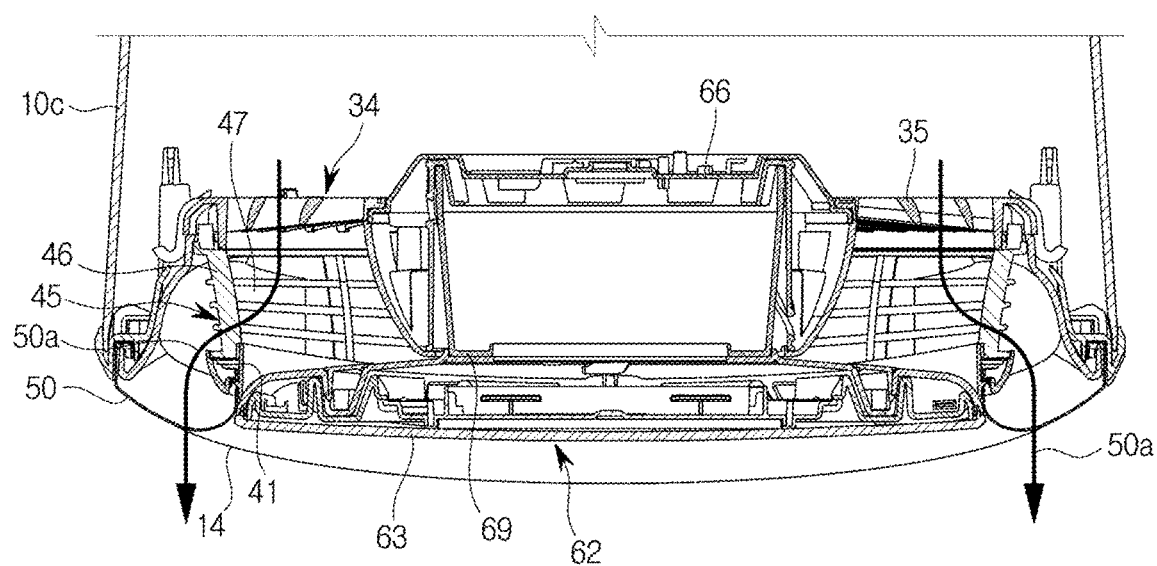
FIGS. 36 to 38 show a flow path in an air conditioner, through which the heat exchanged air is discharged by driving of the door unit of FIG. 29.
Figure 37:
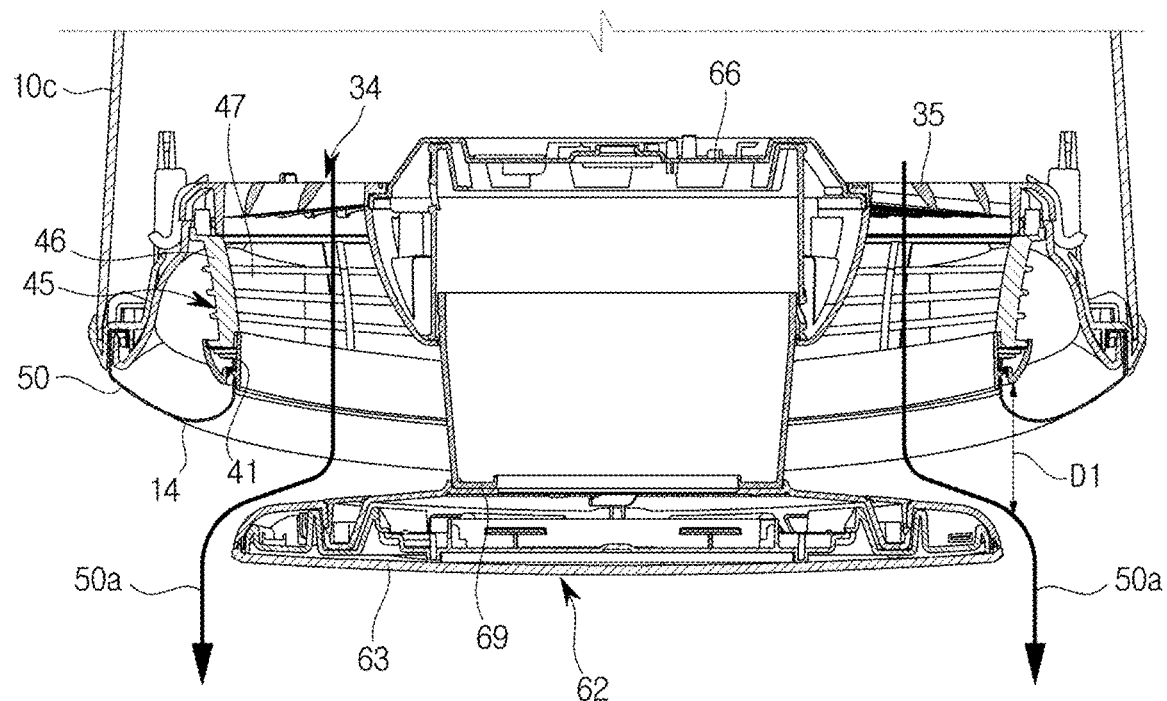
Figure 38:
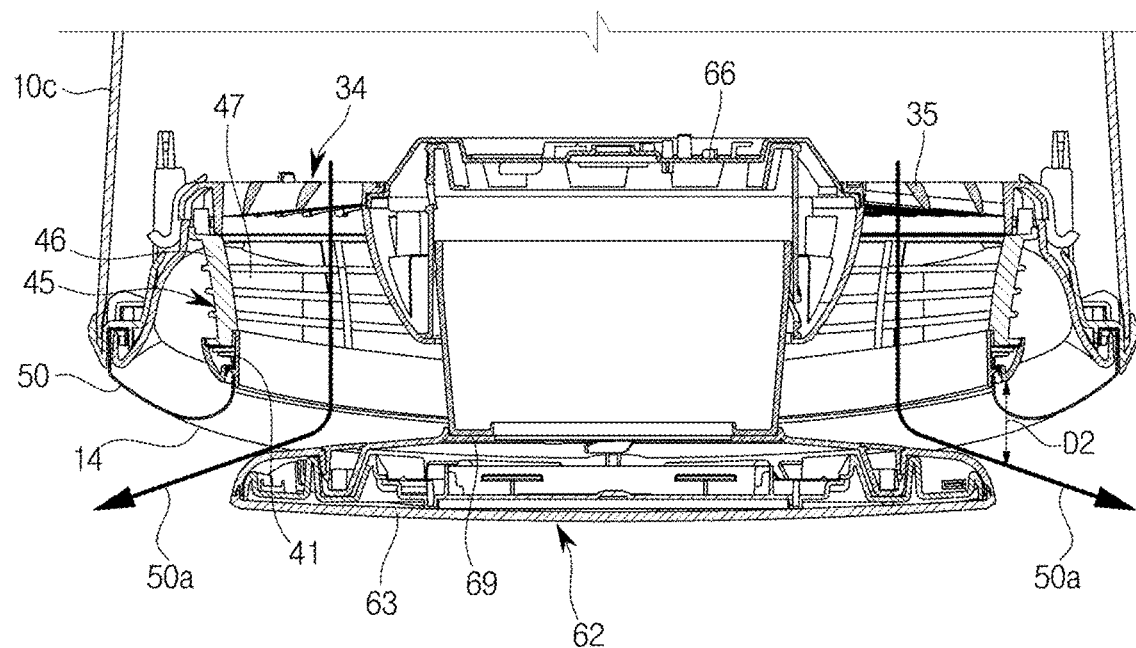

As shown in FIGS. 36 to 38, with the operation of the door unit 60, the moving direction of the air discharged through the opening 17 may be controlled.

As shown in FIG. 36, while the door unit 60 closes the opening 17, the heat exchanged air may be discharged through the second discharger 50 formed on the outer side of the opening 17.

As shown in FIG. 37, with the gap of first distance D1 between the door unit 60 and the opening 17, the air discharged through the first discharger 41 may move forward from the air conditioner in a straight line. The first distance D1 may be set to 45 to 55 mm.

As shown in FIG. 38, with the gap of second distance D2 between the door unit 60 and the opening 17, the air discharged through the first discharger 41 may be radially discharged from the opening 17 of the air conditioner. The second distance D2 may be set to 25 to 45 mm.

The door unit 60 may further include a controller (not shown) for controlling the air discharged from the opening 17 to move forward in a straight line or to be radially discharged from the opening 17 by controlling the distance between the door blade 62 and the opening 17. The controller may control the rotational direction of the power transfer part 67b for the door unit 60 to open or close the opening 17. The controller may also control the rotational direction of the power transfer part 67b for the door unit 60 to open or close the opening 17, thereby controlling the direction of air discharged from the first discharger 41.

A door unit 70 of the air conditioner in accordance with another embodiment of the present disclosure will now be described.

Configurations overlapping with what are described above will be omitted herein.

Figure 39:
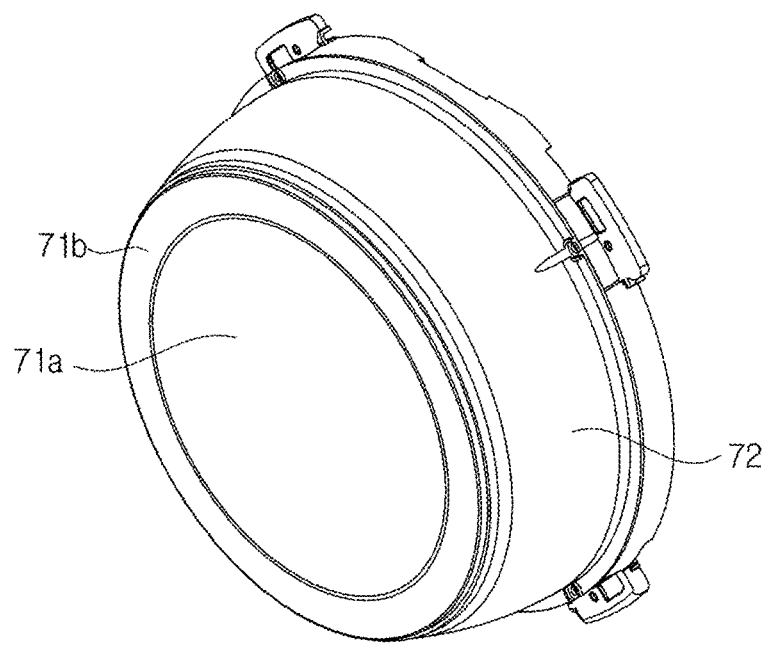
FIG. 39 is a perspective view of a door unit, according to another embodiment of the present disclosure
Figure 40:
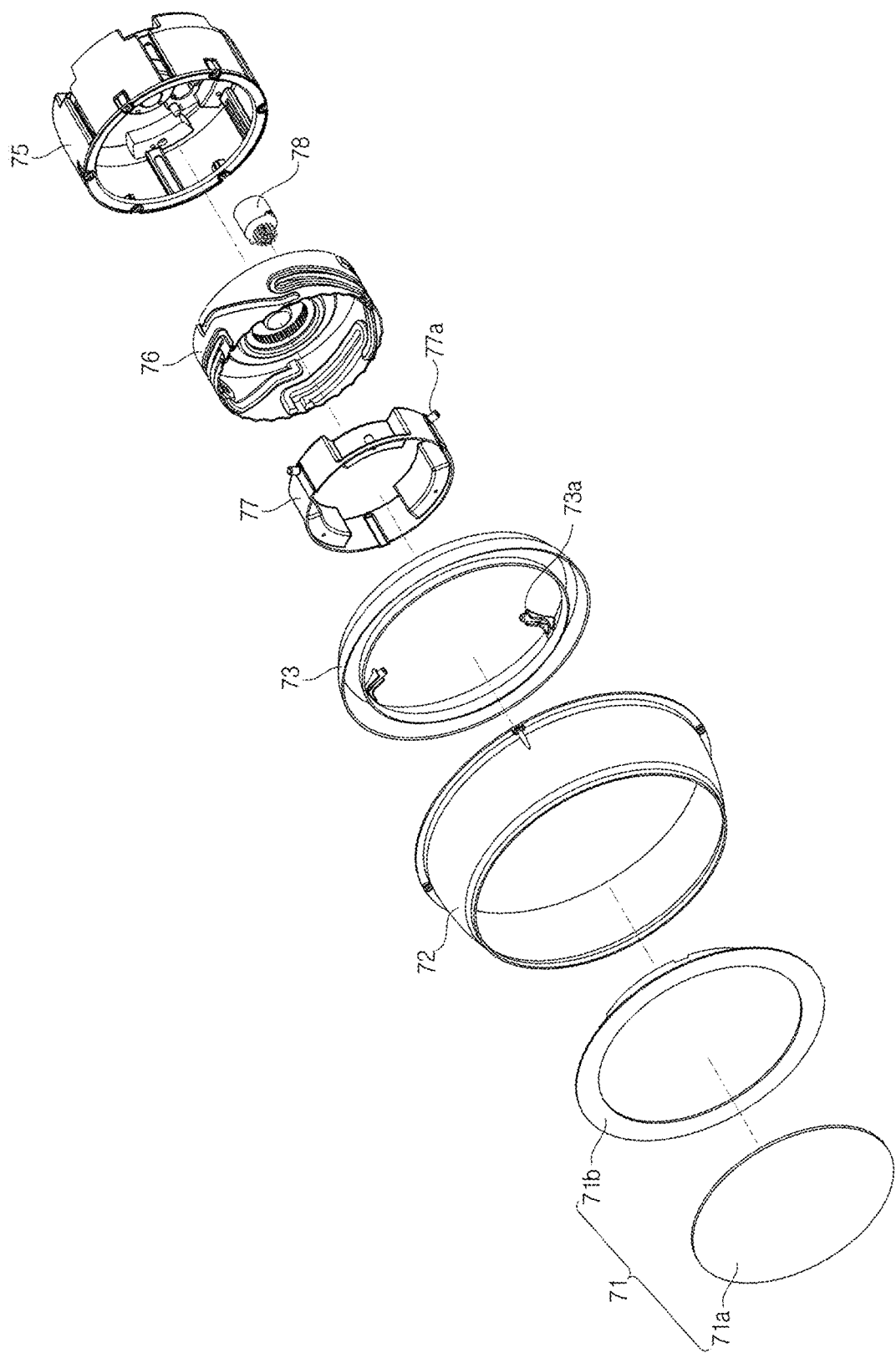
FIG. 40 is an exploded perspective view illustrating a structure of the door unit of FIG. 39
Figure 41:
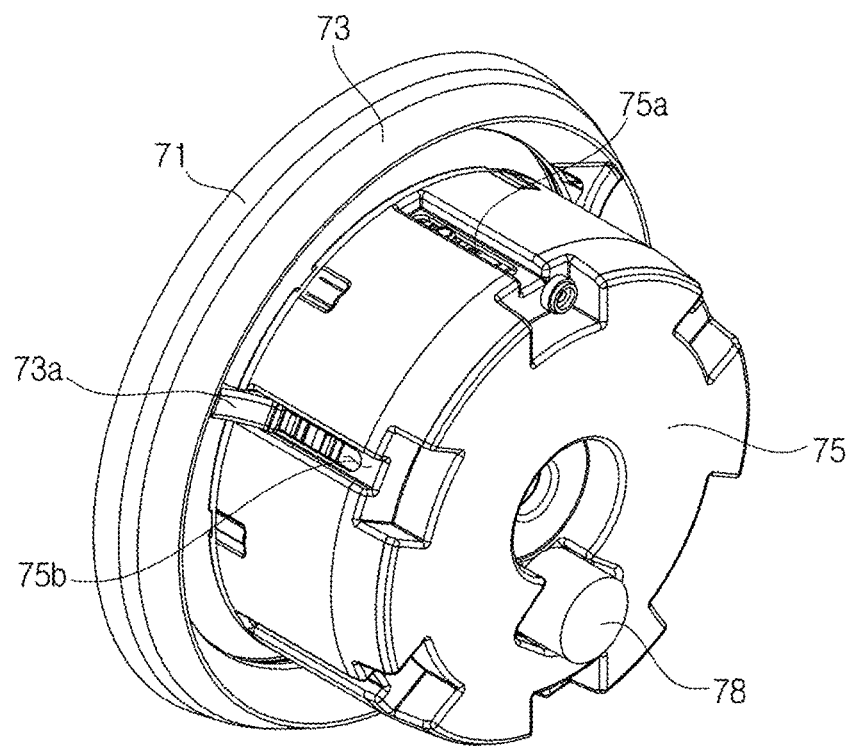
FIG. 41 is a rear view of a door operating part in the door unit of FIG. 39.
Figure 42:
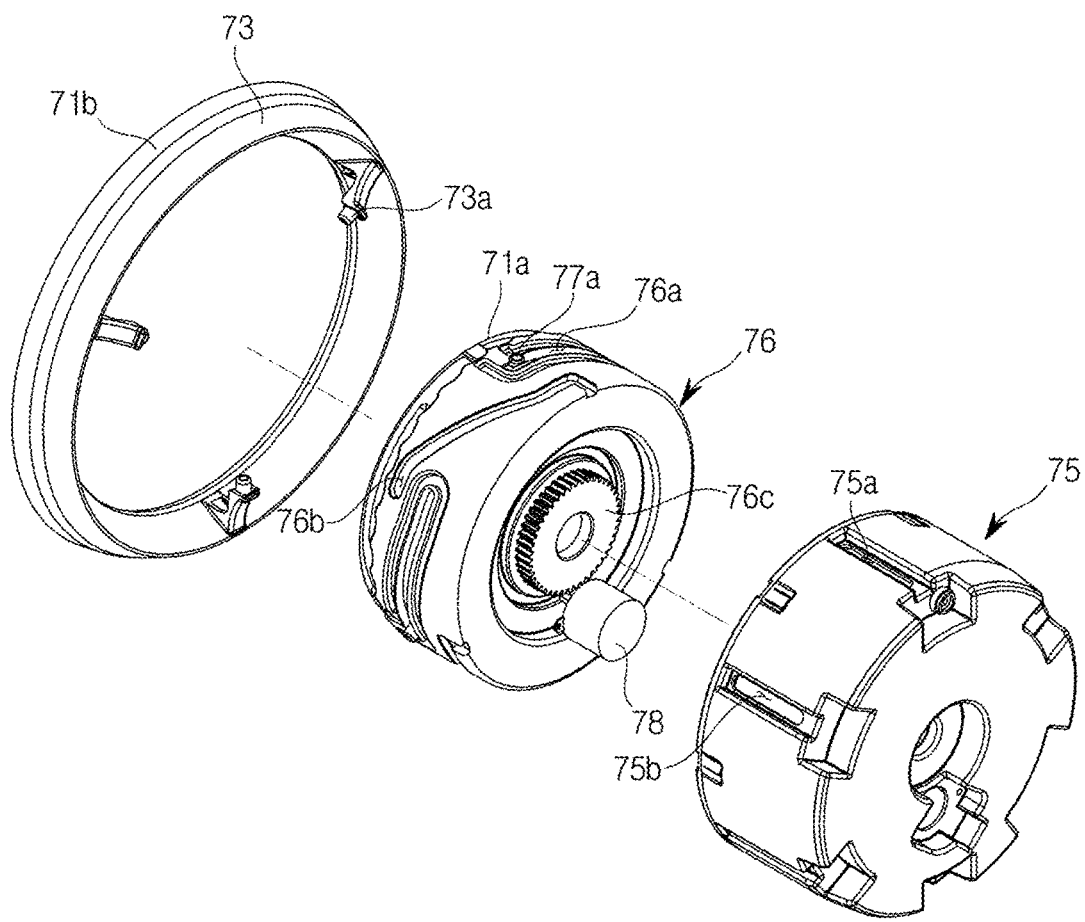
FIG. 42 shows the door operating part of the door unit of FIG. 39, which is separated from an outer housing.
Figure 43:
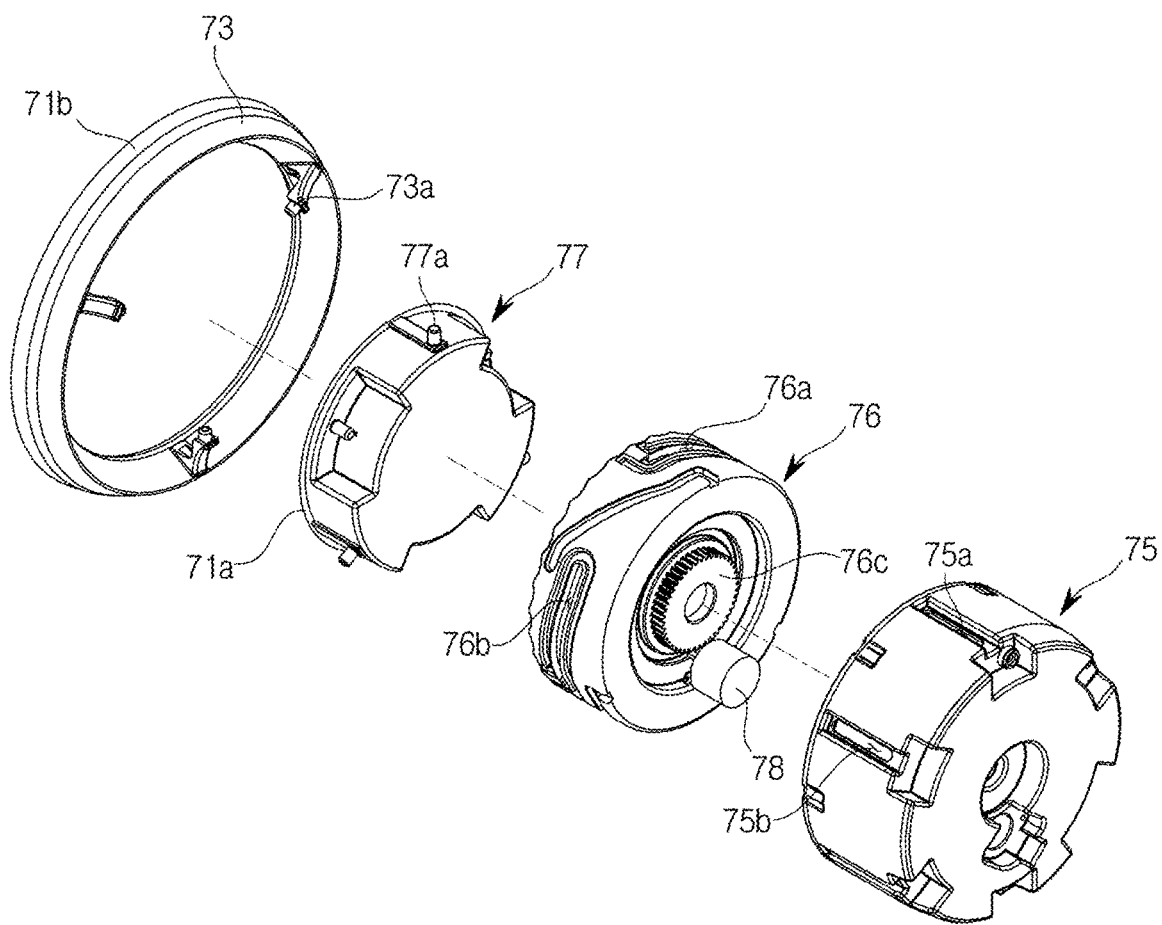
FIG. 43 shows the door operating part of the door unit of FIG. 39, which is separated from the outer housing, an inner housing, and a housing cover.
Figure 44:
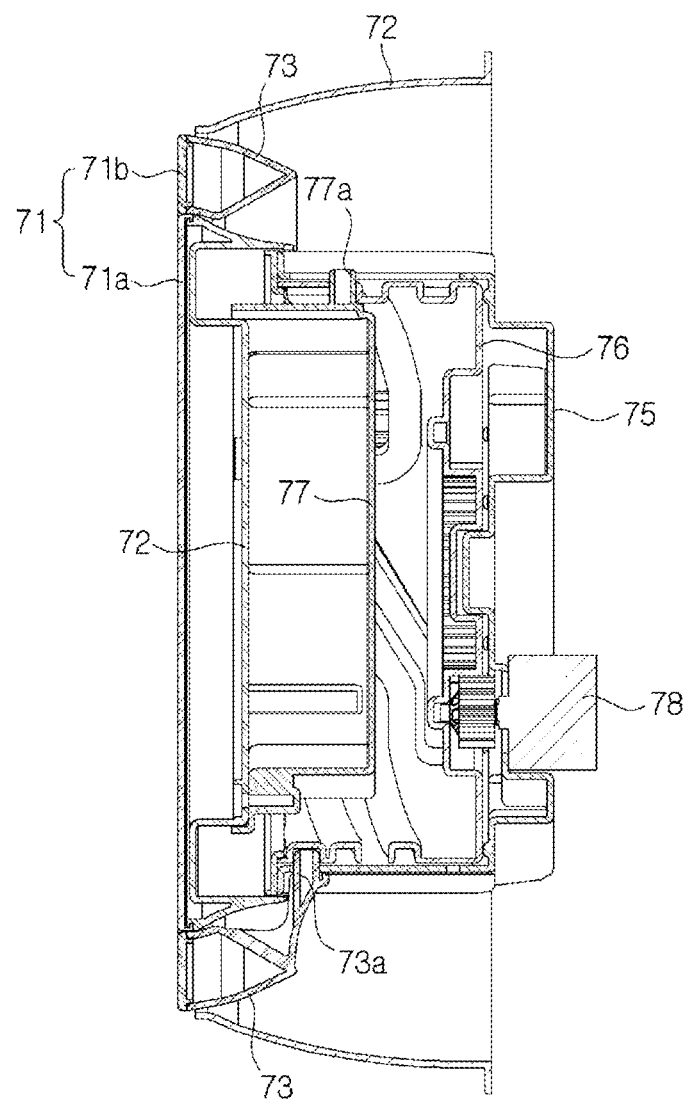
FIGS. 44 to 46 show driving of the door unit of FIG. 39.
Figure 45:
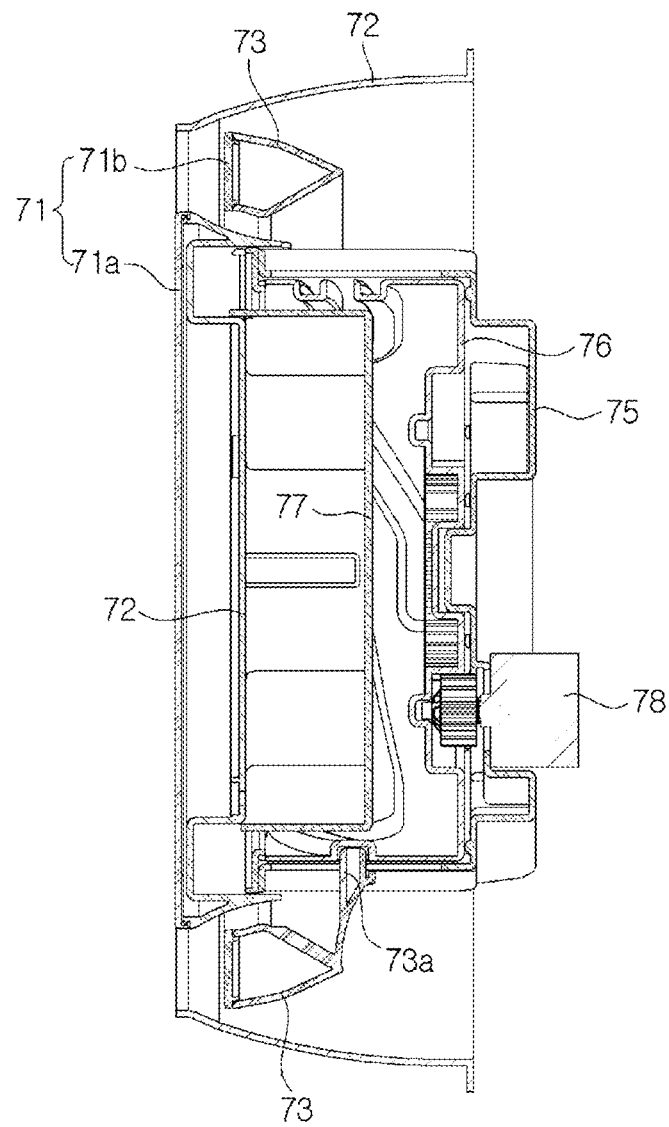
Figure 46:
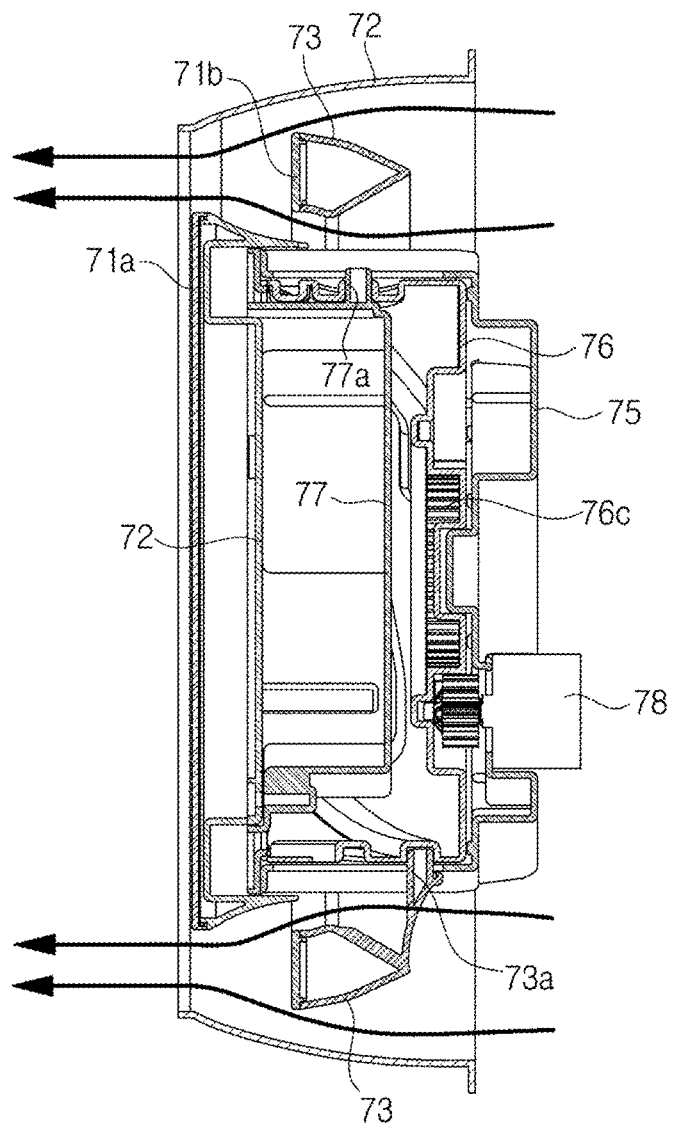

FIG. 39 is a perspective view of a door unit, according to another embodiment of the present disclosure, FIG. 40 is an exploded perspective view illustrating a structure of the door unit of FIG. 39, FIG. 41 is a rear view of a door operating part in the door unit of FIG. 39, FIG. 42 shows the door operating part of the door unit of FIG. 39, which is separated from an outer housing, FIG. 43 shows the door operating part of the door unit of FIG. 39, which is separated from the outer housing, an inner housing, and a housing cover, and FIGS. 44 to 46 show driving of the door unit of FIG. 39.

Referring to FIGS. 39 to 46, the door unit 70 in accordance with another embodiment of the present disclosure may include a door blade 71 for opening or closing the opening 17 (see FIG. 3), a door operating part 75, 76, 77 and a driver 78 for moving the door blade 71 forward or backward.

The door blade 71 may include a first blade 71a and a second blade 71b in the form of a ring enclosing the outside of the first blade 71a. The first and second blades 71a and 71b may open or close the opening 17 while moving separately.

The door unit 70 may further include a first housing cover 73 on which a first coupling portion 73a is formed for the second blade 71b to be driven separately from the first blade 71a. The first housing cover 73 may move the second blade 71b forward or backward. The first housing cover 73 may be provided to be moved as the first coupling portion 73a is combined with first and third guides 75b and 76b, which will be described later.

The first blade 71a may be combined with the housing cover 77 and moved forward or backward along with the movement of the housing cover 77. The housing cover 77 may have a second coupling portion 77a formed thereon and may be moved forward or backward as the second coupling portion 77a is combined with second and forth guides 75a and 76a.

The outer housing 75 may have the first guide 75b and the second guide 75a on a side. The first guide 75b may be combined with the first coupling portion 73a of the first housing cover 73 to guide the movement of the first housing cover 73 and the second blade 71b. The second guide 75a may be combined with the second coupling portion 77a of the housing cover 77 to guide the movement of the housing cover 77 and the first blade 71a.

The inner housing 76 may have the third and fourth guides 76b and 76a on a side. The third guide 76b may be configured to have at least a portion facing the first guide 75b. The third guide 76b may be combined with the first coupling portion 73a of the first housing cover 73 to guide the movement of the first housing cover 73 and the second blade 71b.

The fourth guide 76a may be configured to have at least a portion facing the second guide 75a. The fourth guide 76a may be combined with the first coupling portion 73a of the first housing cover 73 to guide the movement of the first housing cover 73 and the second blade 71b.

The door unit 70 may further include a border part 72 for separating the door unit 70 into inside and outside to form a fluid path in the door unit 70. The door unit 70 may form the fluid path on the inner side of the border part 72.

The door unit 70 may improve the effect of moving the air discharged from the first discharger 41 in a straight line as the first and second blades 71a and 71b move to the inside of the air conditioner. This may improve an efficiency of the air conditioner.

A door unit 80 of the air conditioner in accordance with another embodiment of the present disclosure will now be described.

Configurations overlapping with what are described above will be omitted herein.

Figure 47:
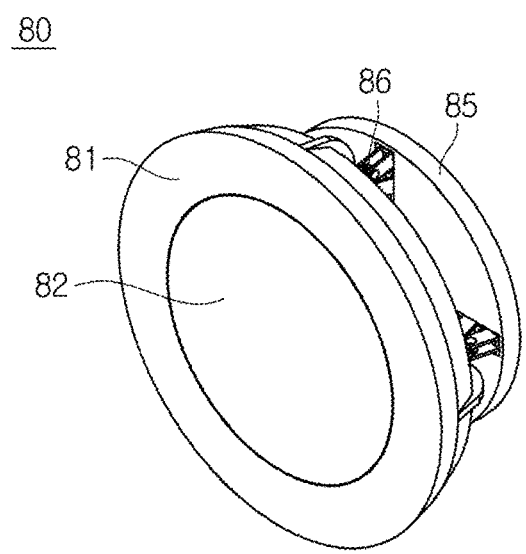
FIG. 47 is a perspective view of a door unit, according to another embodiment of the present disclosure.
Figure 48:
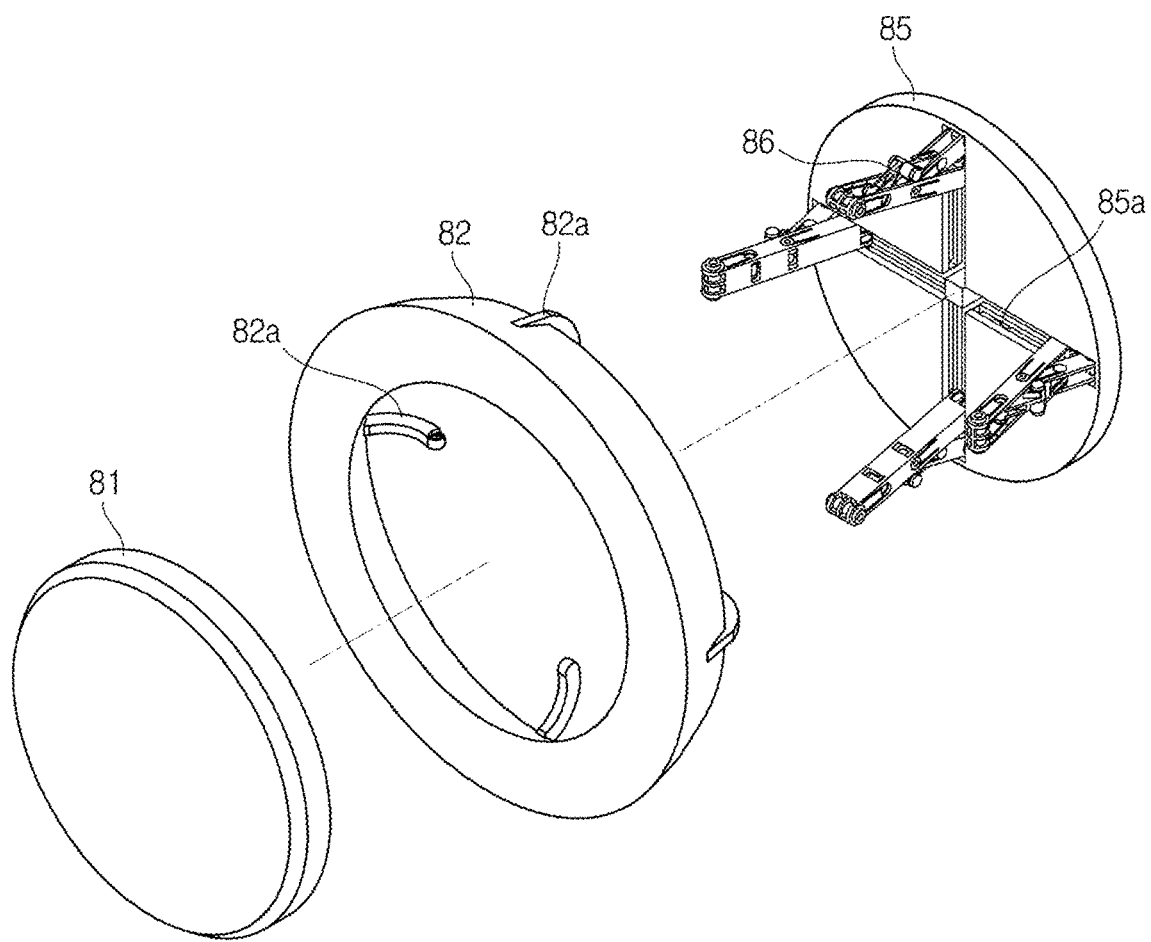
FIG. 48 is an exploded perspective view illustrating a structure of the door unit of FIG. 47

FIG. 47 is a perspective view of a door unit, according to another embodiment of the present disclosure, FIG. 48 is an exploded perspective view illustrating a structure of the door unit of FIG. 47, and FIGS. 49 to 51 show driving of the door unit of FIG. 47.

Referring to FIGS. 47 to 51, the door unit 80 may include a door blade 81, 82 for opening or closing the opening 17 (see FIG. 3) and a door operating part 85, 86 for moving the door blade 81, 82 forward or backward.

The door blade 81, 82 may include a first blade 81 and a second blade 82 in the form of a ring enclosing the outside of the first blade 81. The first and second blades 81 and 82 may open or close the opening 17 while moving separately. The first and second blades 81 and 82 may move different distances.

The door blade 81, 82 may be combined with the door operating part 85, 86. The door operating part 85, 86 may be configured to move the first and second blades 81 and 82 separately.

The door operating part 85, 86 may include a base plate 85 and a link member 86. The base plate 85 may have a guide groove 85a formed on the opposite side to the door blade 81, 82. One end of the link member 86 may be combined with the guide groove 85a for the link member 86 to move along the guide groove 85a.

The link member 86 may include a first link 86a, second link 86b, and a third link 86c.

The first link 86a may be combined with the first blade 81 at one end with the other end movable in the guide groove 85a. The first link 86a may be configured for the first blade 81 to be movable forward or backward from the opening 17 (see FIG. 3).

The second link 86b may be combined with the first link 86a at one end with the other end fixed to the guide groove 85a.

The third link 86c may connect the first link 86a and the second link 86b. The third link 86c may be combined with a coupling portion 82a of the second blade 82. The third link 86c may be configured for the second blade 82 to be movable forward or backward from the opening 17 (see FIG. 3).

With the configurations, the door unit 80 may improve the effect of moving the air discharged from the first discharger 41 in a straight line as the first and second blades 81 and 82 move to the inside of the air conditioner. This may improve an efficiency of the air conditioner.

Figure 52:
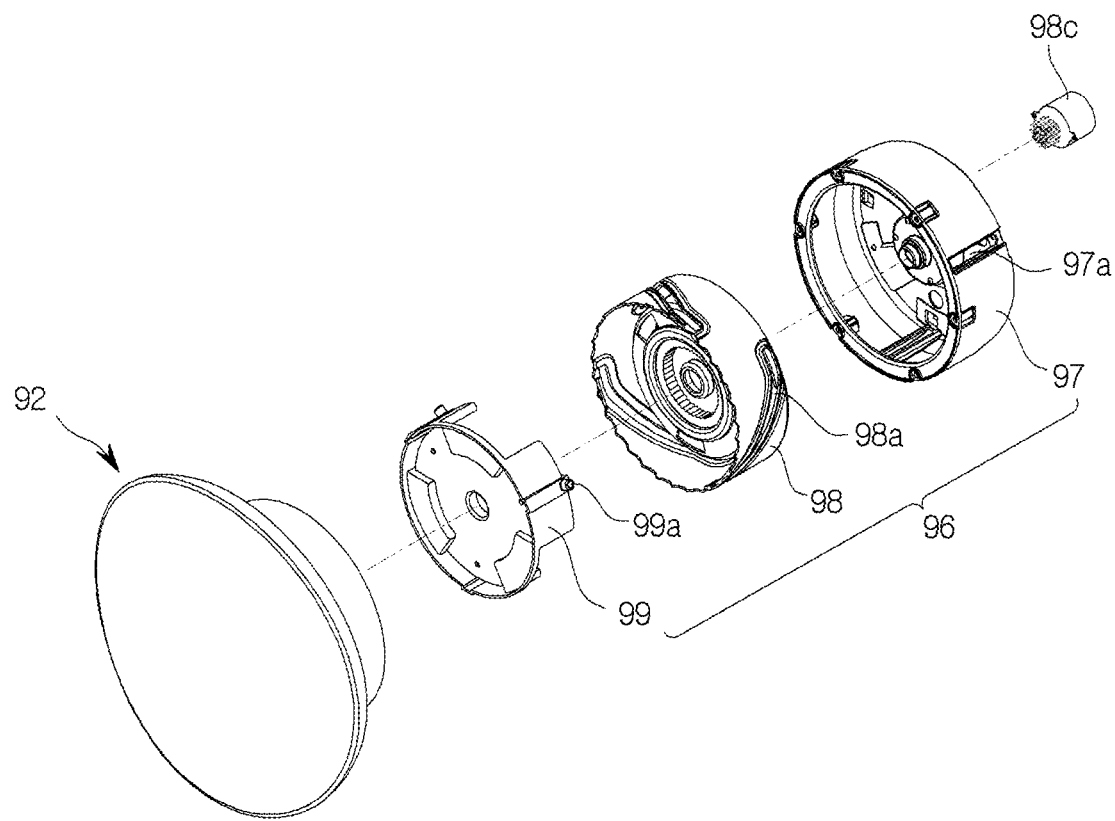
FIG. 52 is an exploded perspective view of a door unit, according to another embodiment of the present disclosure
Figure 53:
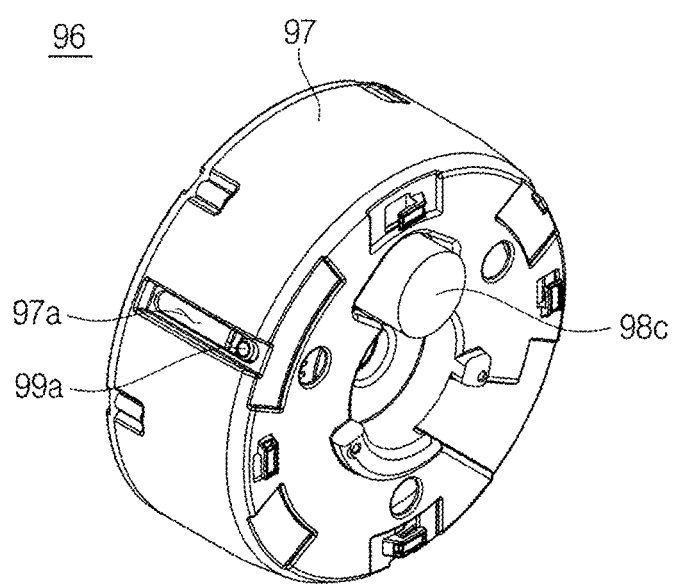
FIG. 53 is a rear view of a door operating part in the door unit of FIG. 52.
Figure 54:
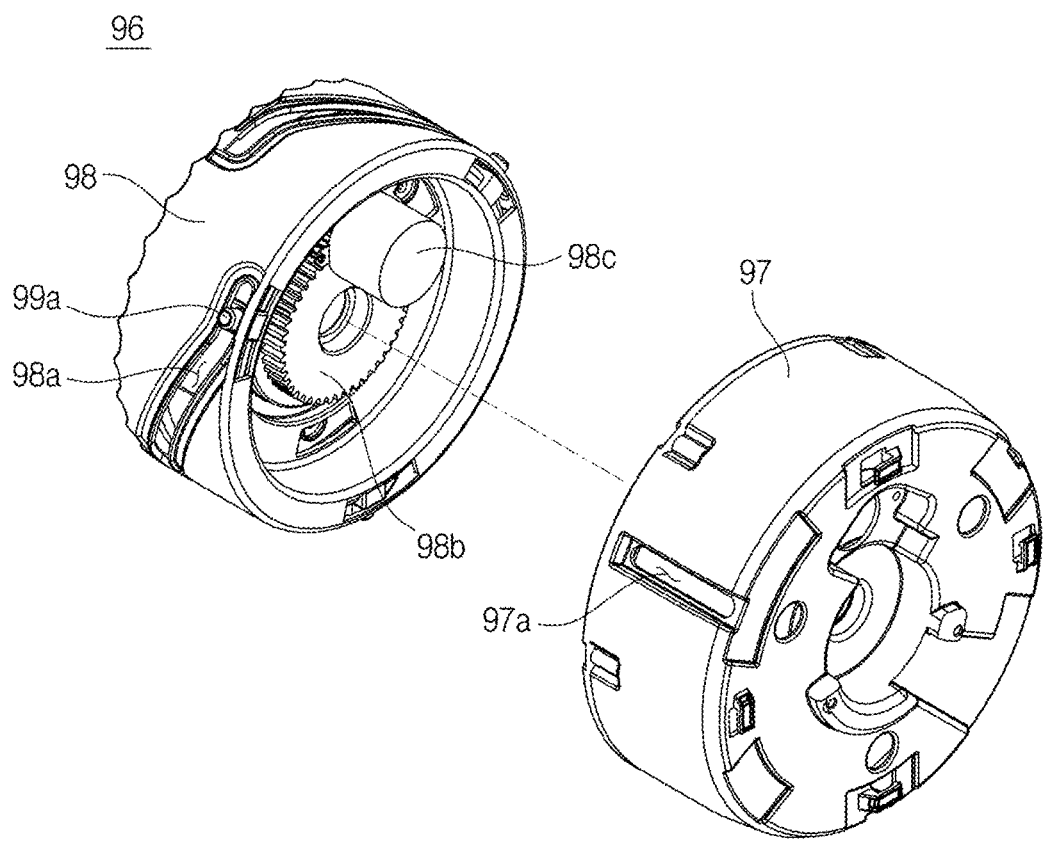
FIG. 54 shows the door operating part of FIG. 52, which is separated from an outer housing.
Figure 55:
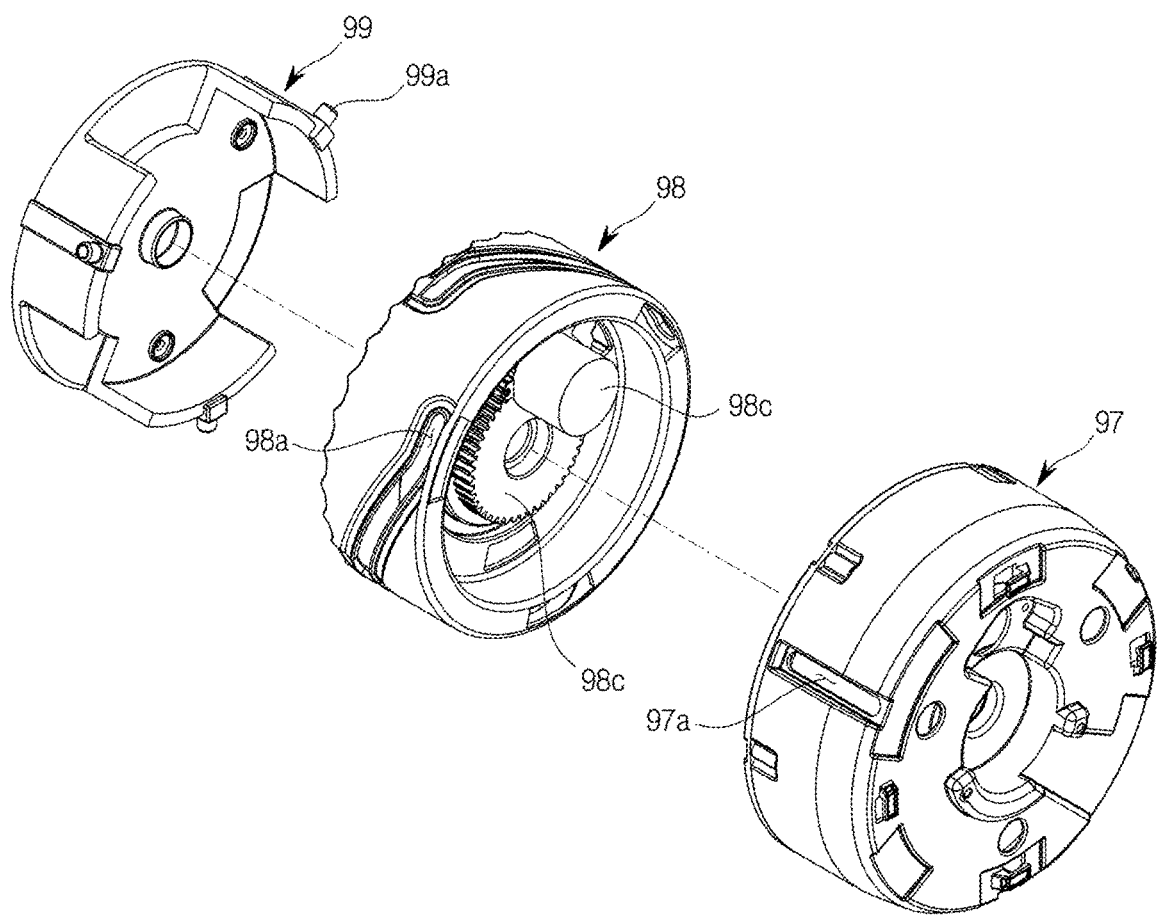
FIG. 55 shows the door operating part of FIG. 52, which is separated from the outer housing, an inner housing, and a housing cover.
Figure 56:
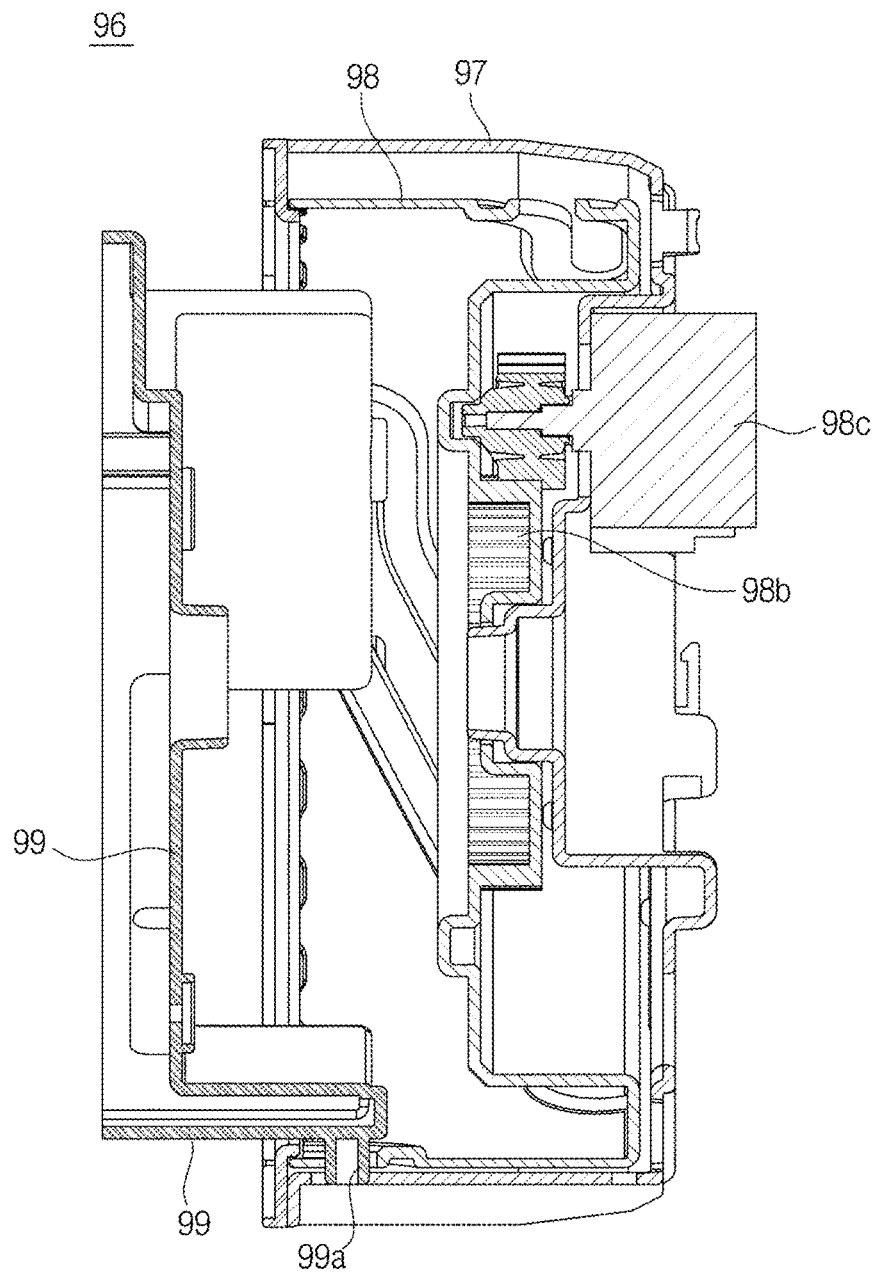
FIGS. 56 to 57 show driving of the door operating part of FIG. 52.
Figure 57:
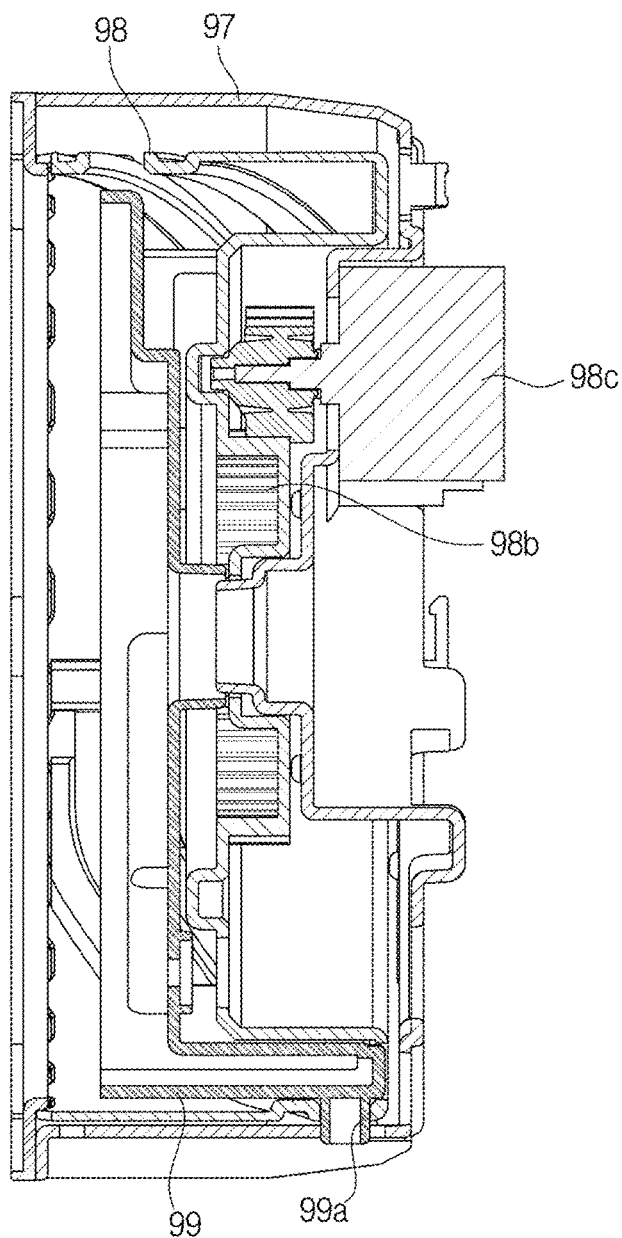

FIG. 52 is an exploded perspective view of a door unit, according to another embodiment of the present disclosure, FIG. 53 is a rear view of a door operating part in the door unit of FIG. 52, FIG. 54 shows the door operating part of FIG. 52, which is separated from an outer housing, FIG. 55 shows the door operating part of FIG. 52, which is separated from the outer housing, an inner housing, and a housing cover, and FIGS. 56 to 57 show driving of the door operating part of FIG. 52.

Referring to FIGS. 52 to 57, the door unit in accordance with an embodiment of the present disclosure may include a door blade 92 for opening or closing the opening 17 (see FIG. 3) and a door operating part 96 for moving the door blade 92 forward or backward.

The door operating part 96 may include an outer housing 97, an inner housing 98, a power transfer part 98c, and a housing cover 99.

The outer housing 97 may form the outer side of the door operating part 96. The outer housing 97 may have a first guide hole 97a formed in a parallel direction to the moving direction of the door blade 92. The first guide hole 97a may guide the direction of movement of a combining protrusion 99a of the housing cover 99, which will be described later, when the combining protrusion 99a is inserted to the first guide hole 97a.

The inner housing 98 may be arranged inside the outer housing 97. The inner housing 98 may be provided to be able to rotate inside the outer housing 97 relatively to the outer housing 97.

The inner housing 98 may have a second guide hole 98a formed thereon. The second guide hole 98a may have at least a portion located in an overlapping position with the first guide hole 97a. The second guide hole 98a may be diagonally formed on an opposite side to the first guide hole 97a. The combining protrusion 99a inserted to the first guide hole 97a may be inserted to the second guide hole 98a. The second guide hole 98a may guide the combining protrusion 99a to move forward or backward along the second guide hole 98a according to rotation of the inner housing 98.

The inner housing 98 may have a gear part 98b formed on the bottom. The gear part 98b may be engaged with a power transfer part 98c. The gear part 98b may be configured to rotate the inner housing 98 using the rotational force produced from the power transfer part 98c.

The housing cover 99 may be combined with the inner housing 98 and the door blade 92. The housing cover 99 may include the combining protrusion 99a to be inserted to the first and second guide holes 97a and 98a. The housing cover 99 may be moved forward or backward along the first and second guide holes 97a and 98a according to rotation of the inner housing 98. This may enable the housing cover 99 to move the door blade 92 forward or backward.

Figure 49:
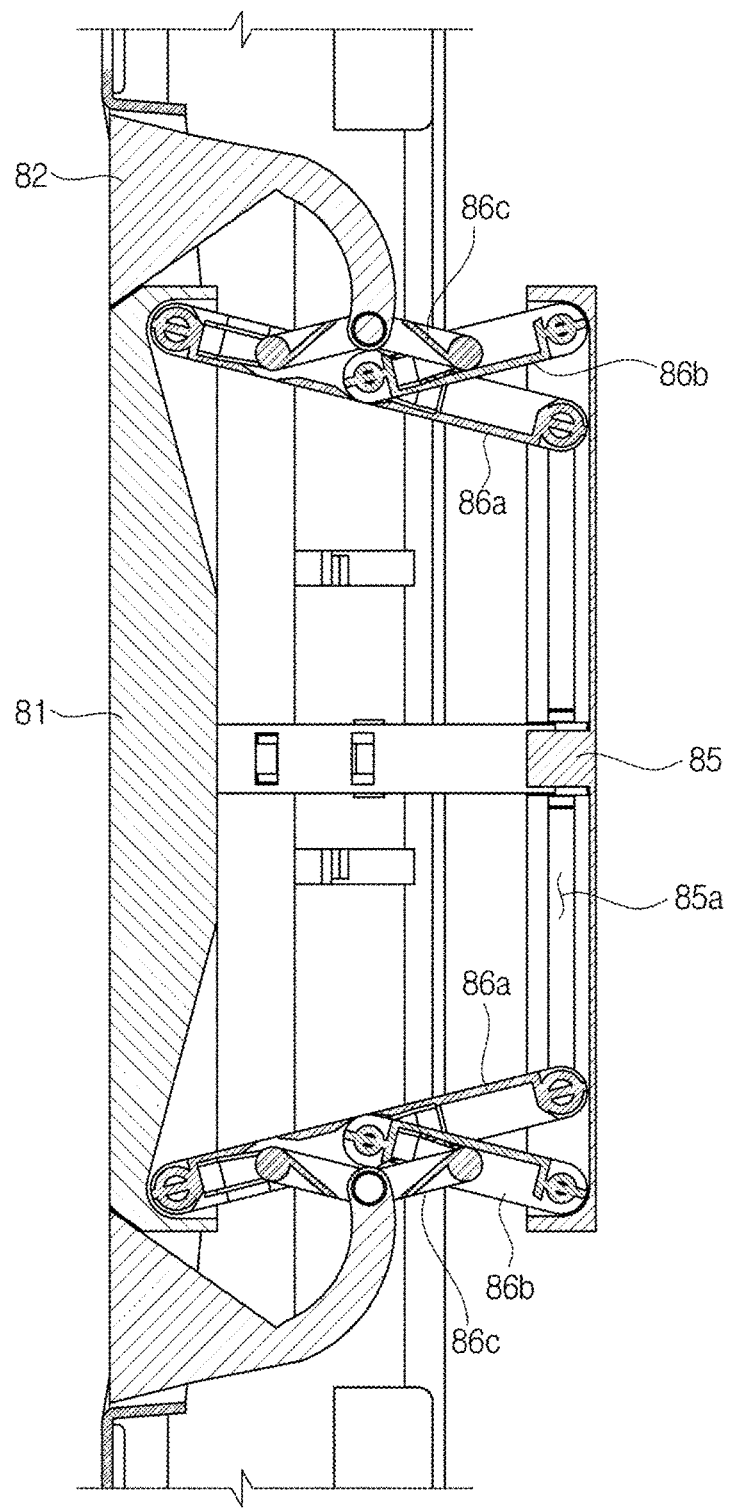
FIGS. 49 to 51 show driving of the door unit of FIG. 47.
Figure 50:
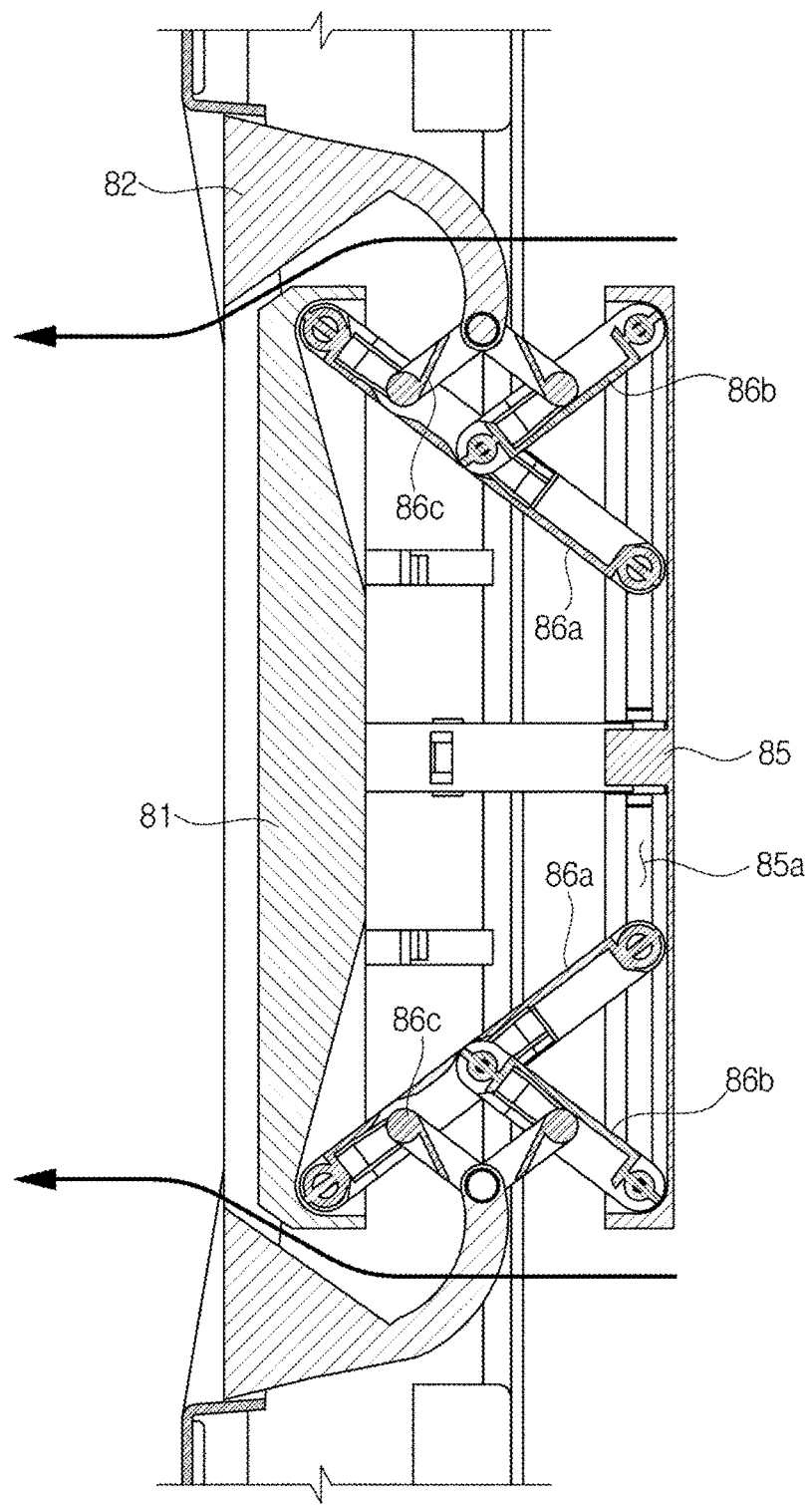
Figure 51:
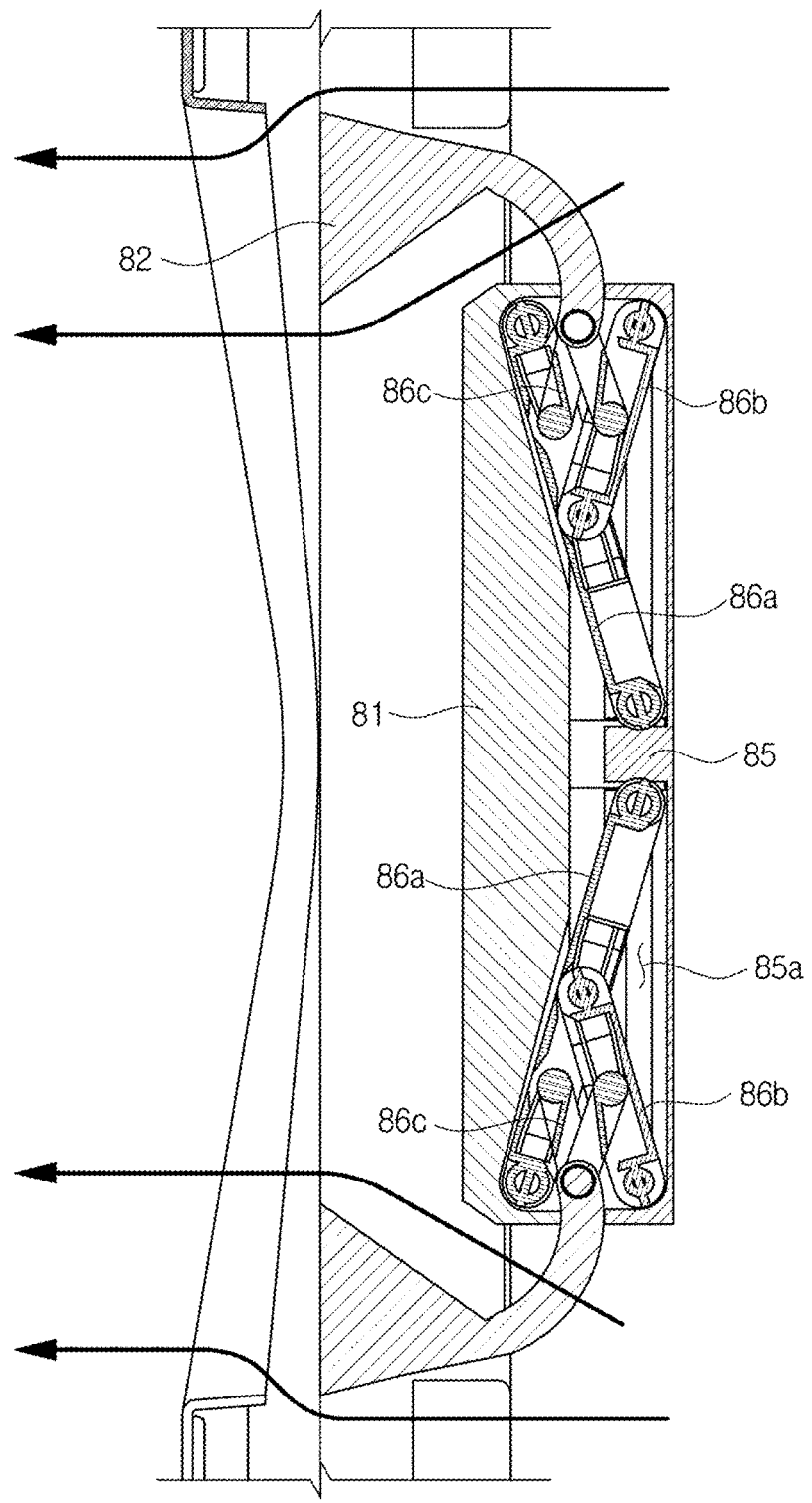

As shown in FIGS. 48 and 49, the door operating part 96 may move the door blade 92 forward or backward using the rotational force produced from the power transfer part 98c.

The rotation force produced from the power transfer part 98c may rotate the inner housing 98 through the gear part 98b, and the housing cover 99 inserted to the second guide hole 98a of the inner housing 98 may have increasing or decreasing relative distance to the inner housing 98 along the second guide hole 98a. Since the combining protrusion 99a of the housing cover 99 is inserted in both the second guide hole 98a and the first guide hole 97a, the housing cover 99 may be moved forward or backward from the air conditioner without being rotated. This may enable the housing cover 99 to open or close the opening 17 (see FIG. 3) by moving the door blade 92 forward or backward.

A door unit 100 of the air conditioner in accordance with another embodiment of the present disclosure will now be described.

Configurations overlapping with what are described above will be omitted herein.

Figure 58:
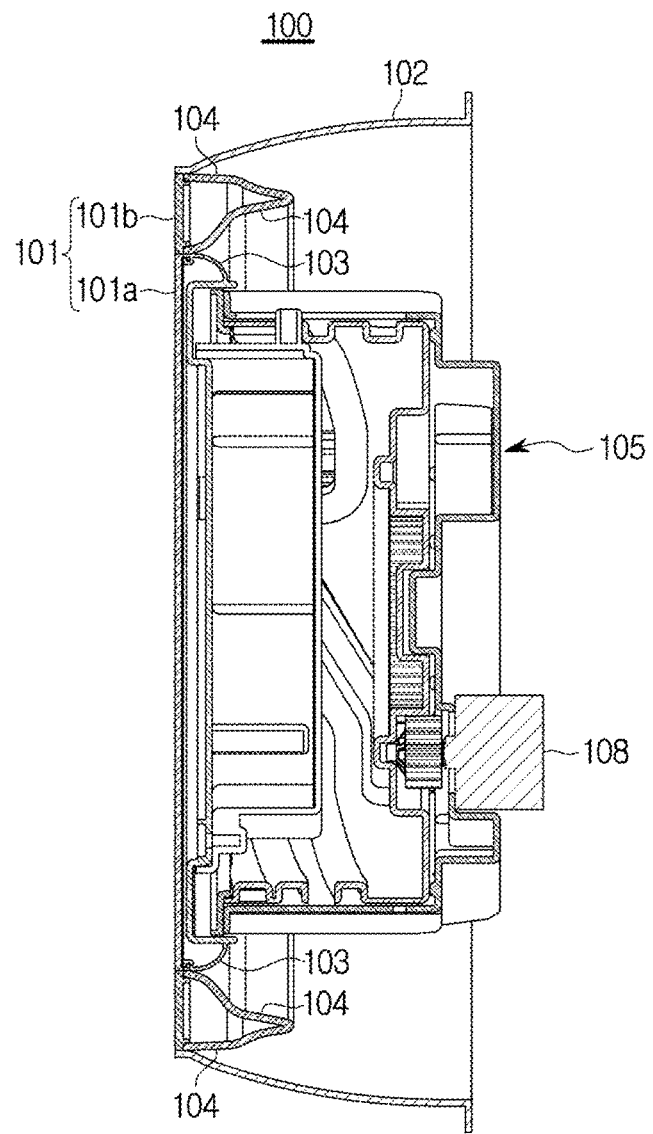
FIGS. 58 to 60 are schematic views illustrating driving of a door unit, according to another embodiment of the present disclosure.
Figure 59:
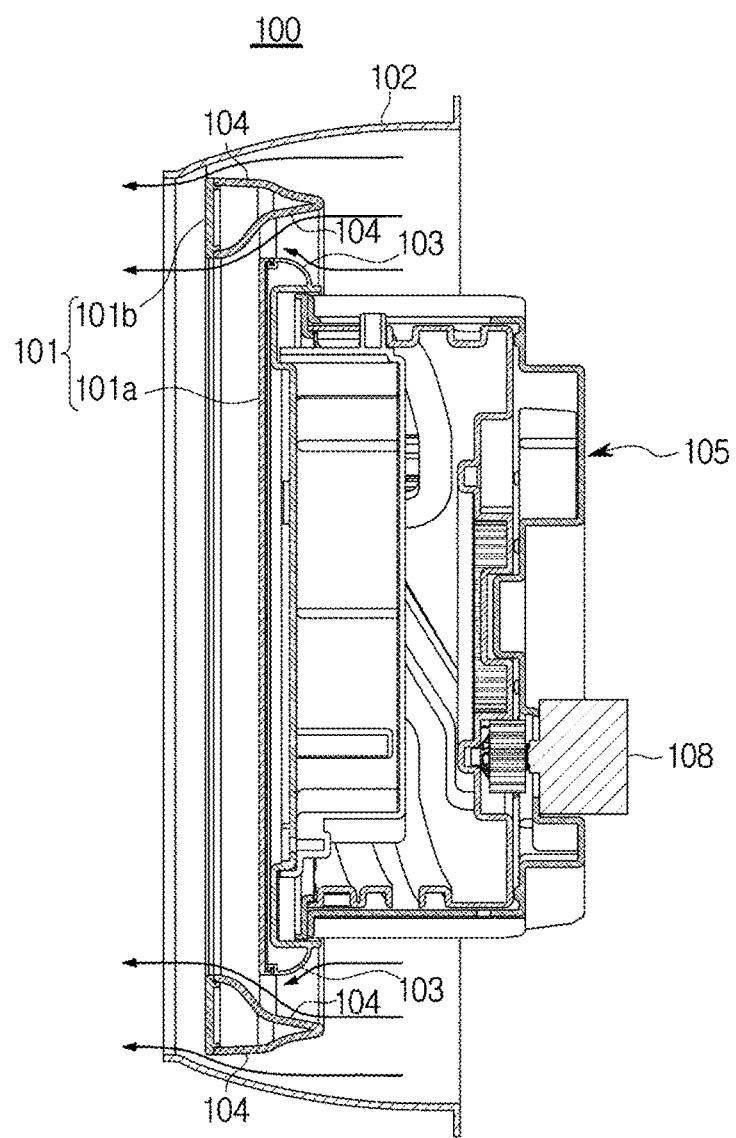
Figure 60:
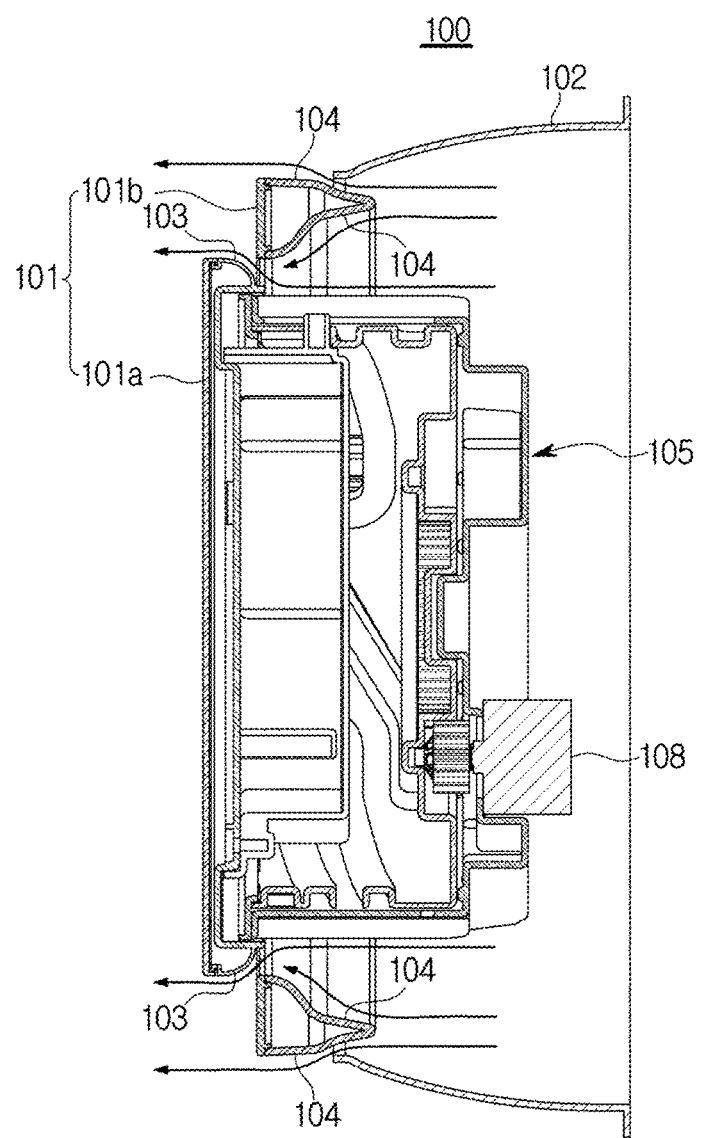

FIGS. 58 to 60 are schematic views illustrating driving of a door unit, according to another embodiment of the present disclosure.

Referring to FIGS. 58 to 60, the door unit 100 in accordance with another embodiment of the present disclosure may include a door blade 101 for opening or closing the opening 17 (see FIG. 3), a door operating part 105, and a driver 108 for moving the door blade 101 forward or backward.

The door blade 101 may include a first blade 101a and a second blade 101b in the form of a ring enclosing the outside of the first blade 101a. The first and second blades 101a and 101b may open or close the opening 17 while moving separately.

The first blade 101a may include a guide curve 103 for guiding the discharged air. The second blade 101b may include a guide curve 104 formed on the inner circumferential face and/or outer circumferential face to guide the discharged air.

The first and second blades 101a and 101b of the door blade 101 may be separately driven by driving methods shown in FIGS. 39 to 46.

The door unit 100 may further include a border part 102 for separating the door unit 100 into inside and outside to form a fluid path in the door unit 100. The door unit 100 may form the fluid path on the inner side of the border part 102.

The door unit 100 may improve the effect of moving the air discharged from the first discharger 41 in a straight line as the first and second blades 101a and 101b sequentially move to the inside of the air conditioner as shown in FIG. 59 or sequentially move to the outside of the air conditioner as shown in FIG. 60. Accordingly, the door unit 100 may improve an efficiency of the air conditioner.

A door unit 110 of the air conditioner in accordance with another embodiment of the present disclosure will now be described.

Configurations overlapping with what are described above will be omitted herein.

Figure 61:
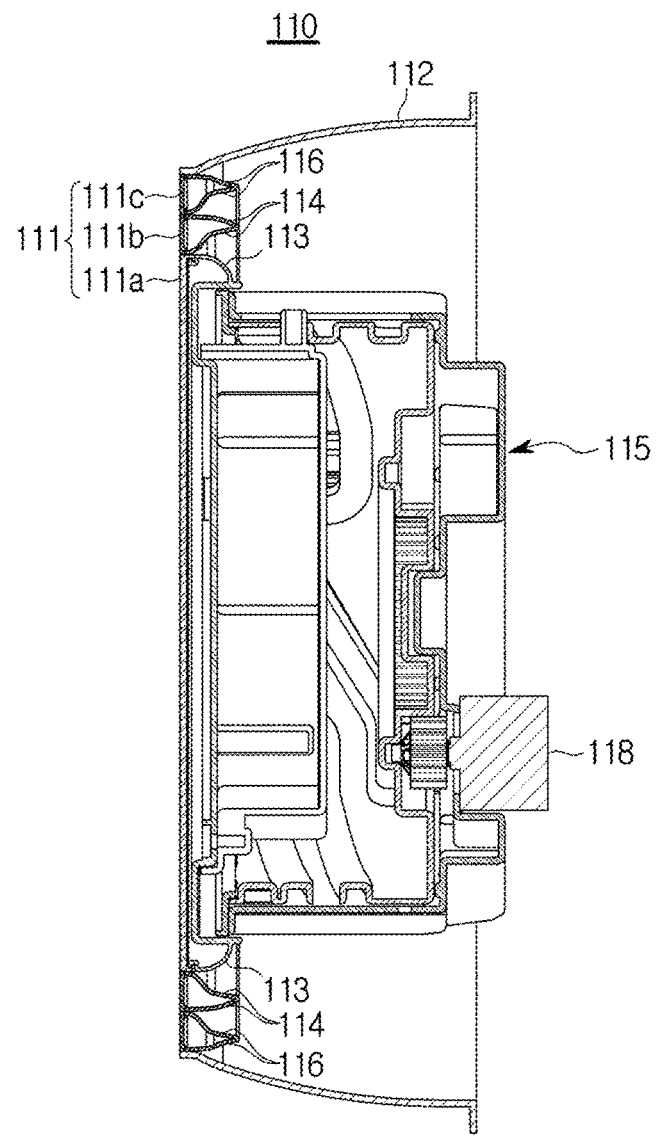
FIGS. 61 to 63 are schematic views illustrating driving of a door unit, according to another embodiment of the present disclosure.
Figure 62:
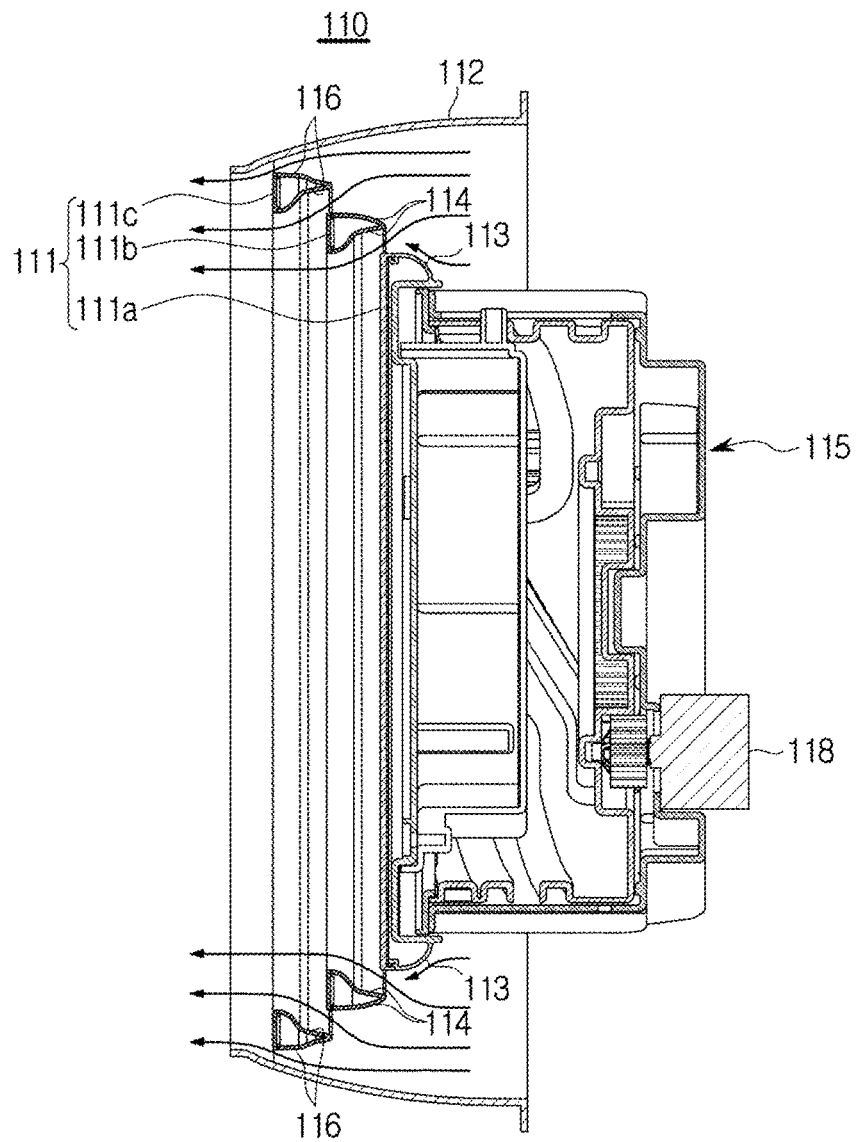
Figure 63:
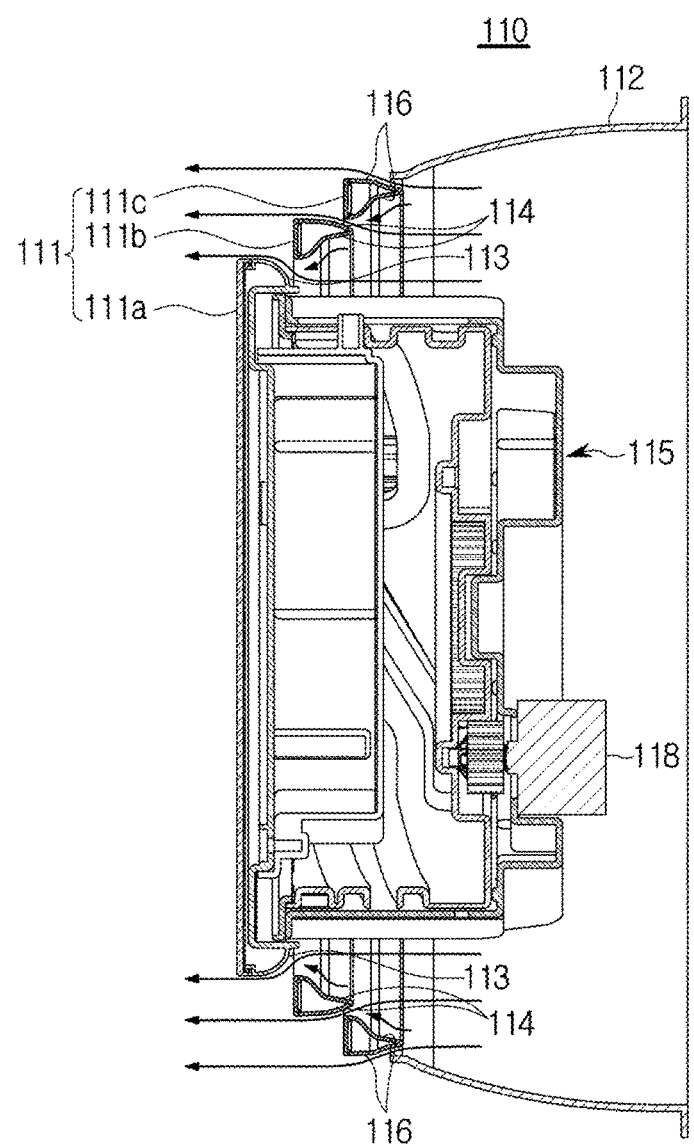

FIGS. 61 to 63 are schematic views illustrating driving of a door unit, according to another embodiment of the present disclosure.

Referring to FIGS. 61 to 63, the door unit 110 in accordance with another embodiment of the present disclosure may include a door blade 111 for opening or closing the opening 17, a door operating part 115 and a driver 118 for moving the door blade 111 forward or backward.

The door blade 111 may include a first blade 111a, a second blade 111b in the form of a ring enclosing the outside of the first blade 111a, and a third blade 111c enclosing the outside of the second blade 111b. The first, second, and third blades 111a and 111c may open or close the opening 17 while moving separately.

The first blade 111a may include a guide curve 113 for guiding the discharged air. The second blade 111b may include a guide curve 114 formed on the inner circumferential face and/or outer circumferential face to guide the discharged air. The third blade 111c may include a guide curve 116 formed on the inner circumferential face and/or outer circumferential face to guide the discharged air.

The first, second, and third blades 111a, 111b, and 111c of the door blade 111 may be separately driven by driving methods shown in FIGS. 39 to 46.

The door unit 110 may further include a border part 112 for separating the door unit 110 into inside and outside to form a fluid path in the door unit 100. The door unit 110 may form the fluid path inside the border part 112.

The door unit 110 may improve the effect of moving the air discharged from the first discharger 41 in a straight line as the first, second, and third blades 111a, 111b, and 111c sequentially move to the inside of the air conditioner as shown in FIG. 62 or sequentially move to the outside of the air conditioner as shown in FIG. 63. Accordingly, the door unit 110 may improve an efficiency of the air conditioner.

A door unit 120 of the air conditioner in accordance with another embodiment of the present disclosure will now be described.

Configurations overlapping with what are described above will be omitted herein.

Figure 64:
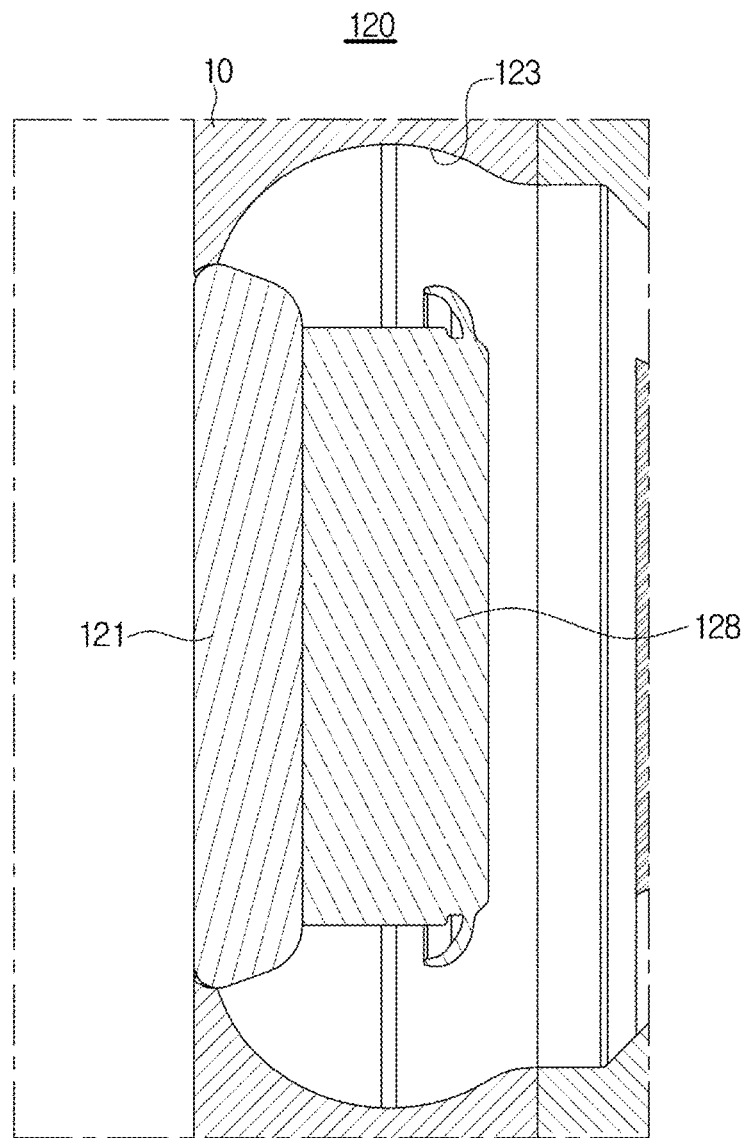
FIGS. 64 to 66 are schematic views illustrating driving of a door unit, according to another embodiment of the present disclosure.
Figure 65:
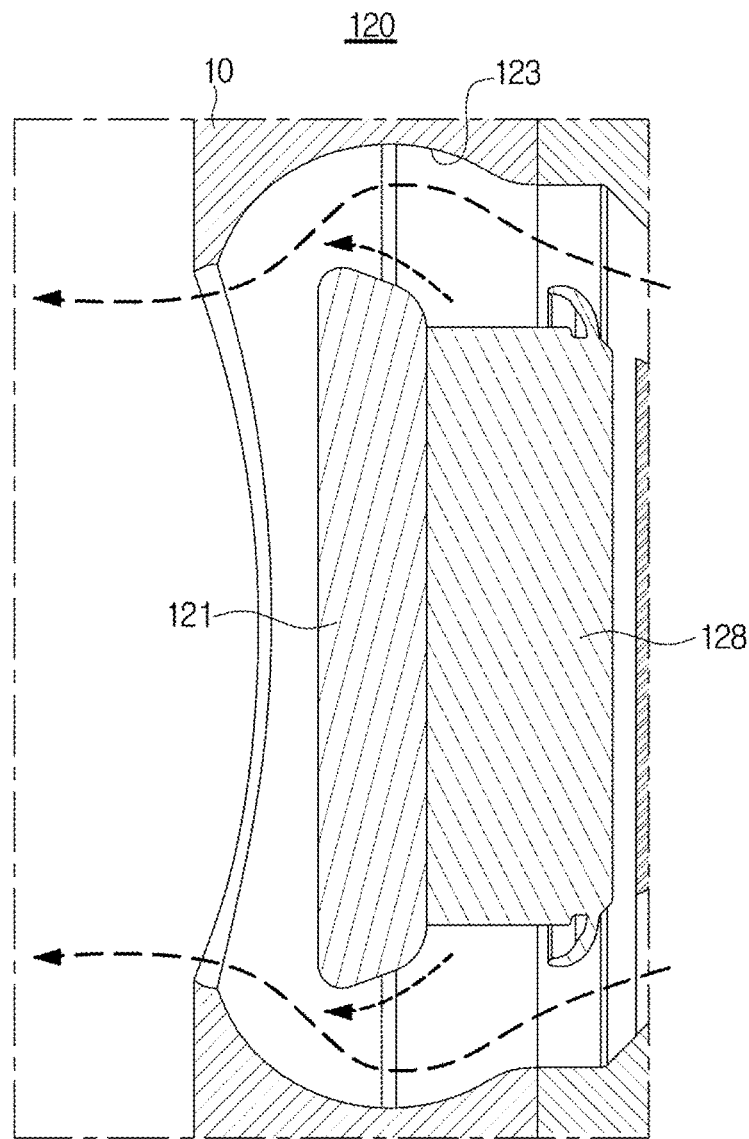
Figure 66:
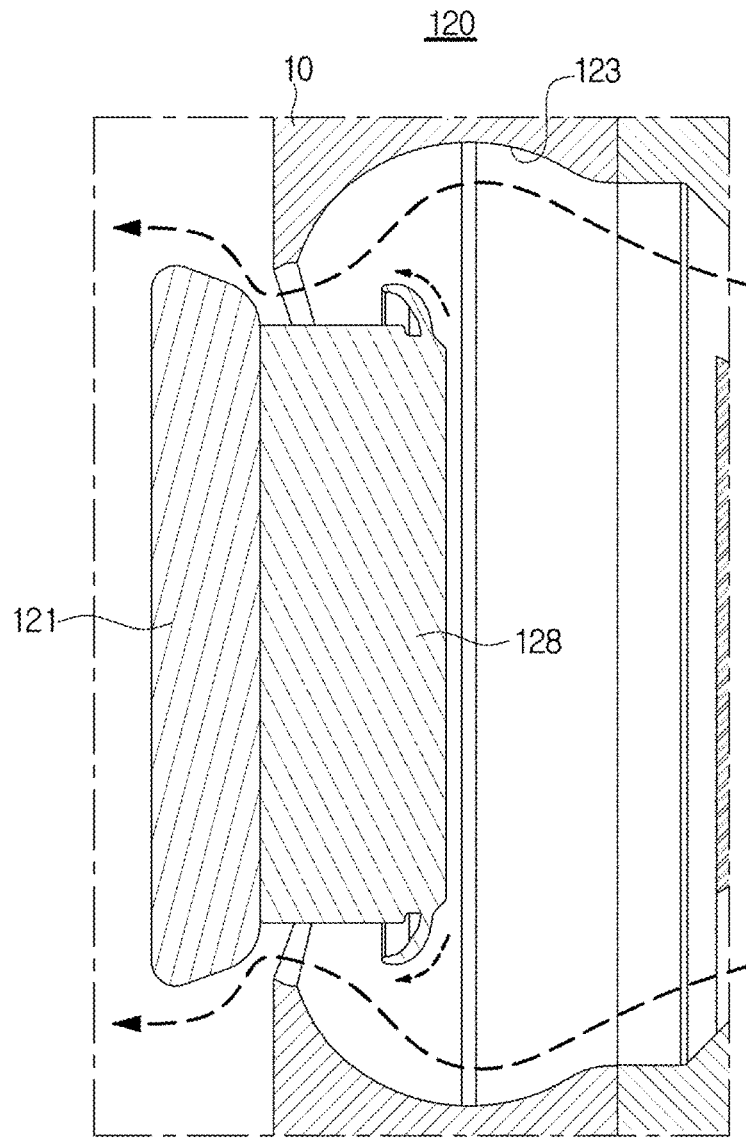

FIGS. 64 to 66 are schematic views illustrating driving of a door unit, according to another embodiment of the present disclosure.

Referring to FIGS. 64 to 66, the door unit 120 in accordance with another embodiment of the present disclosure may include a door blade 121 for opening or closing the opening 17, and a door driver 128 for moving the door blade 121 forward or backward.

The door blade 121 may have the form of a disc and include a guide curve 123 for guiding the discharged air.

The door blade 121 may be driven to the inside and/or outside of the air conditioner as the door driver 128 has a driving structure shown in FIGS. 39 to 46.

The inside of the housing 10, which forms the opening 17, may include a curved portion 123 formed to be curved toward the outside of the housing 10 to increase the area of a discharging fluid path of the air discharged through the first discharger 41. The curved portion 123 may improve the discharge efficiency of the air conditioner.

The door unit 120 may open or close the opening 17 to discharge the heat exchanged air as the door blade 121 is moved to the inside of the air conditioner as shown in FIG. 65 or to the outside of the air conditioner as shown in FIG. 66. In addition, the curved portion 123 may increase the discharge efficiency of the air discharged through the first discharger 41.

A door unit 130 of the air conditioner in accordance with another embodiment of the present disclosure will now be described.

Configurations overlapping with what are described above will be omitted herein.

Figure 67:
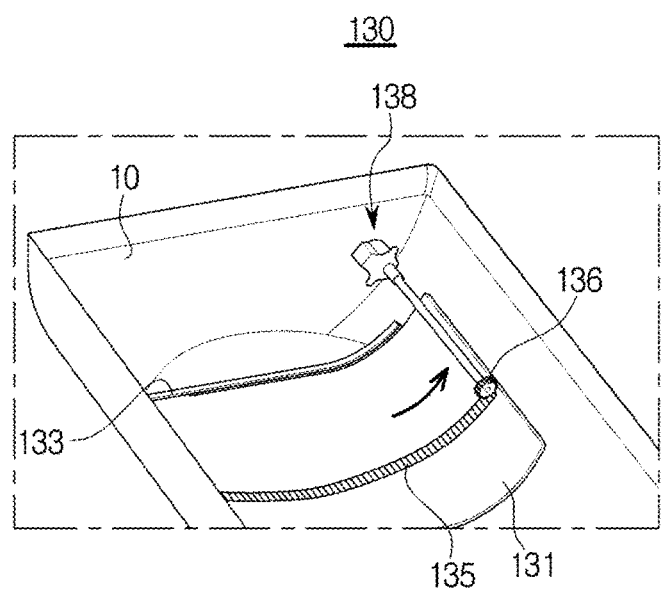
FIGS. 67 and 68 are schematic views illustrating driving of a door unit, according to another embodiment of the present disclosure.
Figure 68:
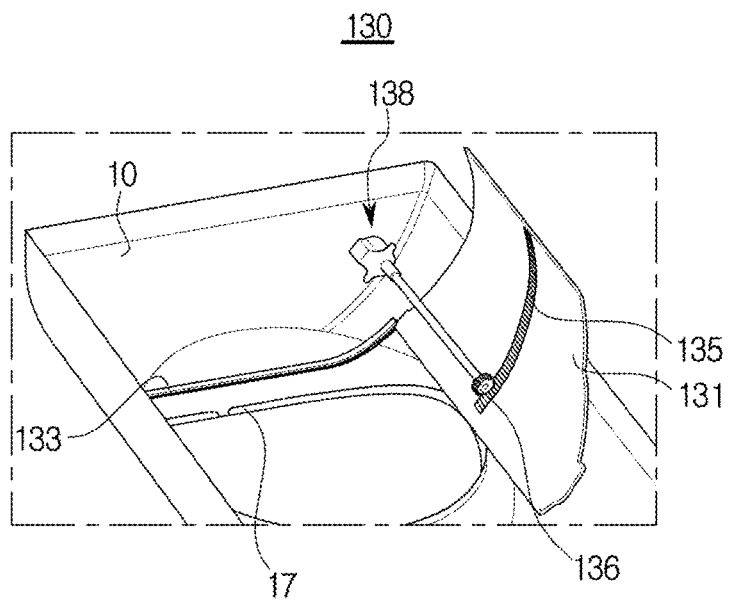

FIGS. 67 and 68 are schematic views illustrating driving of a door unit, according to another embodiment of the present disclosure.

Referring to FIGS. 67 and 68, the door unit 130 in accordance with another embodiment of the present disclosure may include a door blade 131 for opening or closing the opening 17, a door operating part 135, 136, and a driver 138 for moving the door blade 131 forward or backward.

The door blade 131 may include a flexible material. The door blade 131 may be a film that may be rolled. The door blade 131 may open or close the opening 17 by sliding on the opening 17 in the radial direction of the opening 17.

The door blade 131 may include a guide rail 135 on the rear surface facing the inside of the housing 10 for moving the door blade 131 by receiving power from a power transfer part 136, which will be described later.

Sliding of the door blade 131 on the opening 17 may be guided by a guide 133 provided inside the housing 10.

The door operating part 135, 136 may include the guide rail 135 formed on the rear surface of the door blade 131, and the power transfer part 136 for moving the door blade 131 with power received from the driver 138 which will be described later.

The driver 138 generates and delivers power to the power transfer part 136. The driver 138 may be a motor.

The door unit 130 may open or close the opening 17 as the door operating part 135, 136 moves the door blade 131 on the opening 17 to the left or right with the power generated by the driver 138. Specifically, as the driver 138 is activated while the door blade 131 closes the opening as shown in FIG. 67, the door operating part 135, 136 may move the door blade 131 to the right to open the opening as shown in FIG. 68. In this regard, since the door blade 131 is formed of a flexible material, it may bend against the inside of the housing 10 and may be kept inside the housing 10. However, the moving direction of the door blade 131 is not limited to the left or right direction, but may also be moved vertically or at an angle.

A door unit 100 of the air conditioner in accordance with another embodiment of the present disclosure will now be described.

Configurations overlapping with what are described above will be omitted herein.

Figure 69:
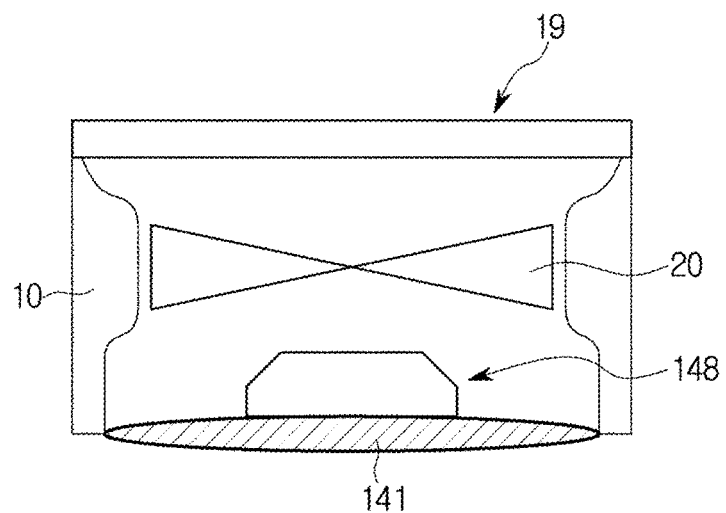
FIGS. 69 and 70 are schematic views illustrating driving of a door unit, according to another embodiment of the present disclosure.
Figure 70:
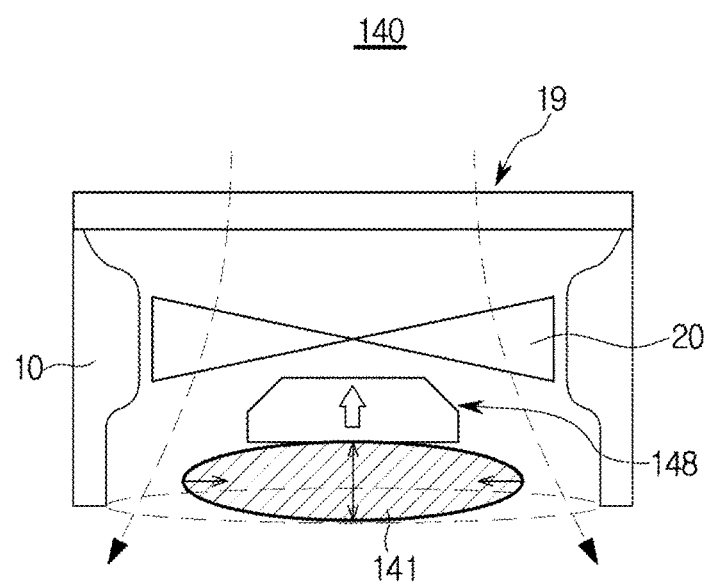

FIGS. 69 and 70 are schematic views illustrating driving of a door unit, according to another embodiment of the present disclosure.

Referring to FIGS. 69 and 70, a door unit 140 in accordance with another embodiment of the present disclosure may include a door blade 141 for opening or closing the opening 17, and a door driver 148 for moving the door blade 141 forward or backward.

The door blade 141 may be shaped like a disc and may include an elastic material. The door blade 141 may include silicon or rubber. A portion of the front of the door blade 141 is fixed to the housing 10 and the rear face is connected to the door driver 148. With the structure, the door blade 141 may have the diameter that may be changed as the door driver 148 moves forward or backward.

Specifically, referring to FIG. 69, when the door driver 148 moves forward, the door blade 141 may have a first diameter and may close the opening 17. More specifically, when the door driver 148 moves forward and pushes the rear face of the door blade 141 forward, the door blade 141 has an increasing diameter and closes the opening 17. On the contrary, referring to FIG. 70, when the door driver 148 moves backward, the door blade 141 may have a second diameter that is smaller than the first diameter and open part of the outer circumference of the opening 17. More specifically, when the door driver 148 moves backward and pulls the rear face of the door blade 141 backward, the door blade 141 has a decreasing diameter and opens the opening 17. In this regard, the door unit 140 may include a controller (not shown) for controlling an opening extent of the opening 17 by controlling the forward and/or backward distance of the door driver 148 to control the size of the diameter of the door blade 141.

The door driver 148 may be connected to the rear face of the door blade 141 to change the diameter of the door blade 141. The door driver 148 may move forward or backward inside the housing 10 according to driving methods shown in FIGS. 39 to 46.

Several embodiments have been described, but a person of ordinary skill in the art will understand and appreciate that various modifications can be made without departing the scope of the present disclosure.

Thus, it will be apparent to those ordinary skilled in the art that the disclosure is not limited to the embodiments described, which have been provided only for illustrative purposes.

What is claimed is:

1. An air conditioner comprising:
a main body housing having an inlet and an opening;
a blower including:
   a fan configured to suck air into the main body housing and discharge the air out of the main body housing; and
   a fan driver driving the fan; and
a door unit configured to adjust an opening degree of the opening,
wherein the door unit comprises:
   a door blade arranged to be movable from the opening in a forward or backward direction; and
   a door operator configured to move the door blade,
   wherein the door operator comprises:
      a power transfer arranged to generate rotational power;
      a door housing configured to convert the rotational power of the power transfer to power for linear movement of the door blade; and
      a housing cover having a cover guide extending along a moving direction of the door blade to prevent rotation of the door blade while the door blade is moving.

2. The air conditioner of claim 1, wherein the door operator comprises one or more gears coupled to the power transfer and the door housing.

3. The air conditioner of claim 2, wherein the one or more gears comprise:
a first gear coupled to the power transfer and having a center arranged in a same line with a rotation axis of the fan driver;
a second gear formed at the door housing; and
a third gear arranged to be interlocked with the first gear and the second gear.

4. The air conditioner of claim 2, wherein the one or more gears are arranged at a rear end portion of the door housing.

5. The air conditioner of claim 1, wherein the door housing comprises:
a first door housing having a door guide formed to be obliquely slanted on a side surface; and
a second door housing having a coupling protrusion to be slidably inserted into the door guide.

6. The air conditioner of claim 5, wherein the second door housing is arranged to be movable in the first door housing.

7. The air conditioner of claim 1, wherein the blower comprises a blower grill arranged in front of the fan, and
wherein the housing cover is fixed to the blower grill.

8. The air conditioner of claim 1, further comprising a discharge guide arranged in front of the blower to form a path in which air blown by the fan flows to the opening.

9. The air conditioner of claim 1, wherein the door blade is fixed to a portion of the door housing.

10. The air conditioner of claim 1, wherein the door unit comprises a display arranged on a front surface of the door blade.

11. The air conditioner of claim 1, wherein a rotation axis of the rotational power of the power transfer is set to be parallel to the moving direction of the door blade.

* * * * *